United States Patent
Beltran Gracia et al.

(10) Patent No.: US 11,248,171 B2
(45) Date of Patent: Feb. 15, 2022

(54) POLYMERISABLE LC MEDIUM AND POLYMER FILM WITH FLAT OPTICAL DISPERSION

(71) Applicant: Merck Patent GmbH, Darmstadt (DE)

(72) Inventors: Eduardo Beltran Gracia, Southampton (GB); Iain Gardiner, Chandlers Ford (GB); Rebecca Proctor, Southampton (GB); Stephen Mulcahy, Southampton (GB)

(73) Assignee: Merck Patent GmbH, Darmstadt (DE)

( * ) Notice: Subject to any disclaimer, the term of this patent is extended or adjusted under 35 U.S.C. 154(b) by 293 days.

(21) Appl. No.: 16/465,631

(22) PCT Filed: Nov. 28, 2017

(86) PCT No.: PCT/EP2017/080588
§ 371 (c)(1),
(2) Date: May 31, 2019

(87) PCT Pub. No.: WO2018/099883
PCT Pub. Date: Jun. 7, 2018

(65) Prior Publication Data
US 2020/0024519 A1    Jan. 23, 2020

(30) Foreign Application Priority Data

Dec. 1, 2016 (EP) .................... 16201704

(51) Int. Cl.
| | | |
|---|---|---|
| *C09K 19/38* | (2006.01) | |
| *C08F 222/20* | (2006.01) | |
| *C08F 222/26* | (2006.01) | |
| *C08J 5/18* | (2006.01) | |
| *C09K 19/02* | (2006.01) | |
| *G02B 5/30* | (2006.01) | |
| *C09K 19/04* | (2006.01) | |
| *G02F 1/13363* | (2006.01) | |

(52) U.S. Cl.
CPC ........ *C09K 19/3857* (2013.01); *C08F 222/20* (2013.01); *C08F 222/26* (2013.01); *C08J 5/18* (2013.01); *C09K 19/0275* (2013.01); *G02B 5/3016* (2013.01); *C08F 222/205* (2020.02); *C08J 2335/02* (2013.01); *C09K 2019/0448* (2013.01); *G02F 1/13363* (2013.01); *G02F 1/133638* (2021.01)

(58) Field of Classification Search
CPC ............ C09K 19/3857; C09K 19/0275; C09K 2019/0448; C08F 222/20; C08F 222/26; C08F 222/205; C08J 5/18; C08J 2335/02; G02B 5/3016; G02F 1/13363; G02F 1/133638
USPC ......................................... 526/298
See application file for complete search history.

(56) References Cited

U.S. PATENT DOCUMENTS

| | | | | |
|---|---|---|---|---|
| 8,687,259 B2 * | 4/2014 | Adlem | ............... | C09K 19/3059 359/245 |
| 8,895,117 B2 * | 11/2014 | Jansen | ................... | C09K 19/42 428/1.1 |
| 10,435,628 B2 * | 10/2019 | Sargent | ................. | C09K 19/38 |
| 2010/0110362 A1 * | 5/2010 | Parri | .................. | C09K 19/3059 349/194 |
| 2012/0224245 A1 * | 9/2012 | Adlem | ............... | C09K 19/3491 359/245 |
| 2016/0032189 A1 * | 2/2016 | Baron | .................. | C09K 19/04 349/139 |
| 2017/0226421 A1 * | 8/2017 | Sargent | ............... | C09K 19/406 |

FOREIGN PATENT DOCUMENTS

| | | | | |
|---|---|---|---|---|
| WO | 2011/050896 A1 | 5/2011 | | |
| WO | WO-2011050896 A1 * | 5/2011 | ......... | C09K 19/3059 |
| WO | 2016/020035 A1 | 2/2016 | | |
| WO | WO-2016020035 A1 * | 2/2016 | ......... | C09K 19/3809 |

OTHER PUBLICATIONS

International Search Report dated Feb. 15, 2018 issued in corresponding PCT/EP2017/080588 application (3 pages).

\* cited by examiner

*Primary Examiner* — Michael M. Bernshteyn
(74) *Attorney, Agent, or Firm* — Millen White Zelano and Branigan, PC; John Sopp

(57) ABSTRACT

The invention relates to a polymerisable LC medium with flat optical dispersion, a polymer film with flat optical dispersion obtainable from such a medium, and the use of the polymerisable LC medium and polymer film in optical, electro optical, electronic, semiconducting or luminescent components or devices.

16 Claims, No Drawings

POLYMERISABLE LC MEDIUM AND POLYMER FILM WITH FLAT OPTICAL DISPERSION

FIELD OF THE INVENTION

The invention relates to a polymerisable LC medium with flat optical dispersion, a polymer film with flat optical dispersion obtainable from such a material, and the use of the polymerisable LC medium and polymer film in optical, electro optical, electronic, semiconducting or luminescent components or devices.

BACKGROUND AND PRIOR ART

Polymerisable liquid crystal materials are known in prior art for the preparation of anisotropic polymer films. These films are usually prepared by coating a thin layer of a polymerisable liquid crystal mixture onto a substrate, aligning the mixture into a uniform orientation and finally fixing the orientation of the liquid crystal molecules by polymerizing the polymerizable liquid crystal material. The orientation of the liquid crystal molecules in the polymerized film can thereby be planar, i.e. where the liquid crystal molecules are oriented substantially parallel to the layer, homeotropic (rectangular or perpendicular to the layer) or tilted. Corresponding optical films are described, for example, in EP 0 940 707 B1, EP 0 888 565 B1 and GB 2 329 393 B1.

As commonly known by the expert, optical films based on polymerisable liquid crystal materials typically exhibit a wavelength dependent retardation. In this regard, Three main kind of optical behaviour are known:
i) "Normal" or "Positive" optical dispersion, such as for example described in EP 0 940 707 B1
ii) "Reverse" or "Negative" optical dispersion, such as, for example described in WO 2016/020035 A1, and
iii) "Flat" optical dispersion, such as for example described in WO 2009/058396 A1.

For example, flat dispersion polymerisable liquid crystal materials can be produced by adding at least one component with an ordinary refractive index (no) higher than extraordinary refractive index (ne) in the formulation. Therefore, highly conjugated substituents are required in the orthogonal position with respect to the long-axis of the molecules. The latter materials absorb part of the UV dose when curing optical films which results in poor degree of cure and poor thermal durability of cured films. Besides the latter molecular blocks can easily oxidise under high temperatures in the presence of oxygen. Same applies to high birefringent formulations containing highly conjugated reactive mesogens which reduces the thermal durability of cured films and which are typically prone to yellowing.

For example, WO 2008/119427 A1 describes a birefringent polymer film with negative optical dispersion, which is obtainable from a polymerisable LC material comprising as negative dispersion component compounds having the structure shown below or derivatives thereof:

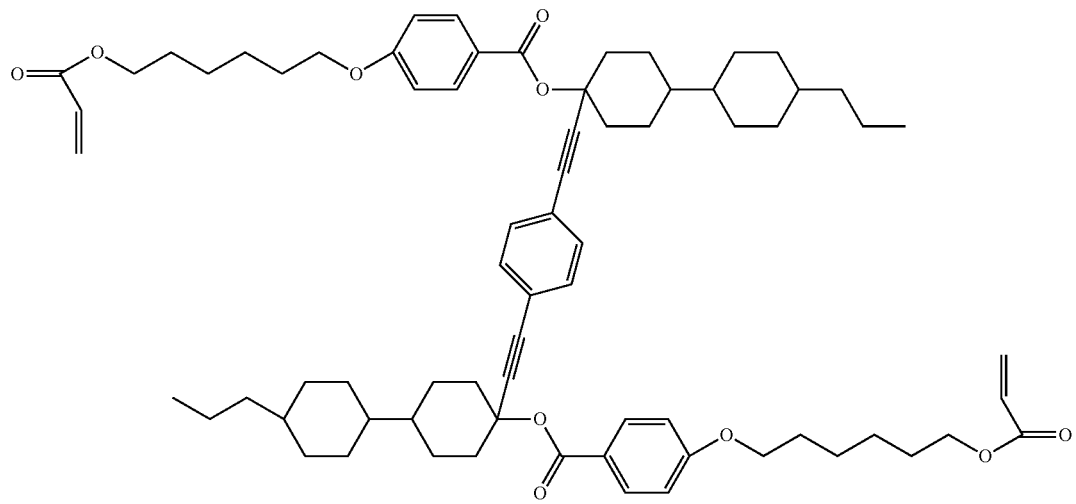 [SMILES: C=CC(=O)OCCCCCCOc1ccc(C(=O)OC2(C#Cc3ccc(C#CC4(OC(=O)c5ccc(OCCCCCCOC(=O)C=C)cc5)CCC(C5CCC(CCC)CC5)CC4)cc3)CCC(C3CCC(CCC)CC3)CC2)cc1]

The ratio of the negative dispersion component in the polymerisable LC material disclosed in WO 2008/119427 A1 is for example 50-60% of the total amount of solids (i.e. without solvents).

However, the bulky nature of the negative dispersion compounds according to the prior art are typically hard to align or give formulations with a narrow process window for annealing temperature, which is not convenient for mass production.

Furthermore, flat dispersion films of the prior art are unfavourable thick (30-100 µm) due to the low birefringence of the utilized LC materials. Since the retardation of an optical retardation film is given by the product of its birefringence and film thickness, and thinner films are generally preferred in flat panel display applications, it is desired to increase the birefringence of the film so that the film thickness can be reduced while achieving the same retardation. In addition, the flat dispersion films of the prior art often require due to their unfavourable thickness unfavourable processing steps, which are not suitable for mass production processes.

Another aspect is that polymerisable liquid crystal (LC) materials for flat dispersion films, while stable at room temperature, can degrade when subjected to increased temperatures. For example, when heated for a period of time the optical properties such as dispersion or retardance decreases and as such, the performance of the optical film degrades over time, which can be attributed, in particular, to a low degree of polymerisation and a corresponding high content of residual free radicals in the polymer and/or polymer shrinkage, and/or thermo-oxidative degradation. However, the reduction of degradation is especially important when optical films are utilized in in-cell applications. In particular, the optical films have to endure the annealing of the polyimide layer in the LC cell.

In order to solve the above described problem, a higher degree of polymerisation can be i. a. influenced by the choice of the utilized photoinitiator and by increasing its solid content. In particular by increasing the photoinitiator solid content, typically an increase of the polymerisation rate can by achieved, which results in a higher degree of cure. However, increasing the photoinitiator solid content also typically ends up in a loss of the uniform alignment of the liquid crystal molecule due to the very high polymerisation rate.

Multireactive materials can be used for reducing the polymer shrinkage of polymerised films by increasing the cross-linking density. Polymer shrinkage is a decrease in thickness of the optical film, reduces the retardance of the passing light in accordance to $R=d\Delta n$, wherein R is the retardance, d is the thickness of the birefringent film, $\Delta n$ is the birefringence. However, the desired properties of an optical retardation film, like e.g. uniform alignment of the liquid crystal molecules, film structure, film adhesion, temperature stability and optical performance, are highly dependent from the composition of the polymerisable liquid crystal material especially concerning the ratio and choice of mono- and direactive mesogenic compounds.

Thermo-oxidative degradation is the breakdown of a polymer network catalysed by oxidation at high temperatures. As commonly known, antioxidant additives, or short antioxidants, can be used to reduce the thermo-oxidative degradation of polymers when subjected to increased temperatures. However, increasing the amount of antioxidants also here typically ends up in a loss of the uniform alignment of the liquid crystal molecules.

In summary, all examples of the prior art describe different ways for improving thermal durability by addition of specific additives, such as photoinitiators, antioxidants or by increasing the cross-link density of the polymer network. However, drawbacks arises when using the latter methods, such as poor adhesion, gelation effects or misalignment of cured films.

Therefore, there is still the need for new and preferably improved, polymerisable liquid crystal materials or resulting polymer films, both not exhibiting the drawbacks of prior art materials or if so, only exhibiting them to a less extent.

The polymerisable LC media comprising them, which are used for film preparation, should exhibit good thermal properties, in particular a modest melting point, a good solubility in the LC host and in organic solvents, and reasonable extrapolated clearing point, and should further exhibit excellent optical properties.

Advantageously, said polymerisable LC material, should preferably be applicable for the preparation of different, uniform aligned polymer films, and should, in particular at the same time,
  show a favourable adhesion to a substrate,
  be highly transparent to VIS-light,
  exhibit an reduced yellow coloration over time (yellowing),
  exhibit a high birefringence in order to reduce the film thickness,
  show a favourable high temperature stability or durability, and in addition,
  the uniform aligned polymer films should be produced by compatible, commonly known, methods for the mass production.

Other aims of the present invention are immediately evident to the person skilled in the art from the following detailed description.

Surprisingly, the inventors of the present invention have found that one or more, preferably all of the above requirements can be fulfilled, preferably at the same time, by using a polymerisable LC material according to claim 1.

SUMMARY OF THE INVENTION

The invention relates to a polymerisable liquid crystalline (LC) medium comprising up to 20 wt. % of one or more compounds of formula A,

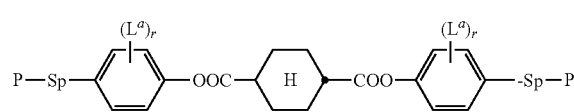

wherein
P is independently of one another, a polymerisable group, preferably having one of the meanings given for P below, and is more preferably an acryl, methacryl, oxetane, 3-ethyloxetane, epoxy, vinyloxy or styrene group,
Sp is a spacer group or a single bond, preferably having one of the meanings given for Sp below,
$L^a$ is, in case of multiple occurrence identically or differently F, Cl, CN, SCN, $SF_5$ or straight-chain or branched, optionally mono- or polyfluorinated alkyl, alkoxy, alkenyl, alkynyl, alkylcarbonyl, alkoxycarbonyl, or alkylcarbonyloxy or alkoxycarbonyloxy having 1 to 12 C atoms, (wherein the groups different from alkyl and alkoxy contain at least 2 C atoms and branched groups contain at least 3 C atoms) or optionally halogenated alkyl, alkoxy, alkylcarbonyl, alkoxycarbonyl, alkylcarbonyloxy or alkoxycarbonyloxy with 1 to 5 C atoms,
r is 0, 1, 2, 3 or 4,
and up to 20 wt. % of one or more compounds of formula I,

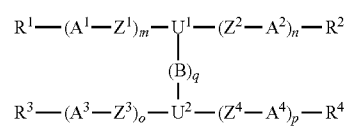

wherein
$U^1$ and $U^2$ are independently of each other selected from

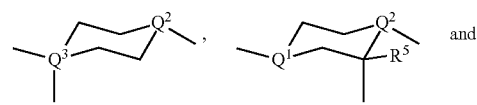

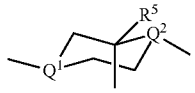

including their mirror images, wherein the rings $U^1$ and $U^2$ are each bonded to the group $-(B)_q-$ via the axial bond, and one or two non-adjacent $CH_2$ groups in these rings are optionally replaced by O and/or S, and the rings $U^1$ and $U^2$ are optionally substituted by one or more groups L, $Q^1$ and $Q^2$ are independently of each other CH or SiH, $Q^3$ is C or Si, B is in each occurrence independently of one another $-C\equiv C-$, $-CY^1=CY^2-$ or an optionally substituted aromatic or heteroaromatic group, $Y^1$ and $Y^2$ are independently of each other H, F, Cl, CN or $R^0$, q is an integer from 1 to 10, preferably 1, 2, 3, 4, 5, 6 or 7, $A^1$ to $A^4$ are independently of each other, in each occurrence, selected from non-aromatic, aromatic or heteroaromatic carbocyclic or heterocyclic groups, which are optionally substituted by one or more groups $R^5$, and wherein each of $-(A^1-Z^1)_m-U^1-(Z^2-A^2)_n-$ and $-(A^3-Z^3)_o-U^2-(Z^4-A^4)_p-$ does not contain more aromatic groups than non-aromatic groups and preferably does not contain more than one aromatic group, $Z^1$ to $z^4$ are independently of each other, in each occurrence, $-O-$, $-S-$, $-CO-$, $-COO-$, $-OCO-$, $-O-COO-$, $-CO-NR^0-$, $-NR^0-CO-$, $-NR^0-CO-NR^0-$, $-OCH_2-$, $-CH_2O-$, $-SCH_2-$, $-CH_2S-$, $-CF_2O-$, $-OCF_2-$, $-CF_2S-$, $-SCF_2-$, $-CH_2CH_2-$, $-(CH_2)_3-$, $-(CH_2)_4-$, $-CF_2CH_2-$, $-CH_2CF_2-$, $-CF_2CF_2-$, $-CH=CH-$, $-CY^1=CY^2-$, $-CH=N-$, $-N=CH-$, $-N=N-$, $-CH=CR^0-$, $-C\equiv C-$, $-CH=CH-COO-$, $-OCO-CH=CH-$, $CR^0R^{00}$ or a single bond, $R^0$ and $R^{00}$ are independently of each other H or alkyl with 1 to 12 C-atoms, m and n are independently of each other 0, 1, 2, 3 or 4, o and p are independently of each other 0, 1, 2, 3 or 4, $R^1$ to $R^5$ are independently of each other identical or different groups selected from H, halogen, $-CN$, $-NC$, $-NCO$, $-NCS$, $-OCN$, $-SCN$, $-C(=O)NR^0R^{00}$, $-C(=O)X^0$, $-C(=O)R^0$, $-NH_2$, $-NR^0R^{00}$, $-SH$, $-SR^0$, $-SO_3H$, $-SO_2R^0$, $-OH$, $-NO_2$, $-CF_3$, $-SF_5$, P-Sp-, optionally substituted silyl, or carbyl or hydrocarbyl with 1 to 40 C atoms that is optionally substituted and optionally comprises one or more hetero atoms, or denote P or P-Sp-, or are substituted by P or P-Sp-, wherein the compounds comprise at least one group $R^{1-5}$ denoting or being substituted by P or P-Sp-, P is a polymerisable group, Sp is a spacer group or a single bond.

The invention further relates to the use of a polymerisable LC medium or polymer film as described above and below in optical, electronic and electro optical components and devices, preferably in optical films, retarders or compensators having flat optical dispersion.

The invention further relates to a birefringent polymer film being obtainable or obtained by polymerising a polymerisable LC medium as described above and below, preferably in its LC phase in an oriented state in form of a thin film.

The invention especially relates to a polymer film as described above and below, which is an A plate or a C plate, preferably a positive A plate (+A plate) or positive C plate (+C plate).

The invention further relates to an optical, electronic or electro optical component or device, comprising a polymerisable LC medium or a polymer film as described above and below.

Said devices include, without limitation, electro optical displays, LCDs, non-linear optic (NLO) devices, optical information storage devices, electronic devices, electroluminescent displays, organic photovoltaic (OPV) devices, lighting devices, sensor devices, electro photographic recording devices, organic memory devices.

Said components include, without limitation optical films, retarders, compensators, polarisers, beam splitters, reflective films, alignment layers, colour filters, holographic elements, hot stamping foils, colored images, decorative or security markings, LC pigments, adhesives, organic semiconductors, organic field effect transistors (OFET), integrated circuits (IC), thin film transistors (TFT), Radio Frequency Identification (RFID) tags, organic light emitting diodes (OLED), organic light emitting transistors (OLET), organic solar cells (O—SC), organic laser diodes (O-laser), organic integrated circuits (O—IC), electrode materials, photoconductors, photodetectors, capacitors, charge injection layers, Schottky diodes, planarising layers, antistatic films, conducting substrates, conducting patterns, photoconductors, electro photographic applications, electro photographic recording, biosensors, biochips.

Terms and Definitions

As used herein, the term "polymer" will be understood to mean a molecule that encompasses a backbone of one or more distinct types of repeating units (the smallest constitutional unit of the molecule) and is inclusive of the commonly known terms "oligomer", "copolymer", "homopolymer" and the like. Further, it will be understood that the term polymer is inclusive of, in addition to the polymer itself, residues from initiators, catalysts, and other elements attendant to the synthesis of such a polymer, where such residues are understood as not being covalently incorporated thereto. Further, such residues and other elements, while normally removed during post polymerisation purification processes, are typically mixed or co-mingled with the polymer such that they generally remain with the polymer when it is transferred between vessels or between solvents or dispersion media.

The term "(meth)acrylic polymer" as used in the present invention includes a polymer obtained from acrylic monomers, a polymer obtainable from methacrylic monomers, and a corresponding co-polymer obtainable from mixtures of such monomers.

The term "polymerisation" means the chemical process to form a polymer by bonding together multiple polymerisable groups or polymer precursors (polymerisable compounds) containing such polymerisable groups.

The terms "film" and "layer" include rigid or flexible, self-supporting or freestanding films with mechanical stability, as well as coatings or layers on a supporting substrate or between two substrates.

The term "liquid crystal or mesogenic compound" means a compound comprising one or more calamitic (rod- or board/lath-shaped) or discotic (disk-shaped) mesogenic groups. The term "mesogenic group" means a group with the ability to induce liquid crystal (LC) phase behaviour. The compounds comprising mesogenic groups do not necessarily have to exhibit an LC phase themselves. It is also possible that they show LC phase behaviour only in mixtures with other compounds, or when the mesogenic compounds or materials, or the mixtures thereof, are polymerised. For the sake of simplicity, the term "liquid crystal" is used hereinafter for both mesogenic and LC materials. For an overview of definitions see C. Tschierske, G. Pelzl and S. Diele, Angew. Chem. 2004, 116, 6340-6368.

A calamitic mesogenic group is usually comprising a mesogenic core consisting of one or more aromatic or non-aromatic cyclic groups connected to each other directly or via linkage groups, optionally comprising terminal groups attached to the ends of the mesogenic core, and optionally comprising one or more lateral groups attached to the long side of the mesogenic core, wherein these terminal and lateral groups are usually selected e.g. from carbyl or hydrocarbyl groups, polar groups like halogen, nitro, hydroxy, etc., or polymerisable groups.

The term "reactive mesogen" (RM) means a polymerisable mesogenic or liquid crystal compound.

Polymerisable compounds with one polymerisable group are also referred to as "monoreactive" compounds, compounds with two polymerisable groups as "direactive" compounds, and compounds with more than two polymerisable groups as "multireactive" compounds. Compounds without a polymerisable group are also referred to as "non-reactive" compounds.

The term "polymerisable LC material" means a material, which comprises of more than 90% by weight, preferably more than 95% by weight, more preferably more than 98% by weight of polymerisable compounds, as described above and below.

The term "non-mesogenic compound or material" means a compound or material that does not contain a mesogenic group as defined above.

Visible light is electromagnetic radiation that has wavelength in a range from about 400 nm to about 740 nm. Ultraviolet (UV) light is electromagnetic radiation with a wavelength in a range from about 200 nm to about 450 nm.

The Irradiance ($E_e$) or radiation power is defined as the power of electromagnetic radiation ($d\Theta$) per unit area ($dA$) incident on a surface:

$$E_e = d\Theta/dA.$$

The radiant exposure or radiation dose ($H_e$), is as the irradiance or radiation power ($E_e$) per time (t):

$$H_e = E_e \cdot t.$$

All temperatures, such as, for example, the melting point T(C,N) or T(C,S), the transition from the smectic (S) to the nematic (N) phase T(S,N) and the clearing point T(N,I) of the liquid crystals, are quoted in degrees Celsius. All temperature differences are quoted in differential degrees.

The term "clearing point" means the temperature at which the transition between the mesophase with the highest temperature range and the isotropic phase occurs.

The term "director" is known in prior art and means the preferred orientation direction of the long molecular axes (in case of calamitic compounds) or short molecular axes (in case of discotic compounds) of the liquid-crystalline or RM molecules. In case of uniaxial ordering of such anisotropic molecules, the director is the axis of anisotropy.

All physical properties have been and are determined according to "Merck Liquid Crystals, Physical Properties of Liquid Crystals", Status November 1997, Merck KGaA, Germany and are given for a temperature of 20° C., unless explicitly stated otherwise. The optical anisotropy ($\Delta n$) is determined at a wavelength of 589.3 nm In case of doubt the definitions as given in C. Tschierske, G. Pelzl and S. Diele, Angew. Chem. 2004, 116, 6340-6368 shall apply.

Unless explicitly stated otherwise in the given generic formulae, the following terms have the following meanings:

"Carbyl group" denotes a mono- or polyvalent organic group containing at least one carbon atom which either contains no further atoms (such as, for example, —C≡C—) or optionally contains one or more further atoms, such as, for example, N, O, S, P, Si, Se, As, Te or Ge (for example carbonyl, etc.). "Hydrocarbyl group" denotes a carbyl group, which additionally contains one or more H atoms and optionally one or more heteroatoms, such as, for example, N, O, S, P, Si, Se, As, Te or Ge.

A carbyl or hydrocarbyl group can be a saturated or unsaturated group. Unsaturated groups are, for example, aryl, alkenyl, or alkinyl groups. A carbyl or hydrocarbyl group having more than 3 C atoms can be straight chain, branched and/or cyclic and may contain spiro links or condensed rings.

Preferred carbyl and hydrocarbyl groups are optionally substituted alkyl, alkenyl, alkinyl, alkoxy, alkylcarbonyl, alkoxycarbonyl, alkylcarbonyloxy and alkoxycarbonyloxy having 1 to 40, preferably 1 to 25, particularly preferably 1 to 18 C atoms, optionally substituted aryl or aryloxy having 6 to 40, preferably 6 to 25 C atoms, or optionally substituted alkylaryl, arylalkyl, alkylaryloxy, arylalkyloxy, arylcarbonyl, aryloxycarbonyl, arylcarbonyloxy and aryloxycarbonyloxy having 6 to 40, preferably 6 to 25 C atoms. Further preferred carbyl and hydrocarbyl groups are $C_1$-$C_{40}$ alkyl, $C_2$-$C_{40}$ alkenyl, $C_2$-$C_{40}$ alkinyl, $C_3$-$C_{40}$ allyl, $C_4$-$C_{40}$ alkyldienyl, $C_4$-$C_{40}$ polyenyl, $C_6$-$C_{40}$ aryl, $C_6$-$C_{40}$ alkylaryl, $C_6$-$C_{40}$ arylalkyl, $C_6$-$C_{40}$ alkylaryloxy, $C_6$-$C_{40}$ arylalkyloxy, $C_2$-$C_{40}$ heteroaryl, $C_4$-$C_{40}$ cycloalkyl, $C_4$-$C_{40}$ cycloalkenyl, etc. Particular preference is given to $C_1$-$C_{22}$ alkyl, $C_2$-$C_{22}$ alkenyl, $C_2$-$C_{22}$ alkinyl, $C_3$-$C_{22}$ allyl, $C_4$-$C_{22}$ alkyldienyl, $C_6$-$C_{12}$ aryl, $C_6$-$C_{20}$ arylalkyl, and $C_2$-$C_{20}$ heteroaryl.

Further preferred carbyl and hydrocarbyl groups are straight-chain, branched or cyclic alkyl radicals having 1 to 40, preferably 1 to 25 C atoms, more preferably 1 to 12 C atoms, which are unsubstituted or mono- or polysubstituted by F, Cl, Br, I or CN and in which one or more non-adjacent $CH_2$ groups may each be replaced, independently of one another, by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another.

Above, $R^x$ preferably denotes H, halogen, a straight-chain, branched or cyclic alkyl chain having 1 to 25 C atoms, in which, in addition, one or more non-adjacent C atoms may be replaced by —O—, —S—, —CO—, —CO—O—, —O—CO—, —O—CO—O—, and in which one or more H atoms may be replaced by fluorine, an optionally substituted aryl or aryloxy group having 6 to 40 C atoms or an optionally substituted heteroaryl or heteroaryloxy group having 2 to 40 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, n-hexyl, 2-ethylhexyl, n-heptyl, n-octyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkinyl groups are, for example, ethynyl, propynyl, butynyl, pentynyl, hexynyl, octynyl, etc.

Preferred alkoxy groups are, for example, methoxy, ethoxy, 2-methoxy-ethoxy, n-propoxy, i-propoxy, n-butoxy, i-butoxy, s-butoxy, t-butoxy, 2-methylbutoxy, n-pentoxy, n-hexoxy, n-heptyloxy, n-octyloxy, n-nonyloxy, n-decyloxy, n-undecyloxy, n-dodecyloxy, etc.

Preferred amino groups are, for example, dimethylamino, methylamino, methylphenylamino, phenylamino, etc.

Aryl and heteroaryl groups can be monocyclic or polycyclic, i.e. they can have one ring (such as, for example, phenyl) or two or more rings, which may also be fused (such as, for example, naphthyl) or covalently linked (such as, for example, biphenyl), or contain a combination of fused and linked rings. Heteroaryl groups contain one or more heteroatoms, preferably selected from O, N, S and Se.

Particular preference is given to mono-, bi-, or tricyclic aryl groups having 6 to 25 C atoms and mono-, bi- or tricyclic heteroaryl groups having 2 to 25 C atoms, which optionally contain fused rings and which are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another.

Preferred aryl groups are, for example, phenyl, biphenyl, terphenyl, [1,1':3',1"]terphenyl-2'-yl, naphthyl, anthracene, binaphthyl, phenanthrene, pyrene, dihydropyrene, chrysene, perylene, tetracene, pentacene, benzo-pyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, iso-indole, indolizine, indazole, benzimidazole, benzotriazole, purine, naphth-imidazole, phenanthrimidazole, pyridimidazole, pyrazinimidazole, quinoxa-linimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, isobenzothiophene, dibenzothiophene, benzothiadiazothiophene, or combinations of these groups. The heteroaryl groups may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those that contain exclusively single bonds, and partially unsaturated rings, i.e. those that may also contain multiple bonds. Heterocyclic rings contain one or more heteroatoms, preferably selected from Si, O, N, S and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi-, or tricyclic groups having 3 to 25 C atoms, which optionally contain fused rings and which are optionally substituted. Preference is furthermore given to 5-, 6-, 7- or 8-membered carbocyclic groups in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl.

The aryl, heteroaryl, (non-aromatic) alicyclic and heterocyclic groups optionally have one or more substituents, which are preferably selected from the group comprising silyl, sulfo, sulfonyl, formyl, amine, imine, nitrile, mercapto, nitro, halogen, $C_1$-$C_{12}$ alkyl, $C_6$-$C_{12}$ aryl, $C_1$-$C_{12}$ alkoxy, hydroxyl, or combinations of these groups.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents, also referred to as "L" below, are, for example, F, Cl, Br, I, —OH, —CN, —$NO_2$, —NCO, —NCS, —OCN, —SCN, —C(=O)N($R^x$)$_2$, —C(=O)$Y^x$, —C(=O)$R^x$, —C(=O)O$R^x$, —N($R^x$)$_2$, in which $R^x$ has the above-mentioned meaning, and above $Y^x$ denotes halogen, optionally substituted silyl, optionally substituted aryl or heteroaryl having 4 to 40, preferably 4 to 20 ring atoms, and straight-chain or branched alkyl, alkenyl, alkinyl, alkoxy, alkylcarbonyl, alkoxycarbonyl, alkylcarbonyloxy or alkoxycarbonyloxy having 1 to 25 C atoms, in which one or more H atoms may optionally be replaced by F or Cl.

"Substituted silyl or aryl" preferably means substituted by halogen, —CN, $R^y$, —O$R^y$, —CO—$R^y$, —CO—O—$R^y$, —O—CO—$R^y$ or —O—CO—O—$R^y$, in which $R^y$ denotes H, a straight-chain, branched or cyclic alkyl chain having 1 to 12 C atoms.

In the formula shown above and below, a substituted phenylene ring

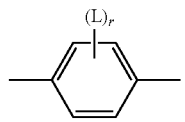

is preferably

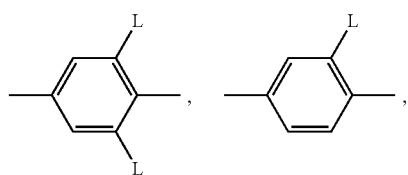

-continued

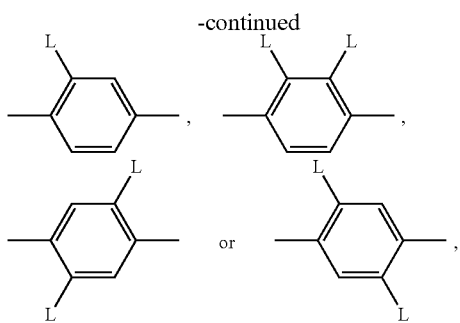

in which L has, on each occurrence identically or differently, one of the meanings given above and below, and is preferably F, Cl, CN, NO$_2$, CH$_3$, C$_2$H$_5$, C(CH$_3$)$_3$, CH(CH$_3$)$_2$, CH$_2$CH(CH$_3$)C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$ or P-Sp-, very preferably F, Cl, CN, CH$_3$, C$_2$H$_5$, OCH$_3$, COCH$_3$, OCF$_3$ or P-Sp-, most preferably F, Cl, CH$_3$, OCH$_3$, COCH$_3$ or OCF$_3$.

"Halogen" denotes F, Cl, Br or I, preferably F or Cl, more preferably F.

"Polymerisable groups" (P) are preferably selected from groups containing a C=C double bond or C≡C triple bond, and groups which are suitable for polymerisation with ring opening, such as, for example, oxetane or epoxide groups.

Preferably, polymerisable groups (P) are selected from the group consisting of CH$_2$=CW$^1$—COO—, CH$_2$=CW$^1$—CO—,

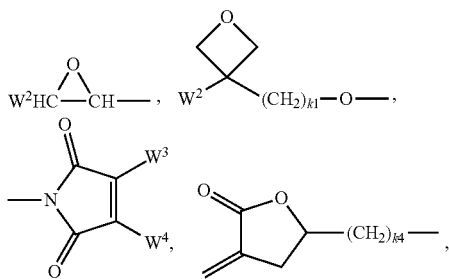

CH$_2$=CW$^2$—(O)$_{k3}$—, CW$^1$=CH—CO—(O)$_{k3}$—, CW$^1$=CH—CO—NH—, CH$_2$=CW$^1$—CO—NH—, CH$_3$—CH=CH—O—, (CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, CH$_2$=CW$^1$—CO—NH—, CH$_2$=CH—(COO)$_{k1}$-Phe-(O)$_{k2}$—, CH$_2$=CH—(CO)$_{k1}$-Phe-(O)$_{k2}$—, Phe-CH=CH—, in which W$^1$ denotes H, F, Cl, CN, CF$_3$, phenyl or alkyl having 1 to 5 C atoms, in particular H, F, Cl or CH$_3$, W$^2$ denotes H or alkyl having 1 to 5 C atoms, in particular H, methyl, ethyl or n-propyl, W$^3$ and W$^4$ each, independently of one another, denote H, Cl or alkyl having 1 to 5 C atoms, Phe denotes 1,4-phenylene, which is optionally substituted by one or more radicals L as being defined above but being different from P-Sp, preferably preferred substituents L are F, Cl, CN, NO$_2$, CH$_3$, C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$, furthermore phenyl, and k$_1$, k$_2$ and k$_3$ each, independently of one another, denote 0 or 1, k$_3$ preferably denotes 1, and k$_4$ is an integer from 1 to 10.

Particularly preferred polymerizable groups P are CH$_2$=CH—COO—, CH$_2$=C(CH$_3$)—COO—, CH$_2$=CF—COO—, CH$_2$=CH—, CH$_2$=CH—O—, (CH$_2$=CH)$_2$CH—OCO—, (CH$_2$=CH)$_2$CH—O—,

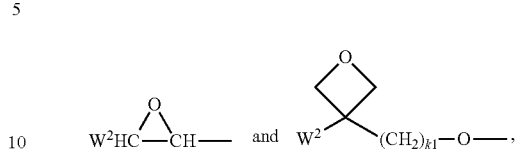

in which W$^2$ denotes H or alkyl having 1 to 5 C atoms, in particular H, methyl, ethyl or n-propyl, Further preferred polymerizable groups (P) are vinyloxy, acrylate, methacrylate, fluoroacrylate, chloroacrylate, oxetane and epoxide, most preferably acrylate or methacrylate, in particular acrylate.

Preferably, all multireactive polymerisable compounds and sub-formulae thereof contain instead of one or more radicals P-Sp-, one or more branched radicals containing two or more polymerisable groups P (multireactive polymerisable radicals).

Suitable radicals of this type, and polymerisable compounds containing them, are described, for example, in U.S. Pat. No. 7,060,200 B1 or US 2006/0172090 A1.

Particular preference is given to multireactive polymerisable radicals selected from the following formulae:

| | |
|---|---|
| —X-alkyl-CHP$^x$—CH$_2$—CH$_2$P$^y$ | I*a |
| —X-alkyl-C(CH$_2$P$^x$)(CH$_2$P$^y$)—CH$_2$P$^z$ | I*b |
| —X-alkyl-CHP$^x$CHP$^y$—CH$_2$P$^z$ | I*c |
| —X-alkyl-C(CH$_2$P$^x$)(CH$_2$P$^y$)—C$_{aa}$H$_{2aa+1}$ | I*d |
| —X-alkyl-CHP$^x$—CH$_2$P$^y$ | I*e |
| —X-alkyl-CHP$^x$P$^y$ | I*f |
| —X-alkyl-CP$^x$P$^y$—C$_{aa}$H$_{2aa+1}$ | I*g |
| —X-alkyl-C(CH$_2$P$^x$)(CH$_2$P$^y$)—CH$_2$OCH$_2$—C(CH$_2$P$^x$)(CH$_2$Py)CH$_2$P$^z$ | I*h |
| —X-alkyl-CH((CH$_2$)$_{aa}$P$^x$)((CH$_2$)$_{bb}$P$^y$) | I*i |
| —X-alkyl-CHP$^x$CHP$^y$—C$_{aa}$H$_{2aa+1}$ | I*k | in which alkyl denotes a single bond or straight-chain or branched alkylene having 1 to 12 C atoms, in which one or more non-adjacent CH$_2$ groups may each be replaced, independently of one another, by —C(R$^x$)=C(R$^x$)—, —C≡C—, —N(R$^x$)—, —O—, —S—, —CO—, —CO—O—, —O—CO—, —O—CO—O— in such a way that O and/or S atoms are not linked directly to one another, and in which, in addition, one or more H atoms may be replaced by F, Cl or CN, where R$^x$ has one the above-mentioned meaning, $aa$ and $bb$ each, independently of one another, denote 0, 1, 2, 3, 4, 5 or 6, X has one of the meanings indicated for X', and P$^y$ to P$^z$ each, independently of one another, have one of the meanings indicated above for P.

Preferred spacer groups Sp are selected from the formula Sp'-X', so that the radical "P-Sp-" conforms to the formula "P-Sp'-X'—", where

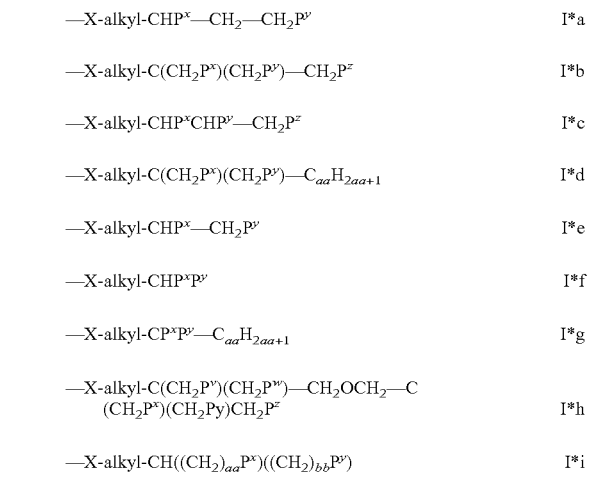

Sp' denotes alkylene having 1 to 20, preferably 1 to 12 C atoms, which is optionally mono- or polysubstituted by F, Cl, Br, I or CN and in which, in addition, one or more non-adjacent CH$_2$ groups may each be replaced, independently of one another, by —O—, —S—, —NH—, —NR$^{xx}$—, —SiR$^{xx}$R$^{yy}$—, —CO—, —COO—, —OCO—, —OCO—O—, —S—CO—, —CO—S—, —NR$^{xx}$—CO—O—, —O—CO—NR$^{Oxx}$—, —NR$^{xx}$—CO—NR$^{yy}$—, —CH=CH— or —C≡C— in such a way that O and/or S atoms are not linked directly to one another, X' denotes —O—, —S—, —CO—, —COO—, —OCO—, —O—COO—, —CO—NR$^{xx}$—, —NR$^{xx}$—CO—, —NR$^{xx}$—CO—NR$^{yy}$—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^{xx}$—, —CY$^{xx}$=CY$^{xx}$—, —C≡C—, —CH=CH—COO—, —OCO—CH=CH— or a single bond, R$^{xx}$ and R$^{yy}$ each, independently of one another, denote H or alkyl having 1 to 12 C atoms, and Y$^{xx}$ and Y$^{yy}$ each, independently of one another, denote H, F, Cl or CN.

X' is preferably —O—, —S— —CO—, —COO—, —OCO—, —O—COO—, —CO—NR$^{xx}$—, —NR$^{xx}$—CO—, —NR$^{xx}$—CO—NR$^{yy}$— or a single bond.

Typical spacer groups Sp' are, for example, —(CH$_2$)$_{p1}$—, —(CH$_2$CH$_2$O)$_{q1}$—CH$_2$CH$_2$—, —CH$_2$CH$_2$—S—CH$_2$CH$_2$—, —CH$_2$CH$_2$—NH—CH$_2$CH$_2$— or —(SiR$^{xx}$R$^{yy}$—O)$_{p1}$—, in which p1 is an integer from 1 to 12, q1 is an integer from 1 to 3, and R$^{xx}$ and R$^{yy}$ have the above-mentioned meanings.

Particularly preferred groups —X'-Sp'- are —(CH$_2$)$_{p1}$—, —O—(CH$_2$)$_{p1}$—, —COO—(CH$_2$)$_{p1}$—, —OCOO—(CH$_2$)$_{p1}$—, in which p1 is an integer from 1 to 12.

Particularly preferred groups Sp' are, for example, in each case straight-chain, methylene, ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

For the present invention,

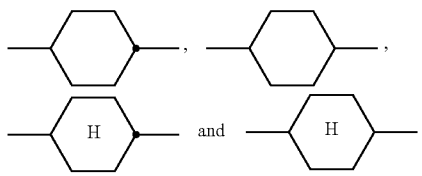

denote trans-1,4-cyclohexylene, and

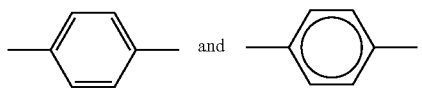

denote 1,4-phenylene.

For the present invention the groups —COO— —C(=O)O— or —CO$_2$— denote an ester group of formula

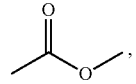

and the groups —OCO—, —OC(=O)—, —O$_2$C— or —OOC— denote an ester group of formula

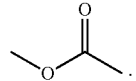

On the molecular level, the birefringence of a liquid crystal depends on the anisotropy of the polarizability ($\Delta\alpha=\alpha_\parallel-\alpha_\perp$). "Polarizability" means the ease with which the electron distribution in the atom or molecule can be distorted. The polarizability increases with greater number of electrons and a more diffuse electron cloud. The polarizability can be calculated using a method described in e.g. Jap. J. Appl. Phys. 42, (2003) p. 3463.

The "optical retardation" at a given wavelength R(λ) (in nm) of a layer of liquid crystalline or birefringent material is defined as the product of birefringence at that wavelength Δn(λ) and layer thickness d (in nm) according to the equation $$R(\lambda)=\Delta n(\lambda)\cdot d$$

The optical retardation R represents the difference in the optical path lengths in nanometres travelled by S-polarised and P-polarised light whilst passing through the birefringent material. "On-axis" retardation means the retardation at normal incidence to the sample surface.

The term "negative (optical) dispersion" refers to a birefringent or liquid crystalline material or layer that exhibits reverse birefringence dispersion where the magnitude of the birefringence (Δn) increases with increasing wavelength (λ). i.e. |Δn(450)|<|Δn(550)|, or Δn(450)/Δn(550)<1, where Δn(450) and Δn(550) are the birefringence of the material measured at wavelengths of 450 nm and 550 nm respectively. In contrast, positive (optical) dispersion" means a material or layer having |Δn(450)|>|Δn(550)| or Δn(450)/Δn(550)>1. See also for example A. Uchiyama, T. Yatabe "Control of Wavelength Dispersion of Birefringence for Oriented Copolycarbonate Films Containing Positive and Negative Birefringent Units". J. Appl. Phys. Vol. 42 pp 6941-6945 (2003). "Flat (optical) dispersion" means a material or layer having |Δn(450)|>|Δn(550)| or Δn(450)/Δn(550)≈1.

Since the optical retardation at a given wavelength is defined as the product of birefringence and layer thickness as described above [R(λ)=Δn(λ)·d], the optical dispersion can be expressed either as the "birefringence dispersion" by the ratio Δn(450)/Δn(550), or as "retardation dispersion" by the ratio R(450)/R(550), wherein R(450) and R(550) are the retardation of the material measured at wavelengths of 450 nm and 550 nm respectively. Since the layer thickness d does not change with the wavelength, R(450)/R(550) is equal to Δn(450)/Δn(550). Thus, a material or layer with negative or reverse dispersion has R(450)/R(550)<1 or |R(450)|<|R(550)|, a material or layer with positive or normal dispersion has R(450)/R(550)>1 or |R(450)|>|R (550)|, and a material or layer with flat dispersion has R(450)/R(550)≈1 or |R(450)|≈|R(550)|.

In the present invention, unless stated otherwise "optical dispersion" means the retardation dispersion i.e. the ratio R(450)/R(550).

The term "high dispersion" means that the absolute value of the dispersion shows a large deviation from 1, whereas the term "low dispersion" means that the absolute value of the dispersion shows a small deviation from 1. Thus, for example, "high negative dispersion" means that the dispersion value is significantly smaller than 1, and "low negative dispersion" means that the dispersion value is only slightly smaller than 1.

The retardation (R(λ)) of a material can be measured using a spectroscopic ellipsometer, for example the M2000 spectroscopic ellipsometer manufactured by J. A. Woollam Co., This instrument is capable of measuring the optical retardance in nanometres of a birefringent sample e.g. Quartz over a range of wavelengths typically, 370 nm to 2000 nm. From this data it is possible to calculate the dispersion (R(450)/R(550) or Δn(450)/Δn(550)) of a material.

A method for carrying out these measurements was presented at the National Physics Laboratory (London, UK) by N. Singh in October 2006 and entitled "Spectroscopic Ellipsometry, Part 1—Theory and Fundamentals, Part 2—Practical Examples and Part 3—measurements". In accordance with the measurement procedures described Retardation Measurement (RetMeas) Manual (2002) and Guide to WVASE (2002) (Woollam Variable Angle Spectroscopic Ellipsometer) published by J. A. Woollam Co. Inc (Lincoln, Nebr., USA). Unless stated otherwise, this method is used to determine the retardation of the materials, films and devices described in this invention.

The term "A plate" refers to an optical retarder utilizing a layer of uniaxially birefringent material with its extraordinary axis oriented parallel to the plane of the layer.

The term "C plate" refers to an optical retarder utilizing a layer of uniaxially birefringent material with its extraordinary axis oriented perpendicular to the plane of the layer. In A/C-plates comprising optically uniaxial birefringent liquid crystal material with uniform orientation, the optical axis of the film is given by the direction of the extraordinary axis. An A (or C) plate comprising optically uniaxial birefringent material with positive birefringence is also referred to as "positive A (or C) plate" or "+A (or +C) plate". An A (or C) plate comprising a film of optically uniaxial birefringent material with negative birefringence, such as discotic anisotropic materials is also referred to as "negative A (or C) plate" or "– A (or C) plate" depending on the orientation of the discotic materials. A film made from a cholesteric calamitic material with a reflection band in the UV part of the spectrum also has the optics of a negative C plate.

The birefringence Δn is defined as follows $$\Delta n = n_e - n_o$$

wherein $n_e$ is the extraordinary refractive index and $n_o$ is the ordinary refractive index, and the effective average refractive index $n_{av.}$ is given by the following equation:

$$n_{av.} = ((2n_o^2 + n_e^2)/3)^{1/2}$$

The average refractive index $n_{av.}$ and the ordinary refractive index $n_o$ can be measured using an Abbe refractometer. Δn can then be calculated from the above equations.

Unless the context clearly indicates otherwise, as used herein plural forms of the terms herein are to be construed as including the singular form and vice versa.

Throughout the description and claims of this specification, the words "comprise" and "contain" and variations of the words, for example "comprising" and "comprises", mean "including but not limited to", and are not intended to (and do not) exclude other components. On the other hand, the word "comprise" also encompasses the term "consisting of" but is not limited to it.

Throughout the description and claims of this specification, the words "obtainable" and "obtained" and variations of the words, mean "including but not limited to", and are not intended to (and do not) exclude other components. On the other hand, the word "obtainable" also encompasses the term "obtained" but is not limited to it.

All concentrations are quoted in percent by weight and relate to the respective mixture as a whole, all tempera-lures are quoted in degrees Celsius and all temperature differences are quoted in differential degrees.

DETAILED DESCRIPTION OF THE INVENTION

Preferably, the polymerisable LC medium comprises one, two or more compounds of formula A, more preferably one compound of formula A.

Preferably, the amount of compounds of formula A in the polymerisable LC medium as a whole is below 20%, preferably between 18-12%, more preferably between 15-10% for avoiding crystallisation issues.

Preferably, the polymerisable LC medium comprises one, two or more compounds of formula I, more preferably one compound of formula I.

Preferably, the amount of compounds of formula I in the polymerisable LC medium as a whole is below 20%, preferably between 18-12%, more preferably between 15-10%.

In a preferred embodiment, the compounds of formula A are selected from the following sub formulae,

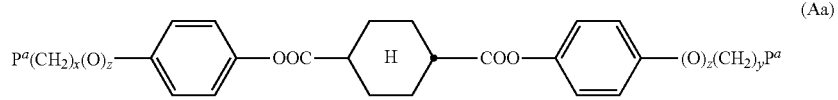

(Aa)

wherein the parameter P has one of the meanings as given above under formula A and x, y, z, are independently of each other 0 or identical or different integers from 1 to 12.

Furthermore, preference is given to a polymerisable LC medium wherein the compounds of formula A are selected from the following sub formulae,

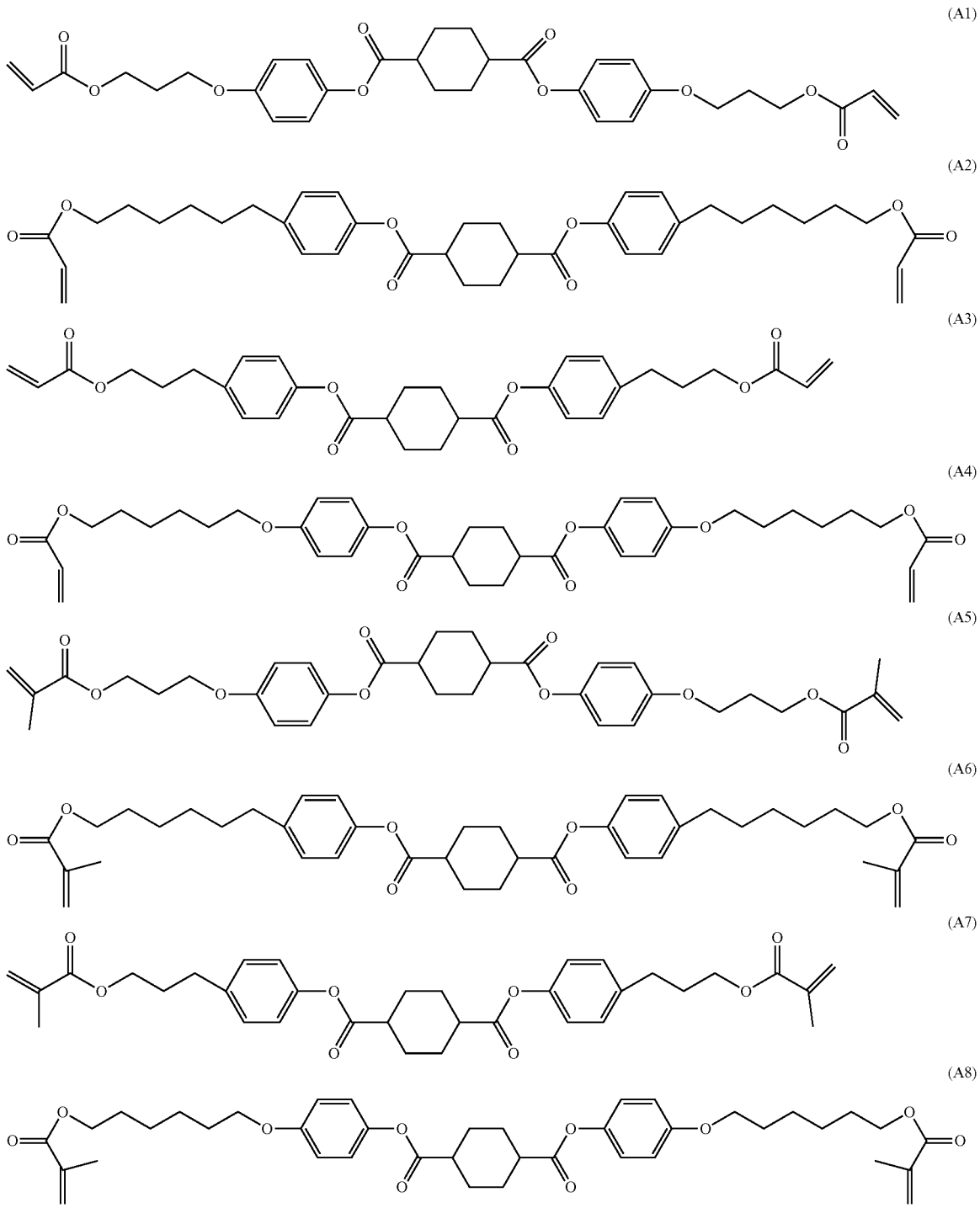

In a further preferred embodiment, the compounds of formula A are selected from the group of compounds of formula A2 or A6, in particular a compound of formula A2.

In another preferred embodiment, the subgroups forming the bridging group B in formula I are preferably selected from groups having a bonding angle of 120° or more, preferably in the range of 180°. Very preferred are —C≡C— groups or divalent aromatic groups connected to their adjacent groups in para-position, like e.g. 1,4-phenylene, naphthalene-2,6-diyl, indane-2,6-diyl or thieno[3,2-b]thiophene-2,5-diyl.

Further possible subgroups include —CH=CH—, —CY$^1$=CY$^2$—, —CH=N—, —N=CH—, —N=N— and —CH=CR$^0$— wherein Y$^1$, Y$^2$, R$^0$ have the meanings given above.

Preferably the bridging group, or —(B)$_q$— in formula I, comprises one or more groups selected from the group consisting of —C≡C—, optionally substituted 1,4-phenylene and optionally substituted 9H-fluorene-2,7-diyl. The subgroups, or B in formula I, are preferably selected from the group consisting of —C≡C—, optionally substituted 1,4-phenylene and optionally substituted 9H-fluorene-2,7-diyl, wherein in the fluorene group the H-atom in 9-position is optionally replaced by a carbyl or hydrocarbyl group.

Very preferably the bridging group, or —(B)$_q$— in formula I, are selected from —C≡C—, —C≡C—C≡C—, —C≡C—C≡C—C≡C—, —C≡C—C≡C—C≡C—C≡C—,

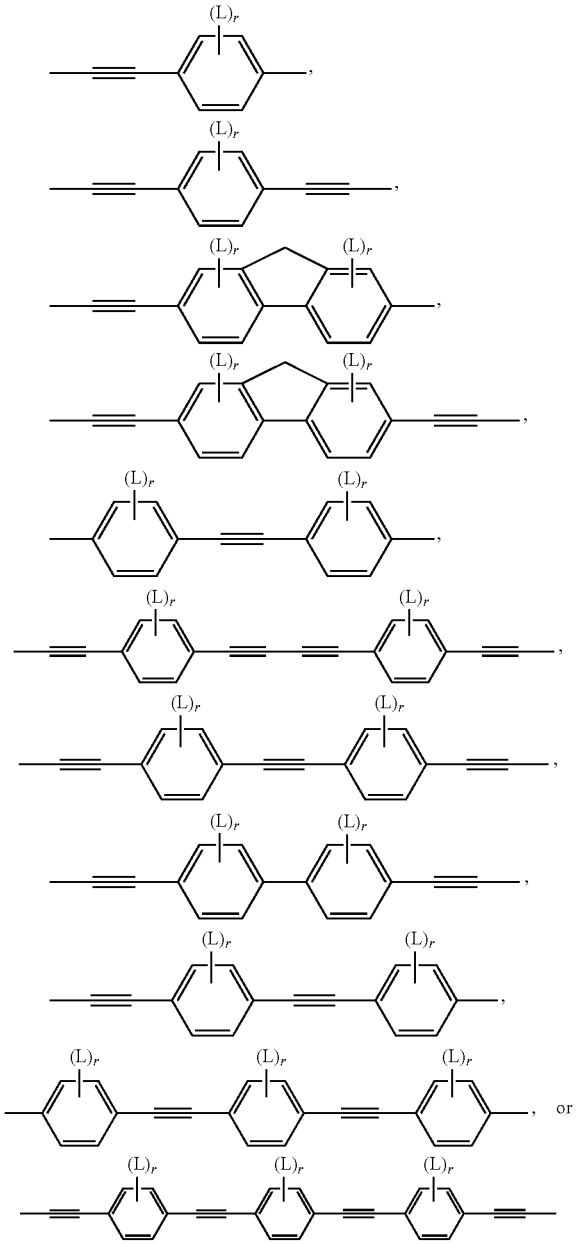

wherein r is 0, 1, 2, 3 or 4 and L has the meaning as described below.

In the guest compounds of the present invention, the non-aromatic rings of the mesogenic groups where the bridging group is attached, like U$^1$ and U$^2$ in formula I, are preferably selected from

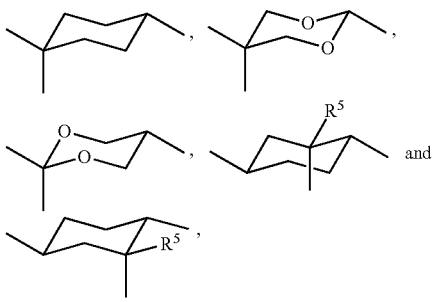

wherein R$^5$ is as defined in formula I.

Preferably, the aromatic groups A$^1$ to A$^4$ in formula I, may be mononuclear, i.e. having only one aromatic ring (like for example phenyl or phenylene), or polynuclear, i.e. having two or more fused rings (like for example napthyl or naphthylene). Especially preferred are mono-, bi- or tricyclic aromatic or heteroaromatic groups with up to 25 C atoms that may also comprise fused rings and are optionally substituted.

Very preferred are compounds of formula I wherein m and p are 1 and n and o are 1 or 2. Further preferred are compounds of formula I wherein m and p are 1 or 2 and n and o are 0. Further preferred are compounds wherein m, n, o and p are 2.

In the compounds of formula I, the linkage groups connecting the aromatic and non-aromatic cyclic groups in the mesogenic groups, or Z$^1$ to Z$^4$, are preferably selected from —O—, —S—, —CO—, —COO—, —OCO—, —O—COO—, —CO—NR$^0$—, —NR$^0$—CO—, —NR$^0$—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_3$—, —(CH$_2$)$_4$—, —CF$_2$CH$_2$—, —CH$_2$CF$_2$—, —CF$_2$CF$_2$—, —CH=CH—, —CY$^1$=CY$^2$—, —CH=N—, —N=CH—, —N=N—, —CH=CR$^0$—, —C≡C—, —CH=CH—COO—, —OCO—CH=CH—, CR$^0$R$^{00}$ or a single bond, very preferably from —COO—, —OCO— and a single bond.

R$^0$ and R$^{00}$ are preferably selected from H, straight-chain or branched alkyl with 1 to 12 C atoms.

—CY$^1$=CY$^2$— is preferably —CH=CH—, —CF=CF— or —CH=C(CN)—.

R$^1$ to R$^5$ can be an achiral or a chiral group. Particularly preferred chiral groups are 2-butyl (=1-methylpropyl), 2-methylbutyl, 2-methylpentyl, 3-methylpentyl, 2-ethylhexyl, 2-propylpentyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-hexyl, 2-octyl, 2-nonyl, 2-decyl, 2-dodecyl, 6-methoxyoctoxy, 6-methyloctoxy, 6-methyloctanoyloxy, 5-methylheptyloxycarbonyl, 2-methylbutyryloxy, 3-methylvaleroyloxy, 4-methylhexanoyloxy, 2-chlorpropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy, 1,1,1-trifluoro-2-octyloxy, 1,1,1-trifluoro-2-octyl, 2-fluoromethyloctyloxy for example. Very preferred are 2-hexyl, 2-octyl, 2-octyloxy, 1,1,1-trifluoro-2-hexyl, 1,1,1-trifluoro-2-octyl and 1,1,1-trifluoro-2-octyloxy.

Preferred achiral branched groups are isopropyl, isobutyl (=methylpropyl), isopentyl (=3-methylbutyl), isopropoxy, 2-methyl-propoxy and 3-methylbutoxy.

In another preferred embodiment the compounds of formula I comprise one or more terminal groups, like $R^1$ to $R^4$, or substituents, like $R^5$, that are substituted by two or more polymerisable groups P or P-Sp-(multifunctional polymerisable groups).
Very preferred compounds of formula I are those of the following sub formulae:
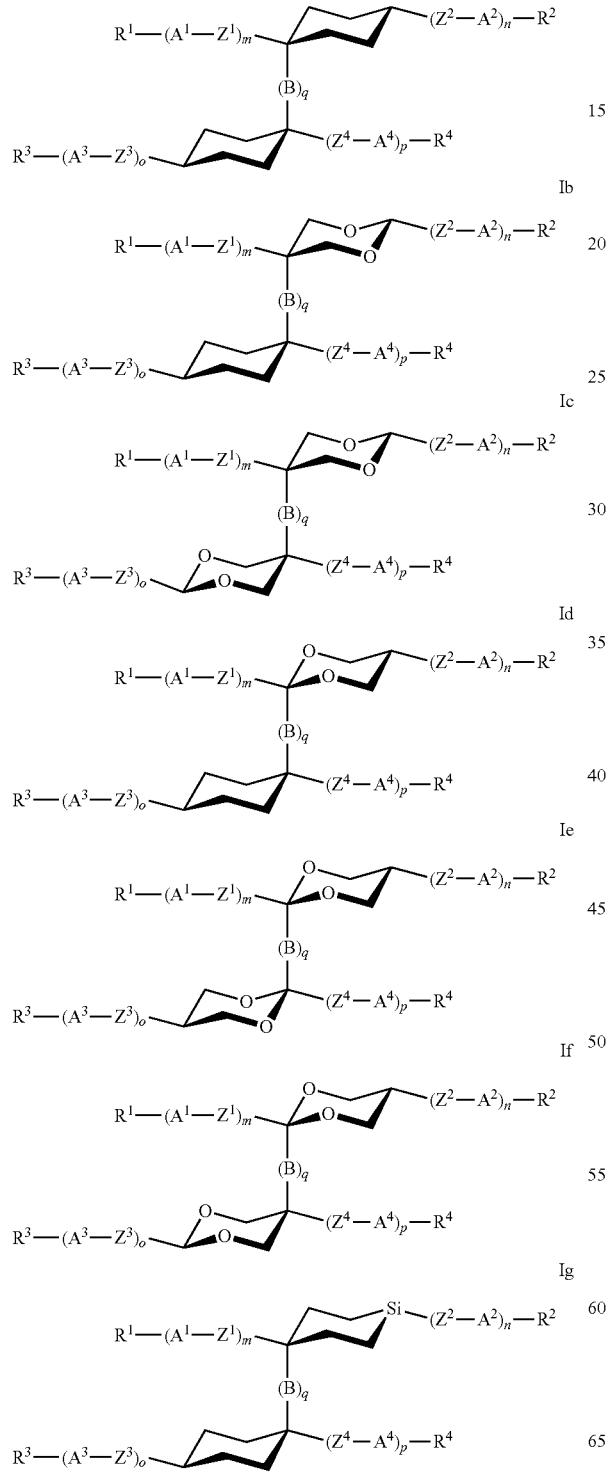
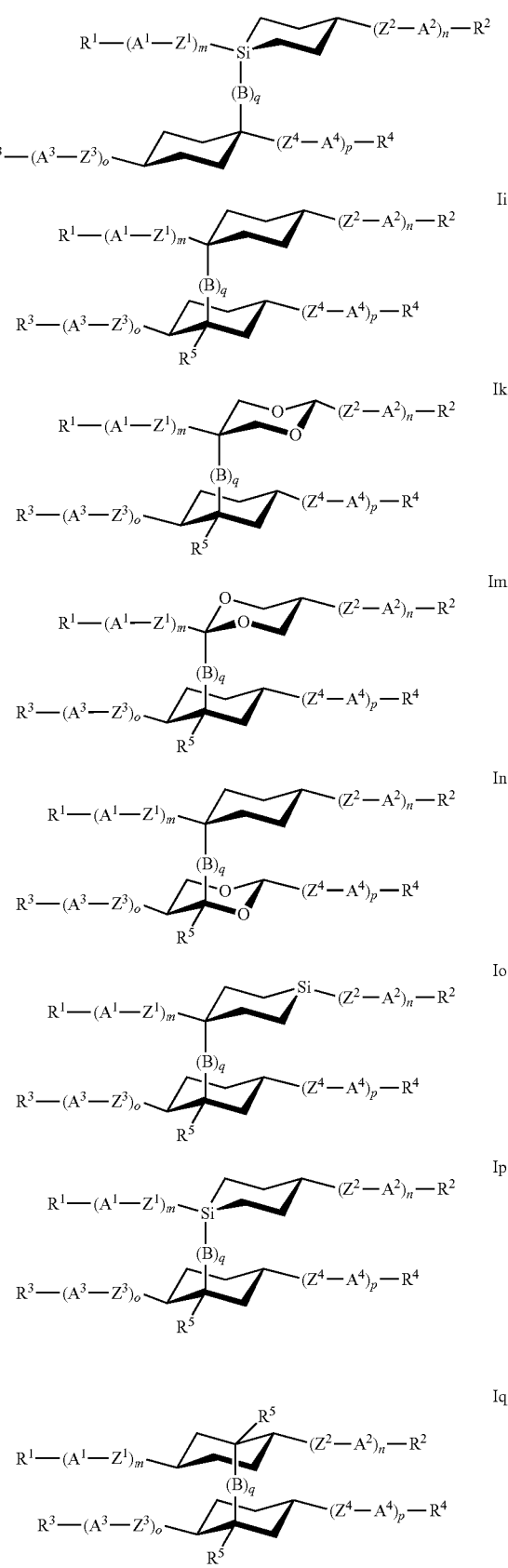

-continued
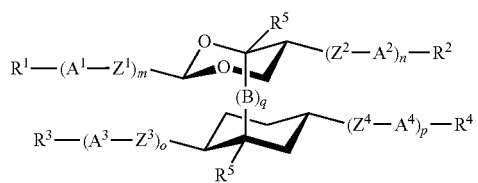  Ir
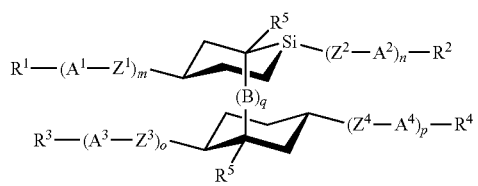  Is
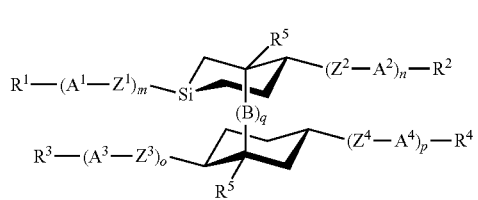  It
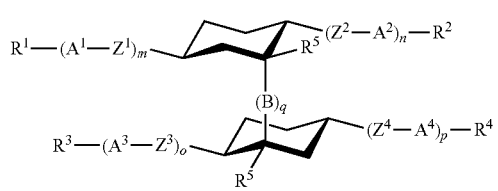  Iu
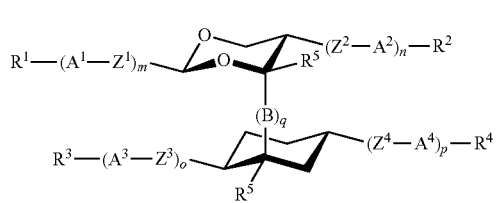  Iv
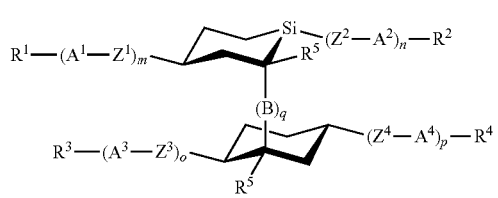  Iw
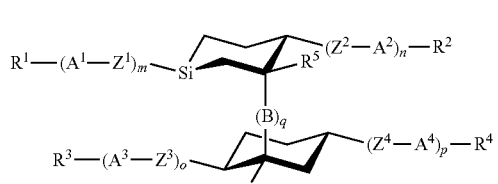  Ix
wherein $R^{1-5}$, $A^{1-4}$, $Z^{1-4}$, B, m, n, o, p and q have one the meanings given above.
Especially preferred are compounds of the following sub formulae:
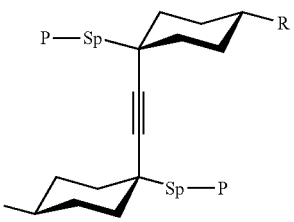  I1
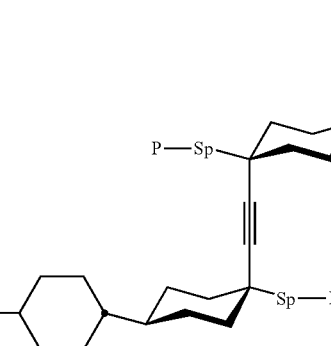  I2
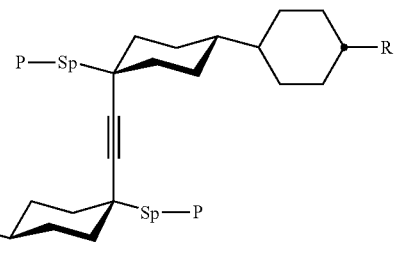  I3
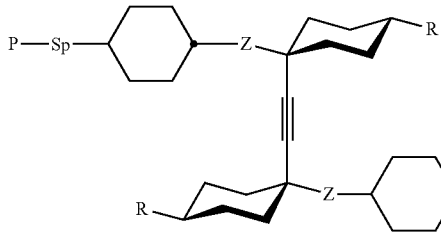  I4
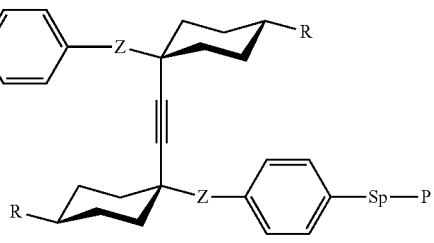  I5
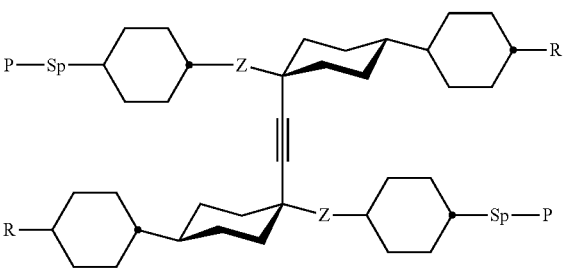

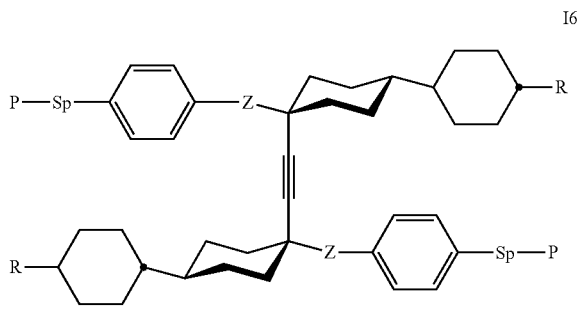
I6
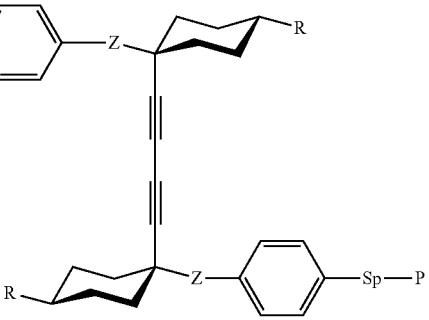
I10
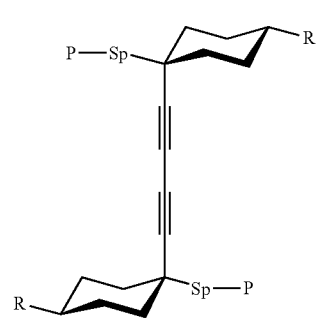
I7
I11
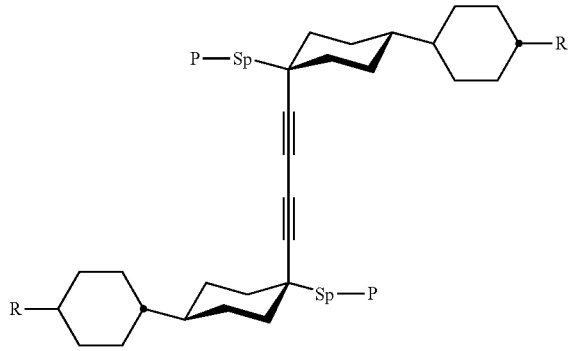
I8
I12
I9
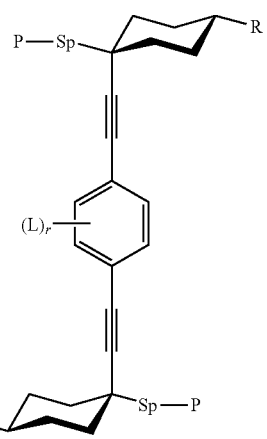
I13

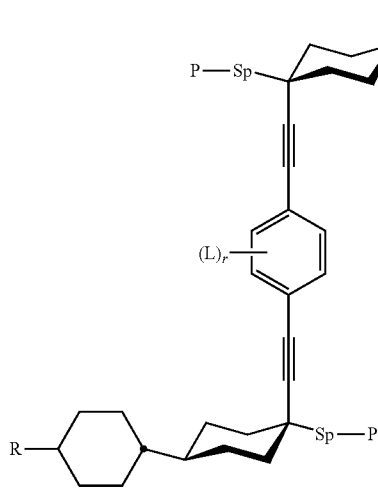
I14
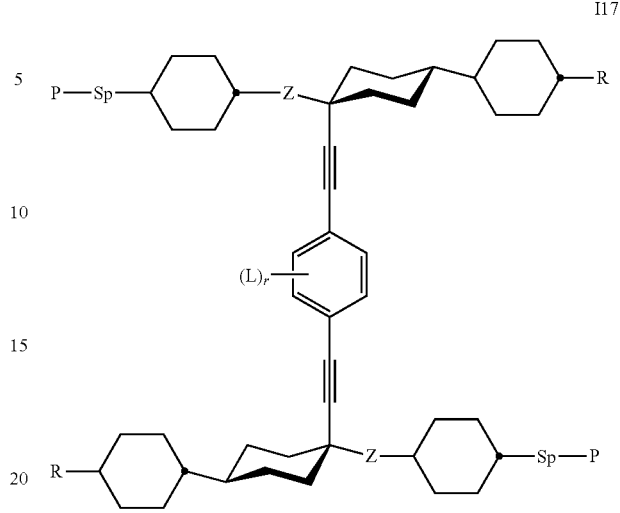
I17
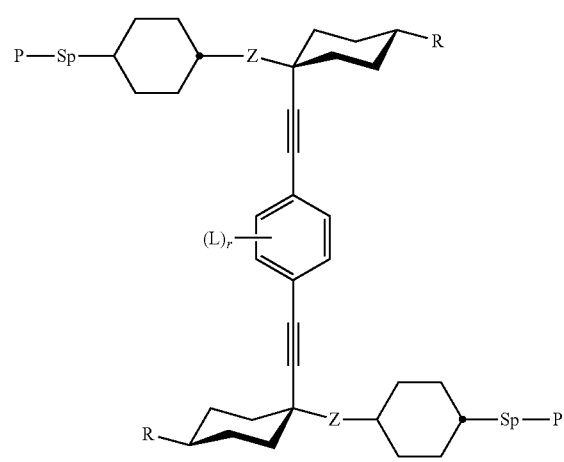
I15
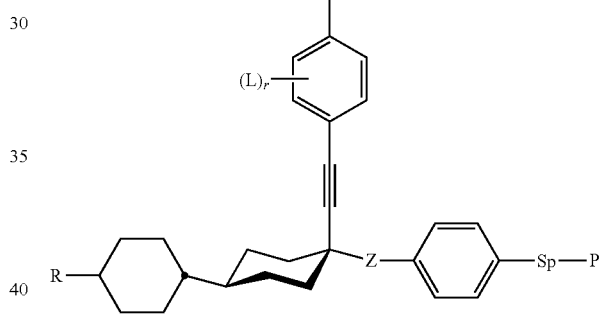
I18
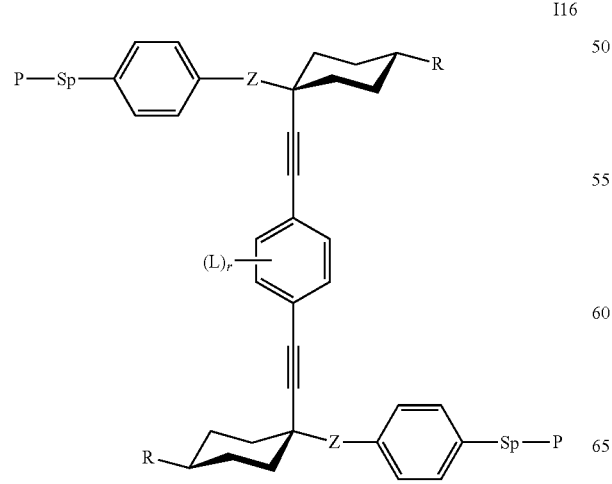
I16
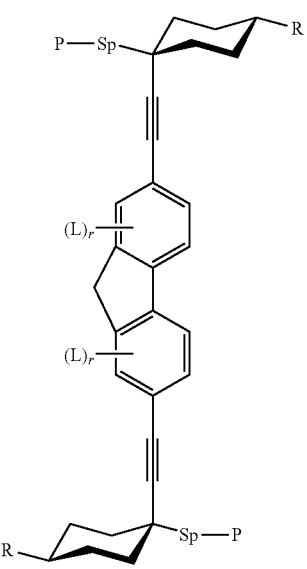
I19

-continued
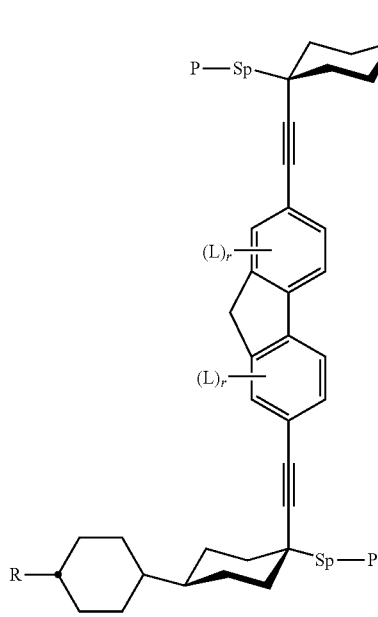
I20
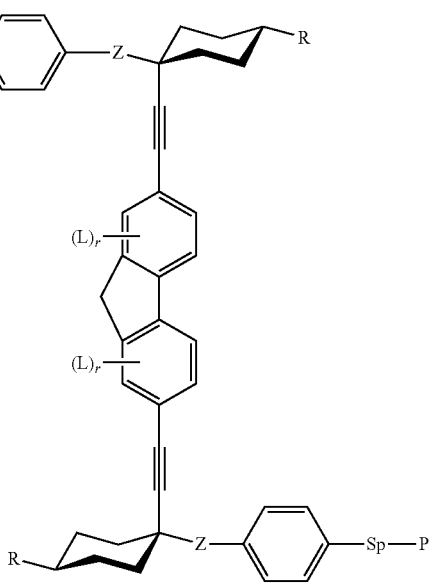
I22
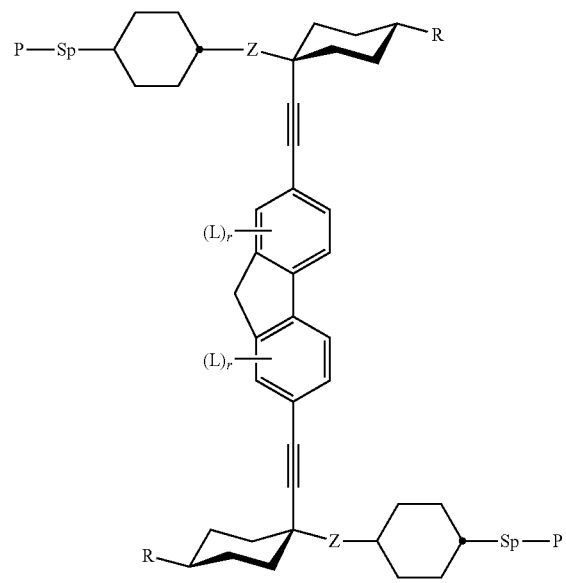
I21
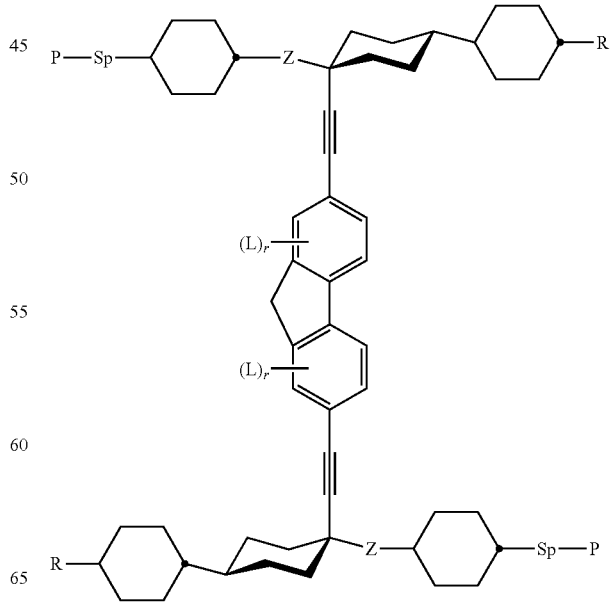
I23

-continued

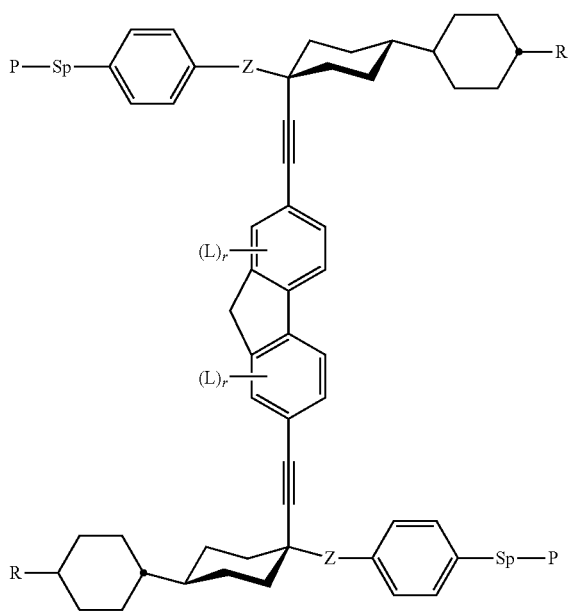

I24

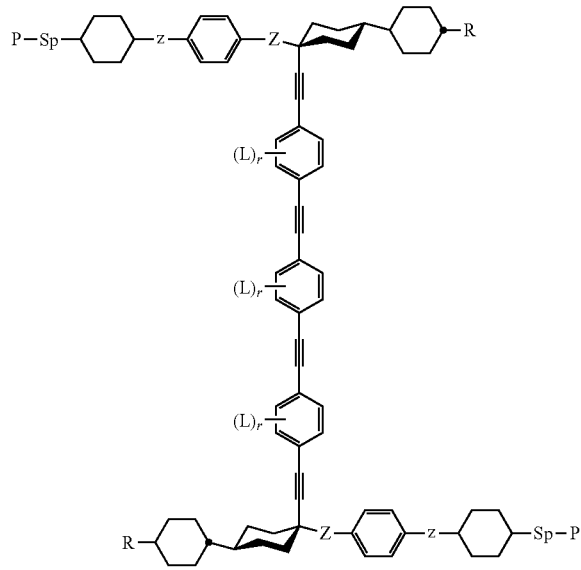

I25

-continued

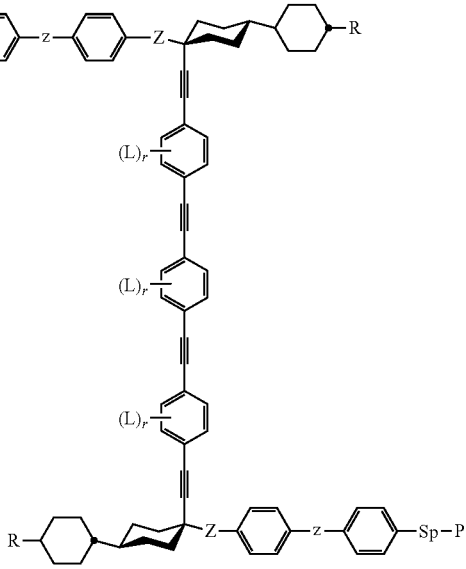

I26 wherein Z has one of the meanings of $Z^1$ given above, R has one of the meanings of $R^1$ as given above that is different from P-Sp-, and P, Sp, L and r are as defined above, and the benzene rings in the mesogenic groups are optionally substituted by one or more groups L as defined above.

Preference is furthermore given to a polymerisable liquid crystalline medium wherein the compounds of formula I are selected from the group of compounds of formula I 25 or I 26, in particular wherein Z denotes —COO—, r is in each occurrence 0, and P, Sp are as defined above.

P-Sp- in these preferred compounds is preferably P-Sp'-X', with X' preferably being —O—, —COO— or —OCOO—.

The compounds of formula I and suitable methods for their synthesis are disclosed in WO 2008/119427 A1.

Additionally, further polymerisable compounds can be added to the polymerisable LC material in accordance with the present invention. These compounds are preferably mesogenic or liquid crystalline. More preferably the LC material comprises one or more additional compounds selected from reactive mesogens (RMs), most preferably selected from mono- and direactive RMs.

The additional RMs can be prepared by methods which are known per se and which are described in standard works of organic chemistry like for example Houben-Weyl, Methoden der organischen Chemie, Thieme-Verlag, Stuttgart. Suitable RMs are disclosed for example in WO 93/22397, EP 0 261 712, DE 195 04 224, WO 95/22586, WO 97/00600, U.S. Pat. Nos. 5,518,652, 5,750,051, 5,770,107 and 6,514,578. Examples of particularly suitable and preferred RMs are shown in the following list.

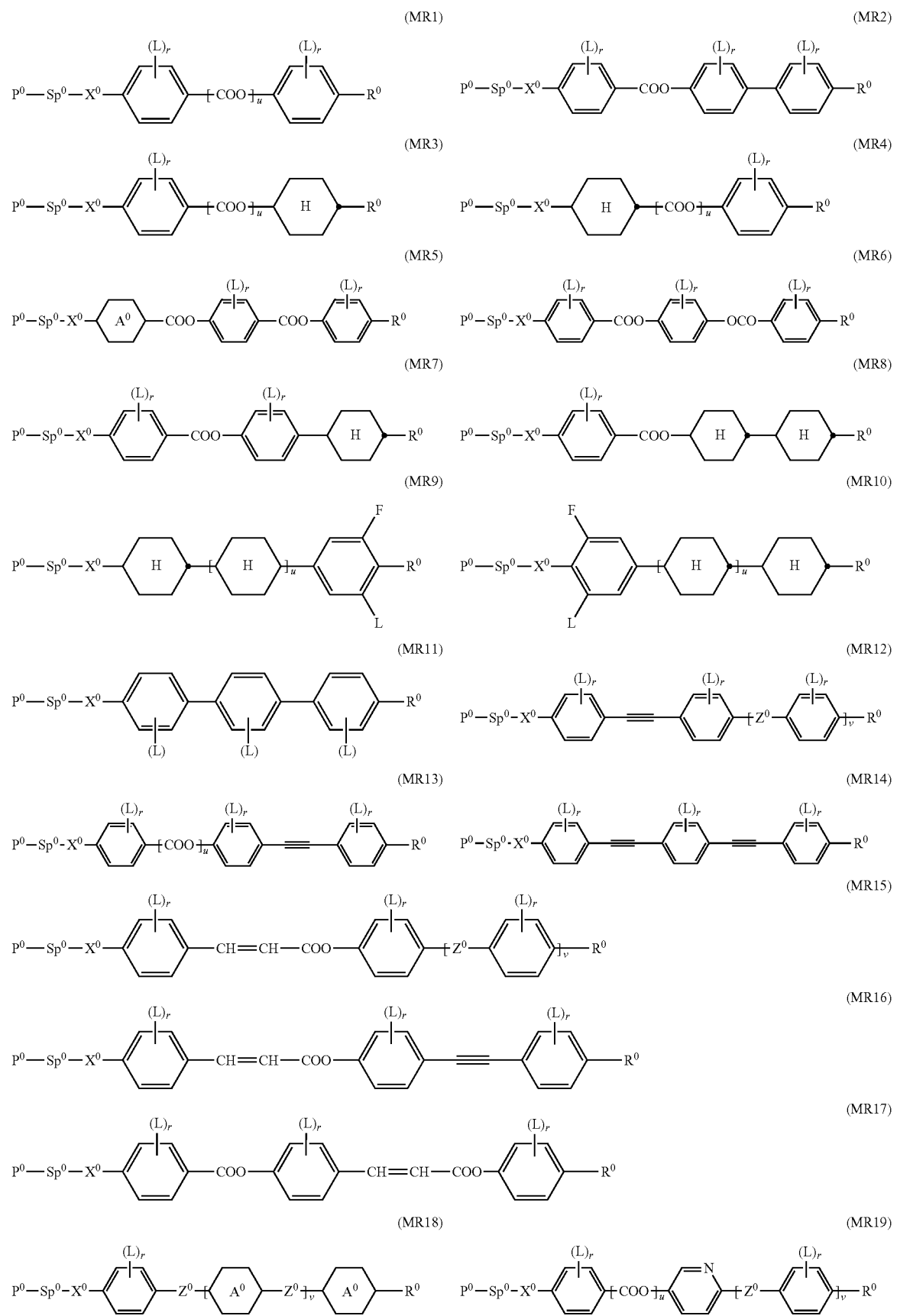

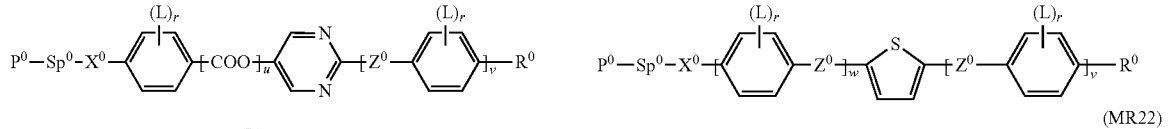
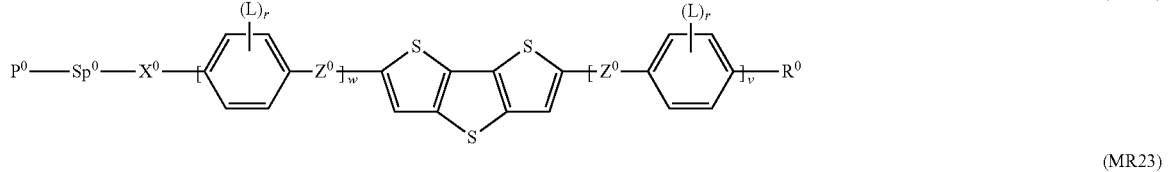
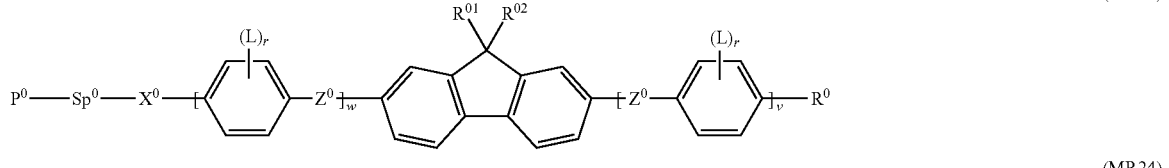
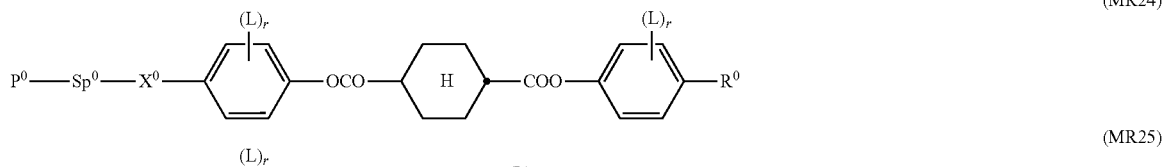
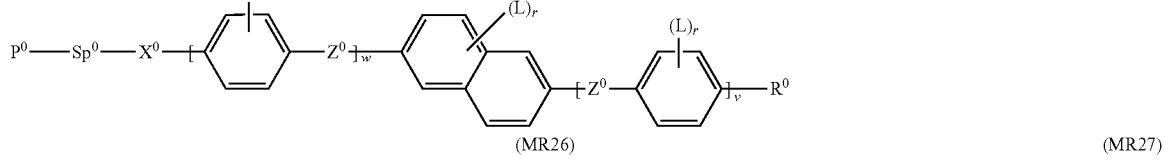
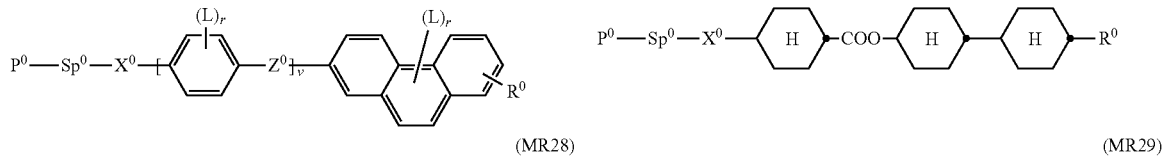
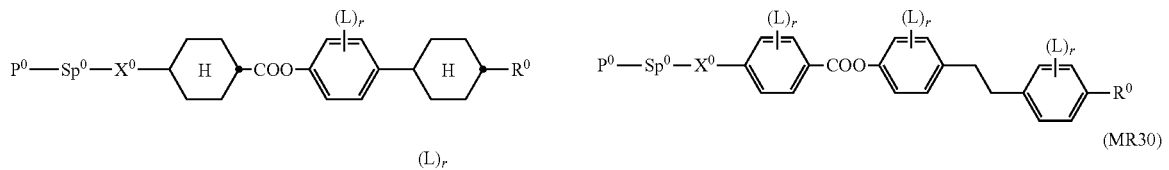
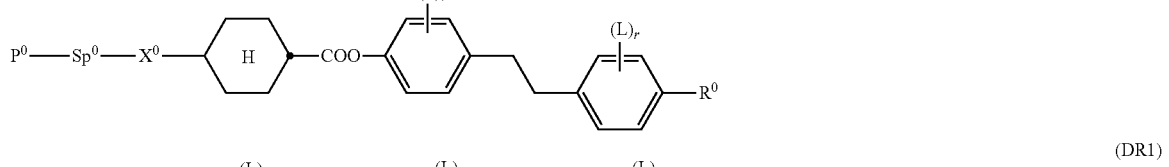
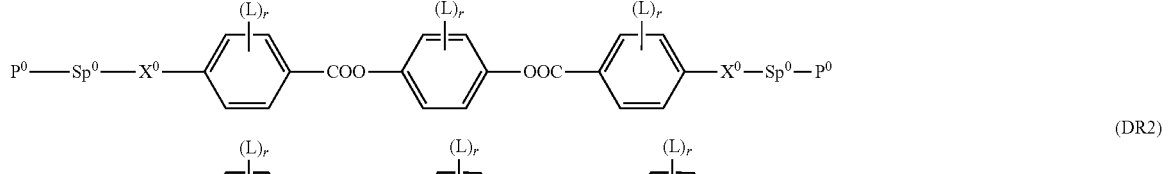
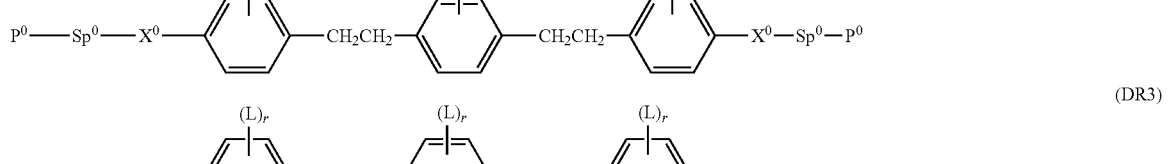

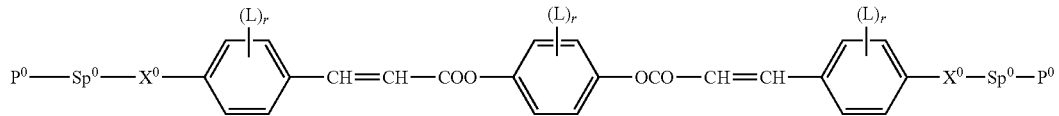
(DR4)
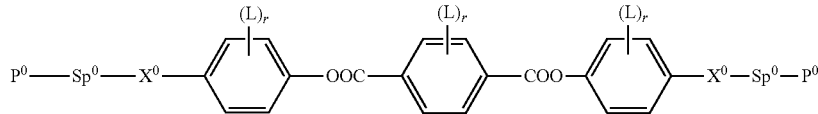
(DR5)
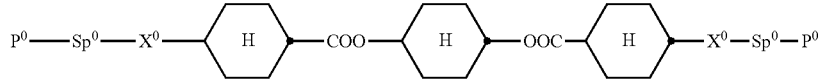
(DR6)
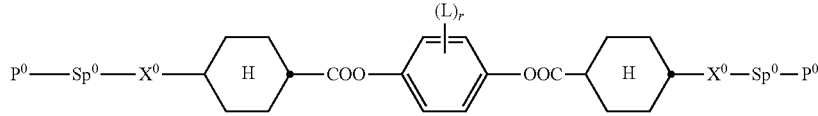
(DR7)
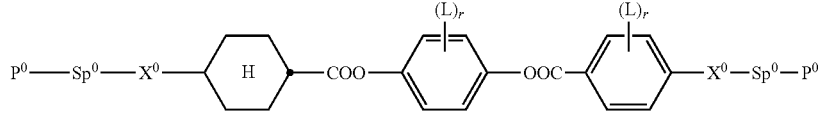
(DR8)
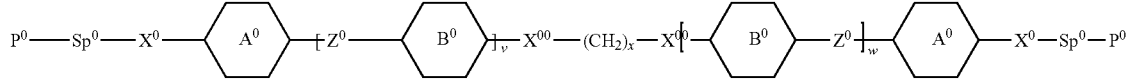
(DR9)
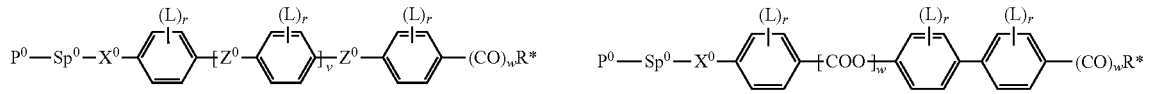
(CR1) (CR2)
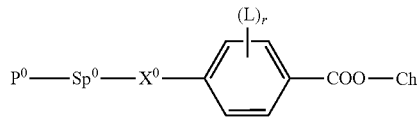
(CR3)
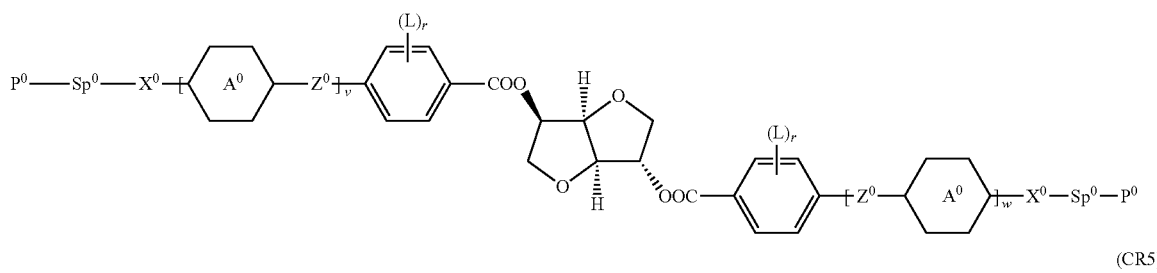
(CR4)
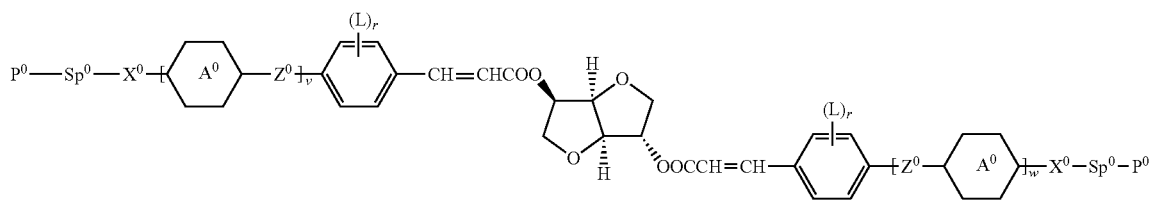
(CR5)

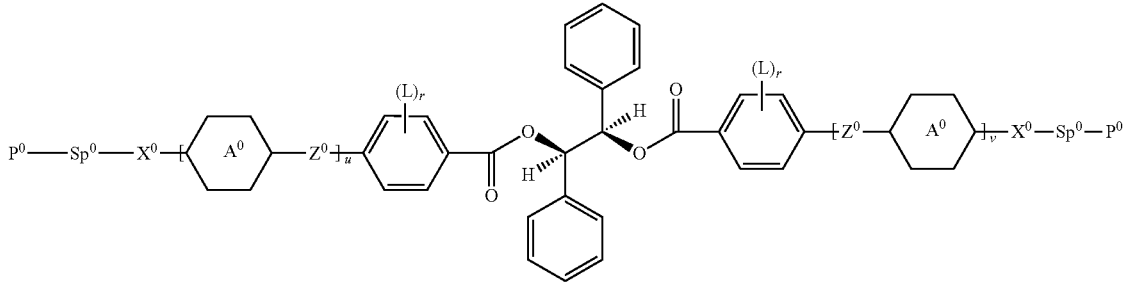

(CR6)

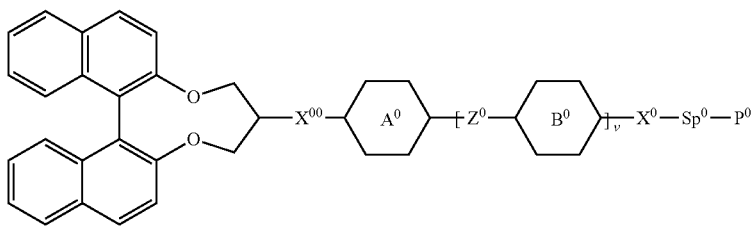

(CR7)

wherein

P⁰ is, in case of multiple occurrence independently of one another, a polymerisable group having one of the meanings given for P above, and is preferably an acryl, methacryl, oxetane, 3-ethyloxetane, epoxy, vinyloxy or styrene group, Sp⁰ is a spacer group having one of the meanings given for Sp' above, X⁰ has one of the meanings given for X' above, Sp⁰-X⁰ is preferably selected from —(CH$_2$)$_{p1}$—, —(CH$_2$)$_{p1}$—O—, —(CH$_2$)$_{p1}$—CO—O— and —(CH$_2$)$_{p1}$—O—CO—O—, wherein p1 is an integer from 1 to 12 and wherein these groups are linked to an adjacent ring via the O-atom if present, A⁰ and B⁰ are, in case of multiple occurrence independently of one another, 1,4-phenylene that is optionally substituted with 1, 2, 3 or 4 groups L, or trans-1,4-cyclohexylene, Z⁰ is, in case of multiple occurrence independently of one another, —COO—, —OCO—, —CH$_2$CH$_2$—, —C≡C—, —CH=CH—, —CH=CH—COO—, —OCO—CH=CH— or a single bond, R⁰ is alkyl, alkoxy, thioalkyl, alkylcarbonyl, alkoxycarbonyl, alkylcarbonyloxy or alkoxycarbonyloxy with 1 to 20, preferably 1 to 15 C atoms which is optionally fluorinated, or denotes Y⁰ or P-Sp⁰-X⁰—, Y⁰ is F, Cl, CN, NO$_2$, OCH$_3$, OCN, SCN, SF$_5$, optionally fluorinated alkylcarbonyl, alkoxycarbonyl, alkylcarbonyloxy or alkoxycarbonyloxy with 1 to 4 C atoms, or mono- oligo- or polyfluorinated alkyl or alkoxy with 1 to 4 C atoms, X⁰⁰ is —O—, —S—, —CO—, —COO—, —OCO—, —O—COO—, —CO—NR⁰¹—, —NR⁰¹—CO—, —NR⁰¹—CO—NR⁰¹—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR⁰¹—, —CF=CF—, —C≡C—, —CH=CH—COO—, —OCO—CH=CH— or a single bond, R⁰¹ is H or alkyl with 1 to 12 C-atoms, R* is a chiral alkyl or alkoxy group with 4 or more, preferably 4 to 12 C atoms, like 2-methylbutyl, 2-methyloctyl, 2-methylbutoxy or 2-methyloctoxy, Ch is a chiral group selected from cholesteryl, estradiol, or terpenoid radicals like menthyl or citronellyl, L is, in case of multiple occurrence identically or differently F, Cl, CN, SCN, SF$_5$ or straight-chain or branched, optionally mono- or polyfluorinated alkyl, alkoxy, alkenyl, alkynyl, alkylcarbonyl, alkoxycarbonyl, or alkylcarbonyloxy or alkoxycarbonyloxy having 1 to 12 C atoms, (wherein the groups different from alkyl and alkoxy contain at least 2 C atoms and branched groups contain at least 3 C atoms) or optionally halogenated alkyl, alkoxy, alkylcarbonyl, alkoxycarbonyl, alkylcarbonyloxy or alkoxycarbonyloxy with 1 to 5 C atoms, r is 0, 1, 2, 3 or 4, u is 0 or 1, and v are independently of each other 0, 1 or 2, and wherein the benzene and napthalene rings can additionally be substituted with one or more identical or different groups L.

Especially preferably the polymerisable LC host component contains only achiral compounds and no chiral compounds.

Further preferably the polymerisable LC host component comprises one or more compounds selected from the group consisting of formulae MR3, MR4, MR7, MR8, MR9, MR10, MR18, MR27, MR28, DR1, DR5, DR6, DR7, DR8, and DR9.

Further preferably the polymerisable LC host component comprises one or more compounds selected from the following formulae:

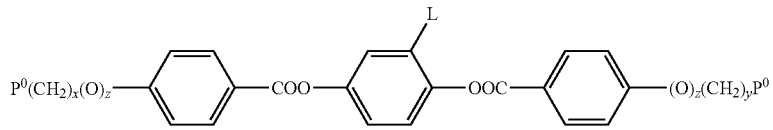
(DR1a)
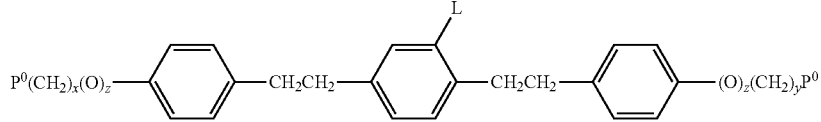
(DR2a)
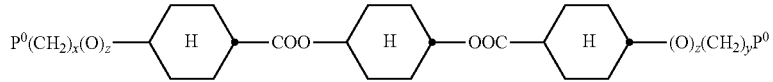
(DR6a)
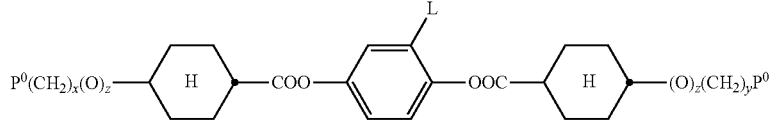
(DR7a)
(DR8a)
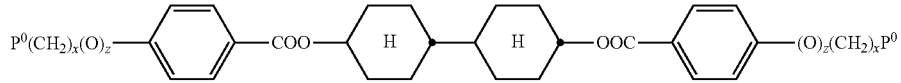
(DR9a)
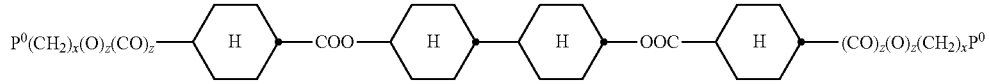
(DR9b)
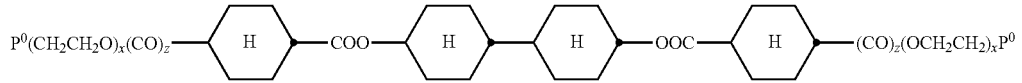
(DR9c)
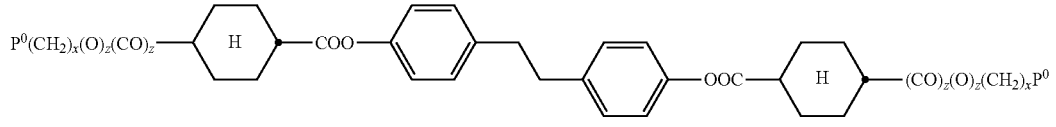
(DR9d)
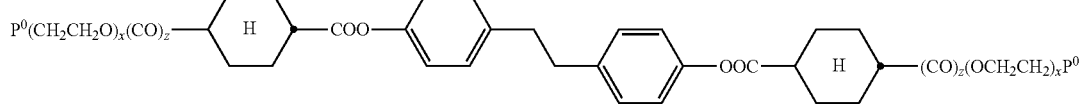
(DR9e)
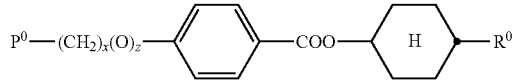
(MR3a)
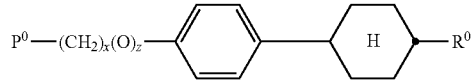
(MR3b)
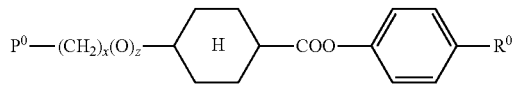
(MR4a)
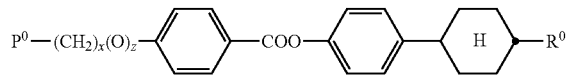
(MR7a)
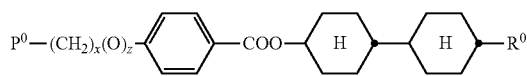
(MR8a)
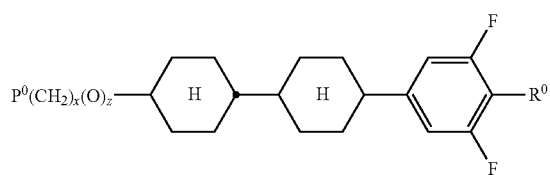
(MR9a)

-continued (MR10a)
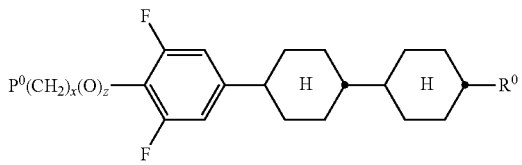

(MR27a)
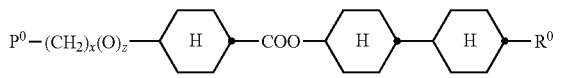

(MR28a)
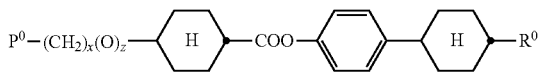

(MR29a)
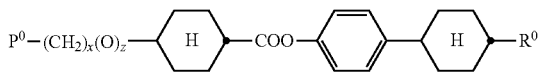

(MR30a)
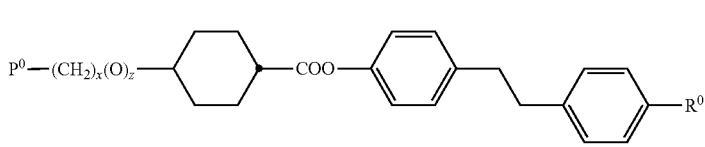

wherein $P^0$ and $R^0$ are as defined above, $R^0$ is preferably alkyl, alkoxy or alkylcarbonyloxy with 1 to 6 C-atoms, L is H or $CH_3$, x and y are independently of each other 0 or identical or different integers from 1 to 12, z is on each occurrence independently of one another 0 or 1, with z being 0 if the adjacent x or y is 0.

Further preferably the polymerisable LC host component comprises one or more compounds selected from the following formulae:

(MR3a1)
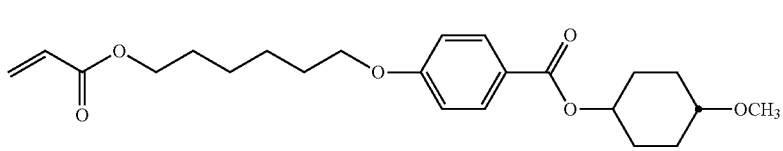

(MR3a2)
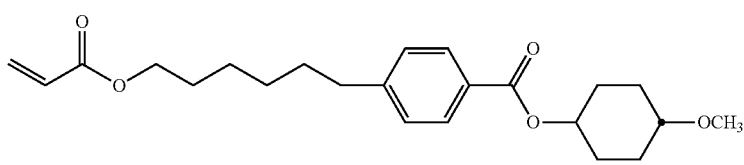

(MR3b1)
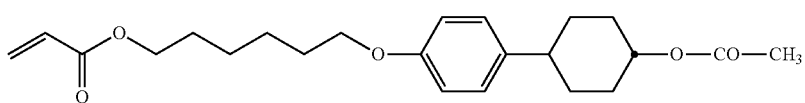

(MR4a1)
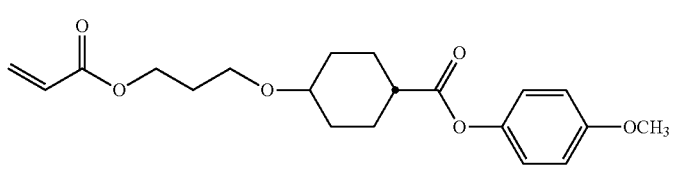

(MR4a2)
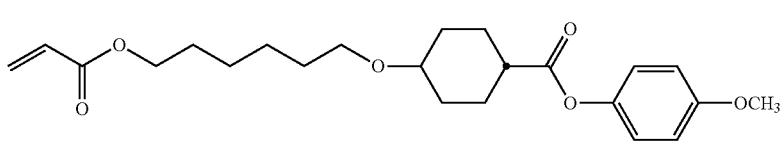

(MR4a3)
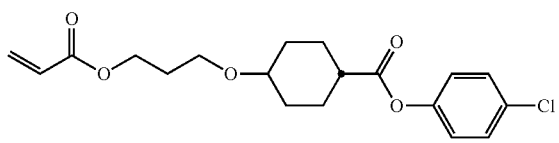

(MR4a4)
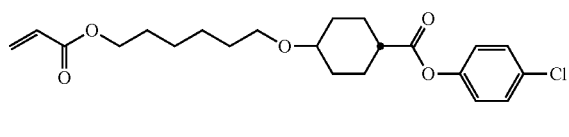

-continued
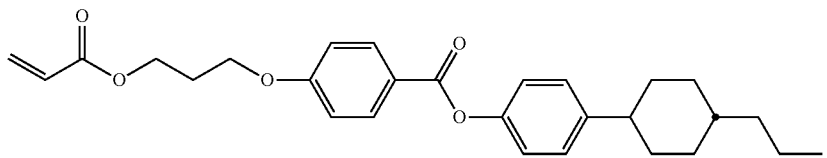
(MR7a1)
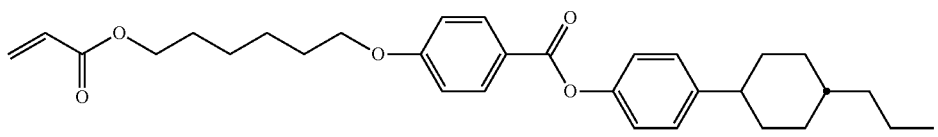
(MR7a2)
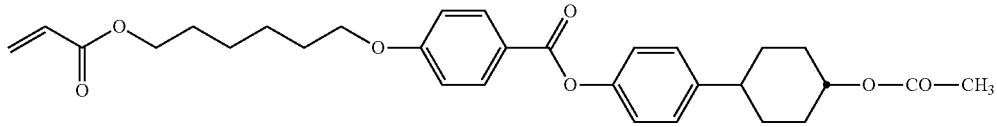
(MR7a3)
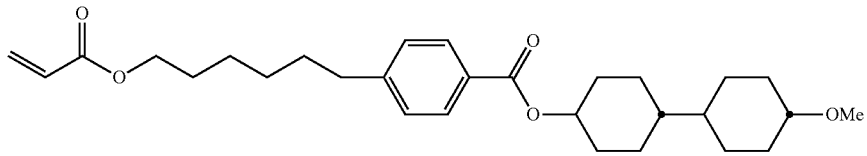
(MR8a1)
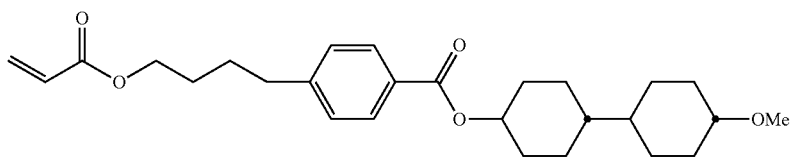
(MR8a2)
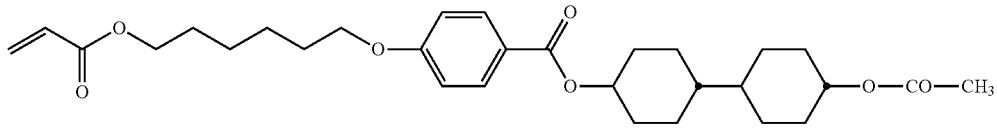
(MR8a3)
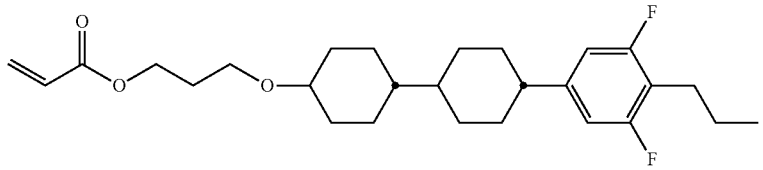
(MR9a1)
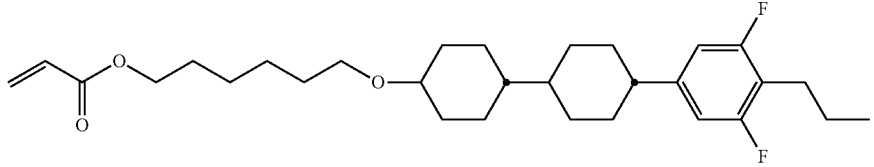
(MR9a2)
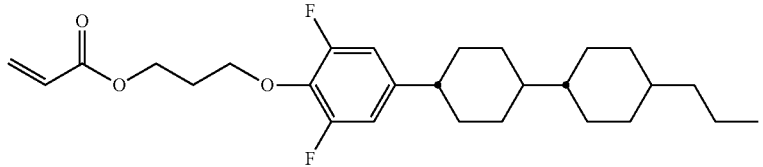
(MR10a1)
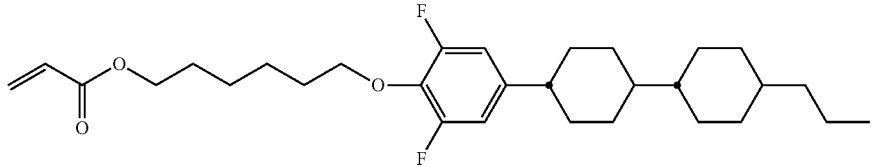
(MR10a2)

-continued
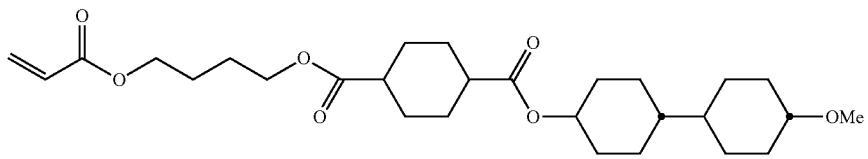
(MR27a1)
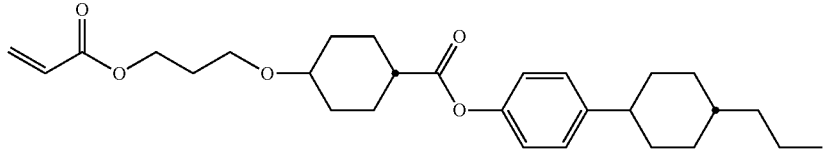
(MR28a1)
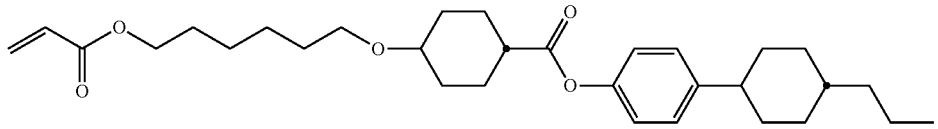
(MR28a2)
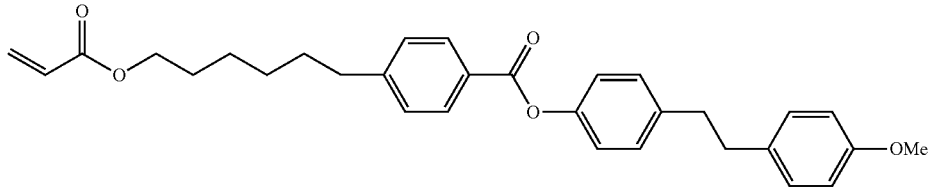
(MR29a1)
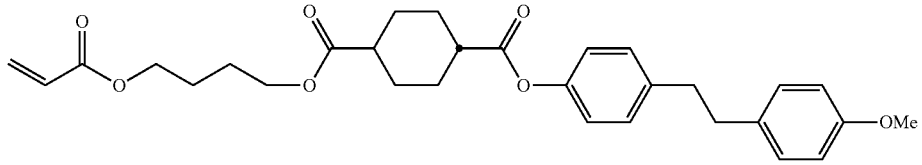
(MR30a1)
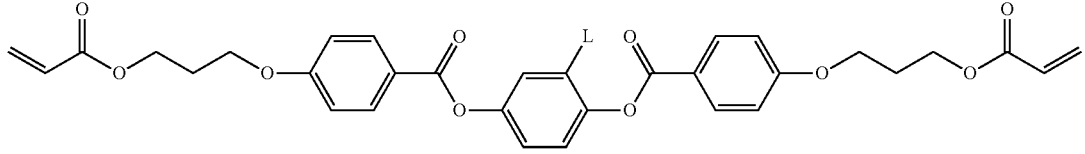
(DR1a1)
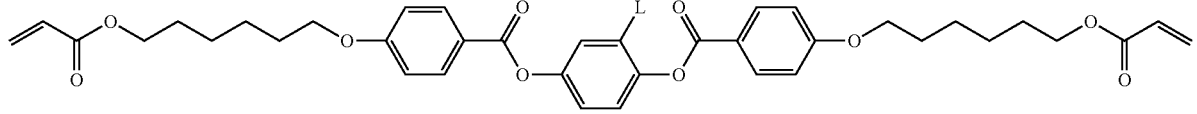
(DR1a2)
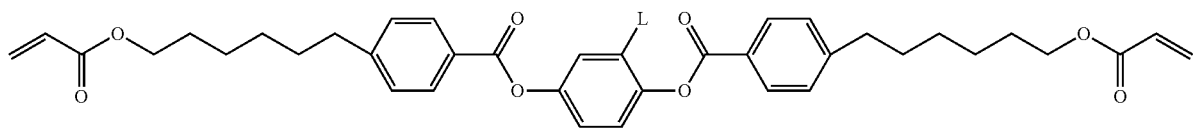
(DR1a3)
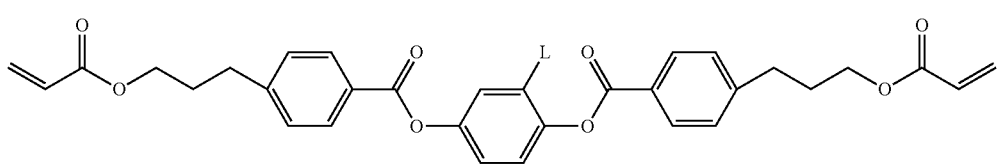
(DR1a4)
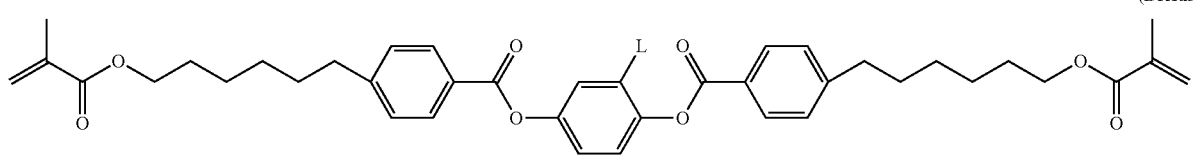
(DR1a5)

-continued
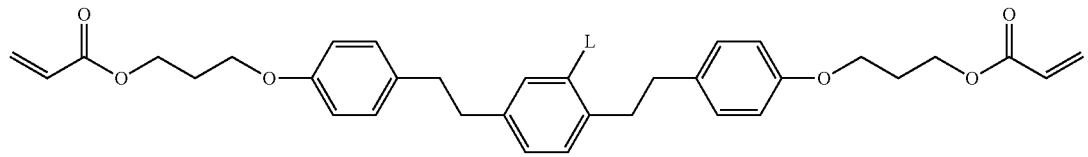
(DR2a1)
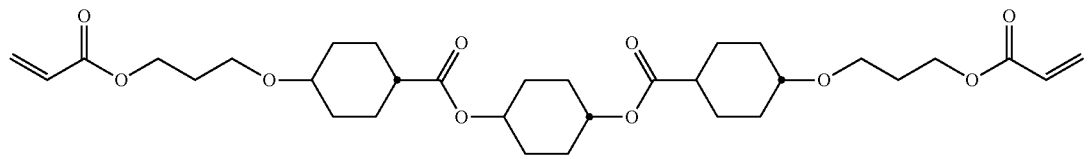
(DR6a)
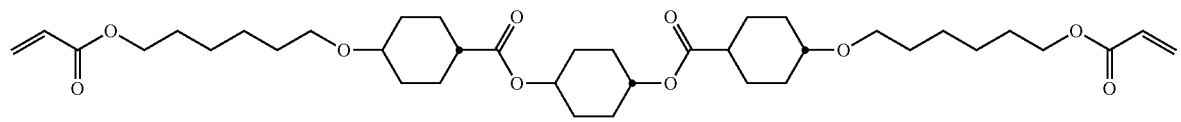
(DR6b)
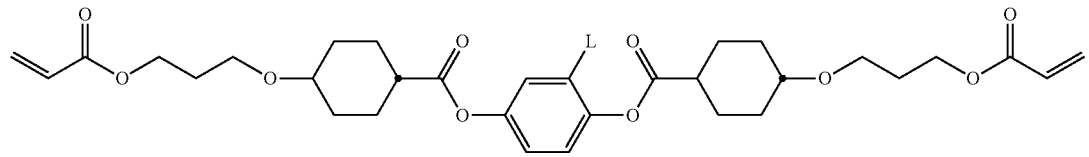
(DR7a1)
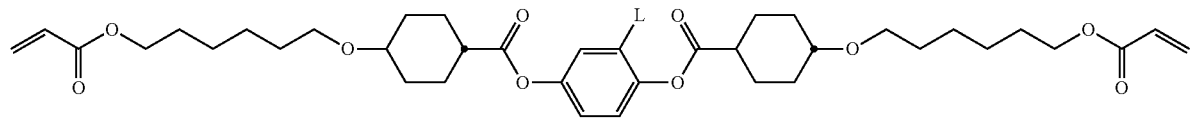
(DR7a2)
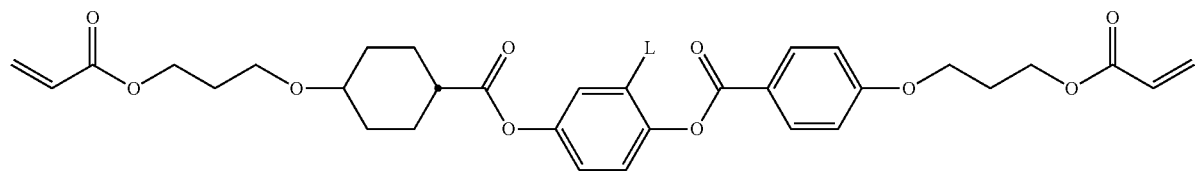
(DR8a1)
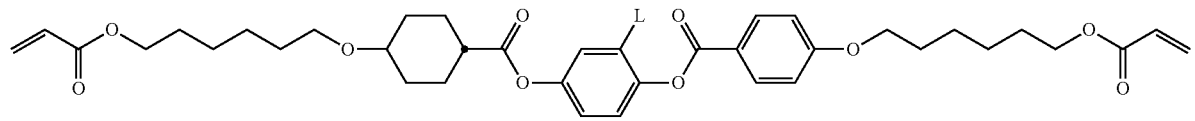
(DR8a2)
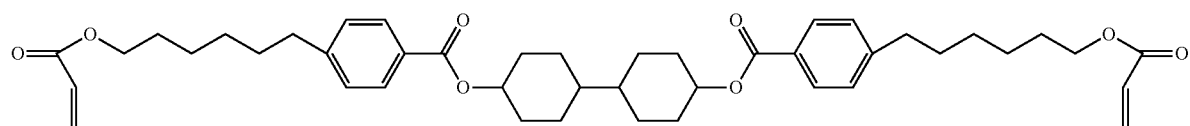
(DR9a1)
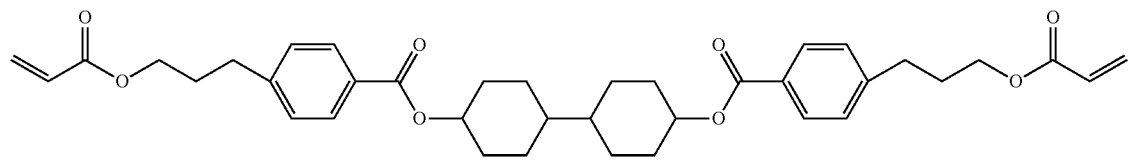
(DR9a2)

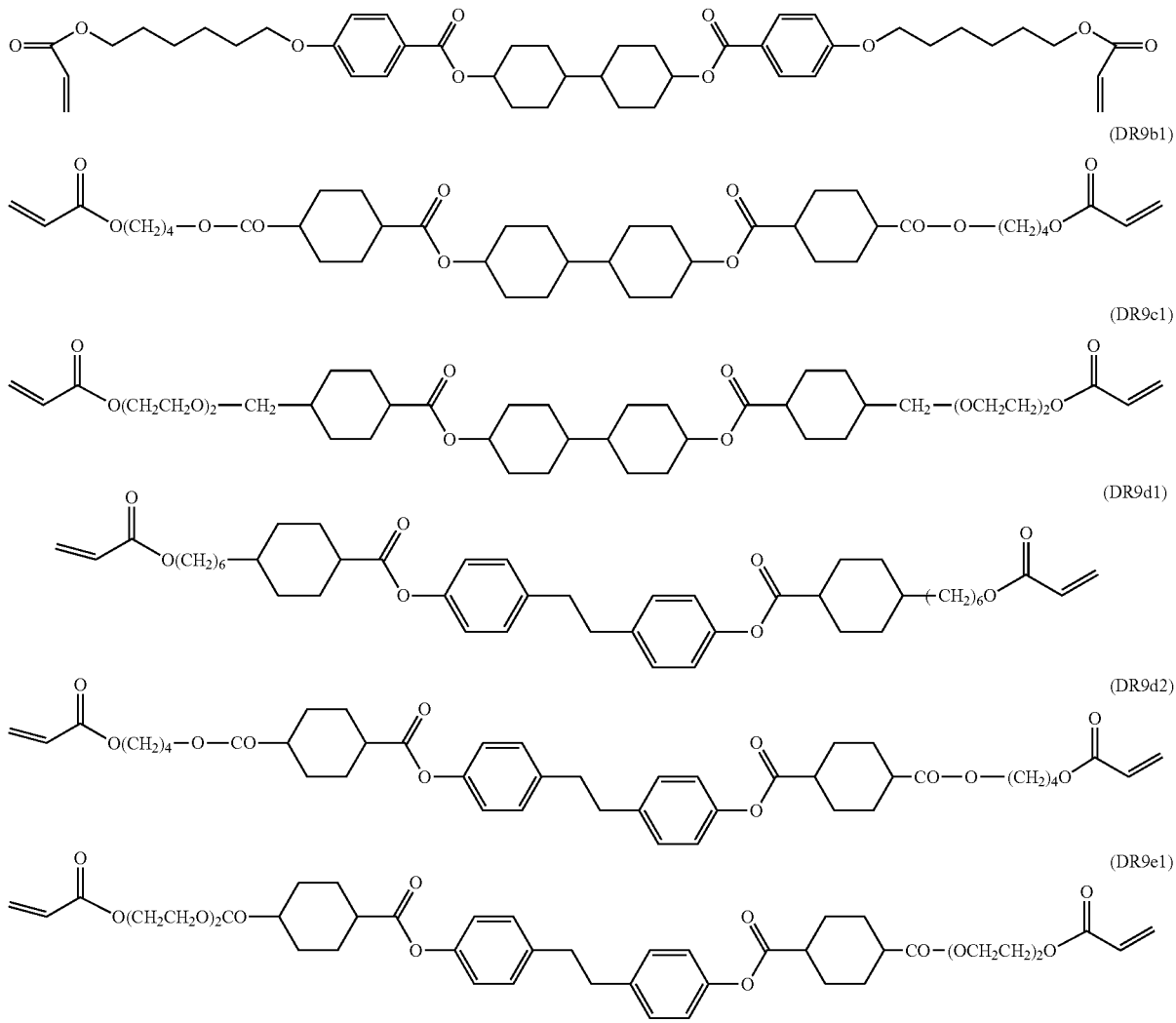

wherein L is H or CH$_3$.

The aforementioned RMs and their synthesis are known from prior art. For example, compounds DR1a1 and DR1a2 are described in D. J. Broer; G. Challa; G. N. Mol, *Macromol. Chem*, 1991, 192, 59, compounds MR10a1 and MR10a2 are described in U.S. Pat. No. 6,183,822, and compounds MR7a1 and MR7a2 are described in U.S. Pat. No. 5,720,900.

In a further preferred embodiment the polymerisable LC material optionally comprises one or more additives selected from the group consisting of further polymerisation initiators, antioxidants, surfactants, stabilisers, catalysts, sensitizers, inhibitors, chain-transfer agents, co-reacting monomers, reactive thinners, surface-active compounds, lubricating agents, wetting agents, dispersing agents, hydrophobing agents, adhesive agents, flow improvers, degassing or defoaming agents, deaerators, diluents, reactive diluents, auxiliaries, colourants, dyes, pigments and nanoparticles.

In another preferred embodiment, the polymerisable LC material optionally comprises one or more additives selected from polymerisable non-mesogenic compounds (reactive thinners). The amount of these additives in the polymerisable LC material is preferably from 0 to 30%, very preferably from 0 to 25%.

The reactive thinners used are not only substances which are referred to in the actual sense as reactive thinners, but also auxiliary compounds already mentioned above which contain one or more complementary reactive units or polymerizable groups P, for example hydroxyl, thiol-, or amino groups, via which a reaction with the polymerisable units of the liquid-crystalline compounds can take place.

The substances, which are usually capable of photopolymerisation, include, for example, mono-, bi- and polyfunctional compounds containing at least one olefinic double bond. Examples thereof are vinyl esters of carboxylic acids, for example of lauric, myristic, palmitic and stearic acid, and of dicarboxylic acids, for example of succinic acid, adipic acid, allyl and vinyl ethers and methacrylic and acrylic esters of monofunctional alcohols, for example of lauryl, myristyl, palmityl and stearyl alcohol, and diallyl and divinyl ethers of bifunctional alcohols, for example ethylene glycol and 1,4-butanediol.

Also suitable are, for example, methacrylic and acrylic esters of polyfunctional alcohols, in particular those which contain no further functional groups, or at most ether groups, besides the hydroxyl groups. Examples of such alcohols are bifunctional alcohols, such as ethylene glycol, propylene glycol and their more highly condensed representatives, for example diethylene glycol, triethylene glycol, dipropylene glycol, tripropylene glycol etc., butanediol, pentanediol, hexanediol, neopentyl glycol, alkoxylated phenolic compounds, such as ethoxylated and propoxylated bisphenols, cyclohexanedimethanol, trifunctional and polyfunctional alcohols, such as glycerol, trimethylolpropane, butanetriol, trimethylolethane, pentaerythritol, ditrimethylolpropane, dipentaerythritol, sorbitol, mannitol, and the corresponding alkoxylated, in particular ethoxylated and propoxylated alcohols.

Other suitable reactive thinners are polyester (meth)acrylates, which are the (meth)acrylic ester of polyesterols.

Examples of suitable polyesterols are those which can be prepared by esterification of polycarboxylic acids, preferably dicarboxylic acids, using polyols, preferably diols. The starting materials for such hydroxyl-containing polyesters are known to the person skilled in the art. Dicarboxylic acids which can be employed are succinic, glutaric acid, adipic acid, sebacic acid, o-phthalic acid and isomers and hydrogenation products thereof, and esterifiable and transesterifiable derivatives of said acids, for example anhydrides and dialkyl esters. Suitable polyols are the abovementioned alcohols, preferably ethyleneglycol, 1,2- and 1,3-propylene glycol, 1,4-butanediol, 1,6-hexanediol, neopentyl glycol, cyclohexanedimethanol and polyglycols of the ethylene glycol and propylene glycol type.

Suitable reactive thinners are furthermore 1,4-divinylbenzene, triallyl cyanurate, acrylic esters of tricyclodecenyl alcohol of the following formula

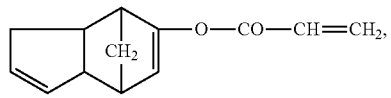 [SMILES: C=CC(=O)OC1=CC2CC1C1CC=CC21]

also known under the name dihydrodicyclopentadienyl acrylate, and the allyl esters of acrylic acid, methacrylic acid and cyanoacrylic acid.

Of the reactive thinners, which are mentioned by way of example, those containing photopolymerizable groups are used in particular and in view of the abovementioned preferred compositions.

This group includes, for example, dihydric and polyhydric alcohols, for example ethylene glycol, propylene glycol and more highly condensed representatives thereof, for example diethylene glycol, triethylene glycol, dipropylene glycol, tripropylene glycol etc., butanediol, pentanediol, hexanediol, neopentyl glycol, cyclohexanedimethanol, glycerol, trimethylolpropane, butanetriol, trimethylolethane, pentaerythritol, ditrimethylolpropane, dipentaerythritol, sorbitol, mannitol and the corresponding alkoxylated, in particular ethoxylated and propoxylated alcohols.

The group furthermore also includes, for example, alkoxylated phenolic compounds, for example ethoxylated and propoxylated bisphenols.

These reactive thinners may furthermore be, for example, epoxide or urethane (meth)acrylates.

Epoxide (meth)acrylates are, for example, those as obtainable by the reaction, known to the person skilled in the art, of epoxidized olefins or poly- or diglycidyl ether, such as bisphenol A diglycidyl ether, with (meth)acrylic acid.

Urethane (meth)acrylates are, in particular, the products of a reaction, likewise known to the person skilled in the art, of hydroxylalkyl (meth)acrylates with poly- or diisocyanates.

Such epoxide and urethane (meth)acrylates are included amongst the compounds listed above as "mixed forms".

If reactive thinners are used, their amount and properties must be matched to the respective conditions in such a way that, on the one hand, a satisfactory desired effect, for example the desired colour of the composition according to the invention, is achieved, but, on the other hand, the phase behaviour of the liquid-crystalline composition is not excessively impaired. The low-crosslinking (high-crosslinking) liquid-crystalline compositions can be prepared, for example, using corresponding reactive thinners, which have a relatively low (high) number of reactive units per molecule.

The group of diluents include, for example:

C1-C4-alcohols, for example methanol, ethanol, n-propanol, isopropanol, butanol, isobutanol, sec-butanol and, in particular, the C5-C12-alcohols n-pentanol, n-hexanol, n-heptanol, n-octanol, n-nonanol, n-decanol, n-undecanol and n-dodecanol, and isomers thereof, glycols, for example 1,2-ethylene glycol, 1,2- and 1,3-propylene glycol, 1,2-, 2,3- and 1,4-butylene glycol, di- and triethylene glycol and di- and tripropylene glycol, ethers, for example methyl tert-butyl ether, 1,2-ethylene glycol mono- and dimethyl ether, 1,2-ethylene glycol mono- and -diethylether, 3-methoxypropanol, 3-isopropoxypropanol, tetrahydrofuran and dioxane, ketones, for example acetone, methyl ethyl ketone, methyl isobutyl ketone and diacetone alcohol (4-hydroxy-4-methyl-2-pentanone), C1-C5-alkyl esters, for example methyl acetate, ethyl acetate, propyl acetate, butyl acetate and amyl acetate, aliphatic and aromatic hydrocarbons, for example pentane, hexane, heptane, octane, isooctane, petroleum ether, toluene, xylene, ethylbenzene, tetralin, decalin, dimethylnaphthalene, white spirit, Shellsol® and Solvesso® mineral oils, for example gasoline, kerosine, diesel oil and heating oil, but also natural oils, for example olive oil, soya oil, rapeseed oil, linseed oil and sunflower oil.

It is of course also possible to use mixtures of these diluents in the compositions according to the invention.

So long as there is at least partial miscibility, these diluents can also be mixed with water. Examples of suitable diluents here are C1-C4-alcohols, for example methanol, ethanol, n-propanol, isopropanol, butanol, isobutanol and sec-butanol, glycols, for example 1,2-ethylene glycol, 1,2- and 1,3-propylene glycol, 1,2-, 2,3- and 1,4-butylene glycol, di- and triethylene glycol, and di- and tripropylene glycol, ethers, for example tetrahydrofuran and dioxane, ketones, for example acetone, methyl ethyl ketone and diacetone alcohol (4-hydroxy-4-methyl-2-pentanone), and C1-C4-alkyl esters, for example methyl, ethyl, propyl and butyl acetate.

The diluents are optionally employed in a proportion of from about 0 to 10.0% by weight, preferably from about 0 to 5.0% by weight, based on the total weight of the polymerisable LC material.

The antifoams and deaerators (c1)), lubricants and flow auxiliaries (c2)), thermally curing or radiation-curing auxiliaries (c3)), substrate wetting auxiliaries (c4)), wetting and dispersion auxiliaries (c5)), hydrophobicizing agents (c6)), adhesion promoters (c7)) and auxiliaries for promoting scratch resistance (c8)) cannot strictly be delimited from one another in their action.

For example, lubricants and flow auxiliaries often also act as antifoams and/or deaerators and/or as auxiliaries for improving scratch resistance. Radiation-curing auxiliaries can also act as lubricants and flow auxiliaries and/or deaerators and/or as substrate wetting auxiliaries. In individual cases, some of these auxiliaries can also fulfil the function of an adhesion promoter (c8)).

Corresponding to the above-said, a certain additive can therefore be classified in a number of the groups c1) to c8) described below.

The antifoams in group c1) include silicon-free and silicon-containing polymers. The silicon-containing polymers are, for example, unmodified or modified polydialkylsiloxanes or branched copolymers, comb or block copolymers comprising polydialkylsiloxane and polyether units, the latter being obtainable from ethylene oxide or propylene oxide.

The deaerators in group c1) include, for example, organic polymers, for example polyethers and polyacrylates, dialkylpolysiloxanes, in particular dimethylpolysiloxanes, organically modified polysiloxanes, for example arylalkyl-modified polysiloxanes, and fluorosilicones.

The action of the antifoams is essentially based on preventing foam formation or destroying foam that has already formed. Antifoams essentially work by promoting coalescence of finely divided gas or air bubbles to give larger bubbles in the medium to be deaerated, for example the compositions according to the invention, and thus accelerate escape of the gas (of the air). Since antifoams can frequently also be employed as deaerators and vice versa, these additives have been included together under group c1).

Such auxiliaries are, for example, commercially available from Tego as TEGO® Foamex 800, TEGO® Foamex 805, TEGO® Foamex 810, TEGO® Foamex 815, TEGO® Foamex 825, TEGO® Foamex 835, TEGO® Foamex 840, TEGO® Foamex 842, TEGO® Foamex 1435, TEGO® Foamex 1488, TEGO® Foamex 1495, TEGO® Foamex 3062, TEGO® Foamex 7447, TEGO® Foamex 8020, Tego® Foamex N, TEGO® Foamex K 3, TEGO® Antifoam 2-18, TEGO® Antifoam 2-18, TEGO® Antifoam 2-57, TEGO® Antifoam 2-80, TEGO® Antifoam 2-82, TEGO® Antifoam 2-89, TEGO® Antifoam 2-92, TEGO® Antifoam 14, TEGO® Antifoam 28, TEGO® Antifoam 81, TEGO® Antifoam D 90, TEGO® Antifoam 93, TEGO® Antifoam 200, TEGO® Antifoam 201, TEGO® Antifoam 202, TEGO® Antifoam 793, TEGO® Antifoam 1488, TEGO® Antifoam 3062, TEGOPREN® 5803, TEGOPREN® 5852, TEGOPREN® 5863, TEGOPREN® 7008, TEGO® Antifoam 1-60, TEGO® Antifoam 1-62, TEGO® Antifoam 1-85, TEGO® Antifoam 2-67, TEGO® Antifoam WM 20, TEGO® Antifoam 50, TEGO® Antifoam 105, TEGO® Antifoam 730, TEGO® Antifoam MR 1015, TEGO® Antifoam MR 1016, TEGO® Antifoam 1435, TEGO® Antifoam N, TEGO® Antifoam KS 6, TEGO® Antifoam KS 10, TEGO® Antifoam KS 53, TEGO® Antifoam KS 95, TEGO® Antifoam KS 100, TEGO® Antifoam KE 600, TEGO® Antifoam KS 911, TEGO® Antifoam MR 1000, TEGO® Antifoam KS 1100, Tego® Airex 900, Tego® Airex 910, Tego® Airex 931, Tego® Airex 935, Tego® Airex 936, Tego® Airex 960, Tego® Airex 970, Tego® Airex 980 and Tego® Airex 985 and from BYK as BYK®-011, BYK®-019, BYK®-020, BYK®-021, BYK®-022, BYK®-023, BYK®-024, BYK®-025, BYK®-027, BYK®-031, BYK®-032, BYK®-033, BYK®-034, BYK®-035, BYK®-036, BYK®-037, BYK®-045, BYK®-051, BYK®-052, BYK®-053, BYK®-055, BYK®-057, BYK®-065, BYK®-066, BYK®-070, BYK®-080, BYK®-088, BYK®-141 and BYK®-A 530.

The auxiliaries in group c1) are optionally employed in a proportion of from about 0 to 3.0% by weight, preferably from about 0 to 2.0% by weight, based on the total weight of the polymerisable LC material.

In group c2), the lubricants and flow auxiliaries typically include silicon-free, but also silicon-containing polymers, for example polyacrylates or modifiers, low-molecular-weight polydialkylsiloxanes. The modification consists in some of the alkyl groups having been replaced by a wide variety of organic radicals. These organic radicals are, for example, polyethers, polyesters or even long-chain (fluorinated)alkyl radicals, the former being used the most frequently.

The polyether radicals in the correspondingly modified polysiloxanes are usually built up from ethylene oxide and/or propylene oxide units. Generally, the higher the proportion of these alkylene oxide units in the modified polysiloxane, the more hydrophilic is the resultant product.

Such auxiliaries are, for example, commercially available from Tego as TEGO® Glide 100, TEGO® Glide ZG 400, TEGO® Glide 406, TEGO® Glide 410, TEGO® Glide 411, TEGO® Glide 415, TEGO® Glide 420, TEGO® Glide 435, TEGO® Glide 440, TEGO® Glide 450, TEGO® Glide A 115, TEGO® Glide B 1484 (can also be used as antifoam and deaerator), TEGO® Flow ATF, TEGO® Flow 300, TEGO® Flow 460, TEGO® Flow 425 and TEGO® Flow ZFS 460. Suitable radiation-curable lubricants and flow auxiliaries, which can also be used to improve the scratch resistance, are the products TEGO® Rad 2100, TEGO® Rad 2200, TEGO® Rad 2500, TEGO® Rad 2600 and TEGO® Rad 2700, which are likewise obtainable from TEGO.

Such-auxiliaries are also available, for example, from BYK as BYK®-300 BYK®-306, BYK®-307, BYK®-310, BYK®-320, BYK®-333, BYK®-341, Byk® 354, Byk®361, Byk®361N, BYK®388.

Such-auxiliaries are also available, for example, from 3M as FC4430®.

Such-auxiliaries are also available, for example, from Cytonix as FluorN®561 or FluorN®562.

Such-auxiliaries are also available, for example, from Merck KGaA as Tivida® FL 2300 and Tivida® FL 2500

The auxiliaries in group c2) are optionally employed in a proportion of from about 0 to 3.0% by weight, preferably from about 0 to 2.0% by weight, based on the total weight of the polymerisable LC material.

In group c3), the radiation-curing auxiliaries include, in particular, polysiloxanes having terminal double bonds which are, for example, a constituent of an acrylate group. Such auxiliaries can be crosslinked by actinic or, for example, electron radiation. These auxiliaries generally combine a number of properties together. In the uncrosslinked state, they can act as antifoams, deaerators, lubricants and flow auxiliaries and/or substrate wetting auxiliaries, while, in the crosslinked state, they increase, in particular, the scratch resistance, for example of coatings or films which can be produced using the compositions according to the invention. The improvement in the gloss properties, for example of precisely those coatings or films, is regarded essentially as a consequence of the action of these auxiliaries as antifoams, deaerators and/or lubricants and flow auxiliaries (in the uncrosslinked state).

Examples of suitable radiation-curing auxiliaries are the products TEGO® Rad 2100, TEGO® Rad 2200, TEGO® Rad 2500, TEGO® Rad 2600 and TEGO® Rad 2700 available from TEGO and the product BYK®-371 available from BYK.

Thermally curing auxiliaries in group c3) contain, for example, primary OH groups, which are able to react with isocyanate groups, for example of the binder.

Examples of thermally curing auxiliaries, which can be used, are the products BYK®-370, BYK®-373 and BYK®-375 available from BYK.

The auxiliaries in group c3) are optionally employed in a proportion of from about 0 to 5.0% by weight, preferably from about 0 to 3.0% by weight, based on the total weight of the polymerisable LC material.

The substrate wetting auxiliaries in group c4) serve, in particular, to increase the wettability of the substrate to be printed or coated, for example, by printing inks or coating compositions, for example compositions according to the invention. The generally attendant improvement in the lubricant and flow behaviour of such printing inks or coating compositions has an effect on the appearance of the finished (for example crosslinked) print or coating.

A wide variety of such auxiliaries are commercially available, for example from Tego as TEGO® Wet KL 245, TEGO® Wet 250, TEGO® Wet 260 and TEGO® Wet ZFS 453 and from BYK as BYK®-306, BYK®-307, BYK®-310, BYK®-333, BYK®-344, BYK®-345, BYK®-346 and Byk®-348.

The auxiliaries in group c4) are optionally employed in a proportion of from about 0 to 3.0% by weight, preferably from about 0 to 1.5% by weight, based on the total weight of the liquid-crystalline composition.

The wetting and dispersion auxiliaries in group c5) are commercially available, for example from Tego, as TEGO® Dispers 610, TEGO® Dispers 610 S, TEGO® Dispers 630, TEGO® Dispers 700, TEGO® Dispers 705, TEGO® Dispers 710, TEGO® Dispers 720 W, TEGO® Dispers 725 W, TEGO® Dispers 730 W, TEGO® Dispers 735 W and TEGO® Dispers 740 W and from BYK as Disperbyk®, Disperbyk®-107, Disperbyk®-108, Disperbyk®-110, Disperbyk®-111, Disperbyk®-115, Disperbyk®-130, Disperbyk®-160, Disperbyk®-161, Disperbyk®-162, Disperbyk®-163, Disperbyk®-164, Disperbyk®-165, Disperbyk®-166, Disperbyk®-167, Disperbyk®-170, Disperbyk®-174, Disperbyk®-180, Disperbyk®-181, Disperbyk®-182, Disperbyk®-183, Disperbyk®-184, Disperbyk®-185, Disperbyk®-190, Anti-Terra®-U, Anti-Terra®-U 80, Anti-Terra®-P, Anti-Terra®-203, Anti-Terra®-204, Anti-Terra®-206, BYK®-151, BYK®-154, BYK®-155, BYK®-P 104 S, BYK®-P 105, Lactimon®, Lactimon®-WS and Bykumen®.

The amount of the auxiliaries in group c5) used on the mean molecular weight of the auxiliary. In any case, a preliminary experiment is therefore advisable, but this can be accomplished simply by the person skilled in the art.

The hydrophobicizing agents in group c6) can be used to give water-repellent properties to prints or coatings produced, for example, using compositions according to the invention. This prevents or at least greatly suppresses swelling due to water absorption and thus a change in, for example, the optical properties of such prints or coatings. In addition, when the composition is used, for example, as a printing ink in offset printing, water absorption can thereby be prevented or at least greatly reduced.

Such hydrophobicizing agents are commercially available, for example, from Tego as Tego® Phobe WF, Tego® Phobe 1000, Tego® Phobe 1000 S, Tego® Phobe 1010, Tego® Phobe 1030, Tego® Phobe 1010, Tego® Phobe 1010, Tego® Phobe 1030, Tego® Phobe 1040, Tego® Phobe 1050, Tego® Phobe 1200, Tego® Phobe 1300, Tego® Phobe 1310 and Tego® Phobe 1400.

The auxiliaries in group c6) are optionally employed in a proportion of from about 0 to 5.0% by weight, preferably from about 0 to 3.0% by weight, based on the total weight of the polymerisable LC material.

Further adhesion promoters from group c7) serve to improve the adhesion of two interfaces in contact. It is directly evident from this that essentially the only fraction of the adhesion promoter that is effective is that located at one or the other or at both interfaces. If, for example, it is desired to apply liquid or pasty printing inks, coating compositions or paints to a solid substrate, this generally means that the adhesion promoter must be added directly to the latter or the substrate must be pre-treated with the adhesion promoters (also known as priming), i.e. this substrate is given modified chemical and/or physical surface properties.

If the substrate has previously been primed with a primer, this means that the interfaces in contact are that of the primer on the one hand and of the printing ink or coating composition or paint on the other hand. In this case, not only the adhesion properties between the substrate and the primer, but also between the substrate and the printing ink or coating composition or paint play a part in adhesion of the overall multilayer structure on the substrate.

Adhesion promoters in the broader sense which may be mentioned are also the substrate wetting auxiliaries already listed under group c4), but these generally do not have the same adhesion promotion capacity.

In view of the widely varying physical and chemical natures of substrates and of printing inks, coating compositions and paints intended, for example, for their printing or coating, the multiplicity of adhesion promoter systems is not surprising.

Adhesion promoters based on silanes are, for example, 3-aminopropyltrimethoxysilane, 3-aminopropyltriethoxysilane, 3-aminopropylmethyldiethoxysilane, N-aminoethyl-3-aminopropyltrimethoxysilane, N-aminoethyl-3-aminopropylmethyldimethoxysilane, N-methyl-3-aminopropyltrimethoxysilane, 3-ureidopropyltriethoxysilane, 3-methacryloyloxypropyltrimethoxysilane, 3-glycidyloxypropyltrimethoxysilane, 3-mercaptopropyltrimethoxysilane, 3-chloropropyltrimethoxysilane and vinyltrimethoxysilane. These and other silanes are commercially available from Hüls, for example under the tradename DYNASILAN®.

Corresponding technical information from the manufacturers of such additives should generally be used or the person skilled in the art can obtain this information in a simple manner through corresponding preliminary experiments.

However, if these additives are to be added as auxiliaries from group c7) to the polymerisable LC materials according to the invention, their proportion optionally corresponds to from about 0 to 5.0% by weight, based on the total weight of the polymerisable LC material. These concentration data serve merely as guidance, since the amount and identity of the additive are determined in each individual case by the nature of the substrate and of the printing/coating composition. Corresponding technical information is usually available from the manufacturers of such additives for this case or can be determined in a simple manner by the person skilled in the art through corresponding preliminary experiments.

The auxiliaries for improving the scratch resistance in group c8) include, for example, the abovementioned products TEGO® Rad 2100, TEGO® Rad 2200, TEGO® Rad 2500, TEGO® Rad 2600 and TEGO® Rad 2700, which are available from Tego.

For these auxiliaries, the amount data given for group c3) are likewise suitable, i.e. these additives are optionally employed in a proportion of from about 0 to 5.0% by weight, preferably from about 0 to 3.0% by weight, based on the total weight of the liquid-crystalline composition.

Examples that may be mentioned of light, heat and/or oxidation stabilizers are the following:

alkylated monophenols, such as 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which have a linear or branched side chain, for example 2,6-dinonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures of these compounds, alkylthiomethylphenols, such as 2,4-dioctylthiomethyl-6-tert-butylphenol, 2,4-dioctylthiomethyl-6-methylphenol, 2,4-dioctylthiomethyl-6-ethylphenol and 2,6-didodecylthiomethyl-4-nonylphenol, Hydroquinones and alkylated hydroquinones, such as 2,6-di-tert-butyl-4-methoxyphenol, 2,5-di-tert-butylhydroquinone, 2,5-di-tert-amylhydrocrainone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate and bis(3,5-di-tert-butyl-4-hydroxyphenyl)adipate, Tocopherols, such as α-tocopherol, β-tocopherol, γ-tocopherol, δ-tocopherol and mixtures of these compounds, and tocopherol derivatives, such as tocopheryl acetate, succinate, nicotinate and polyoxyethylenesuccinate ("tocofersolate"), hydroxylated diphenyl thioethers, such as 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol) and 4,4'-bis(2,6-dimethyl-4-hydroxyphenyl)disulfide, Alkylidenebisphenols, such as 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecyl-mercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecyl-mercaptobutane and 1,1,5,5-tetrakis(5-tert-butyl-4-hydroxy-2-methylphenyl)pentane, O-, N- and S-benzyl compounds, such as 3,5,3',5'-tetra-tert-butyl-4,4'-dihydroxydibenzyl ether, octadecyl 4-hydroxy-3,5-dimethylbenzylmercaptoacetate, tridecyl 4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide and isooctyl-3,5-di-tert-butyl-4-hydroxybenzylmercaptoacetate, aromatic hydroxybenzyl compounds, such as 1,3,5-tris(3,5-di-tert-butyl-4-hydroxybenzyl)-2,4,6-trimethyl-benzene, 1,4-bis(3,5-di-tert-butyl-4-hydroxybenzyl)-2,3,5,6-tetramethyl-benzene and 2,4,6-tris(3,5-di-tert-butyl-4-hydroxybenzyl)phenol, Triazine compounds, such as 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris-(3,5-di-tert-butyl-4-hydroxyphenylpropionyl)hexahydro-1,3,5-triazine, 1,3,5-tris(3,5-dicyclohexyl-4-hydroxybenzyl)isocyanurate and 1,3,5-tris(2-hydroxyethyl)isocyanurate, Benzylphosphonates, such as dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4-hydroxybenzylphosphonate and dioctadecyl 5-tert-butyl-4-hydroxy-3-methylbenzylphosphonate, Acylaminophenols, such as 4-hydroxylauroylanilide, 4-hydroxystearoylanilide and octyl N-(3,5-di-tert-butyl-4-hydroxyphenyl)carbamate, Propionic and acetic esters, for example of monohydric or polyhydric alcohols, such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxalamide, 3-thiaundecanol, 3-thiapentadecanol, trimethylhexanediol, trimethylolpropane and 4-hydroxymethyl-1-phospha-2,6,7-trioxabicyclo[2.2.2]-octane, Propionamides based on amine derivatives, such as N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine and N,N'-bis(3,5-di-tert-butyl-4-hydroxyphenylpropionyl)hydrazine, Ascorbic acid (Vitamin C) and ascorbic acid derivatives, such as ascorbyl palmitate, laurate and stearate, and ascorbyl sulfate and phosphate, Antioxidants based on amine compounds, such as N,N'-diisopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octyl-substituted diphenylamine, such as p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis[4-methoxyphenyl)amine, 2,6-di-tert-butyl-4-dimethylaminomethylphenol, 2,4-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octyl-substituted N-phenyl-1-naphthylamine, a mixture of mono- and dialkylated tert-butyl/tert-octyldiphenylamine, a mixture of mono- and dialkylated nonyldiphenylamine, a mixture of mono- and dialkylated dodecyldiphenylamine, a mixture of mono- and dialkylated isopropyl/isohexyldiphenylamine, a mixture of mono- and dialkylated tert-butyldiphenylamine, 2,3-dihydro-3,3-dimethyl-4H-1,4-benzothiazine, phenothiazine, a mixture of mono- and dialkylated tert-butyl/tert-octylphenothiazine, a mixture of mono- and dialkylated tert-octylphenothiazine, N-allylphenothiazine, N,N,N',N'-tetraphenyl-1,4-diaminobut-2-ene, N,N-bis(2,2,6,6-tetramethylpiperidin-4-yl)hexamethylenediamine, bis(2,2,6,6-tetramethylpiperidin-4-yl)sebacate, 2,2,6,6-tetramethylpiperidin-4-one and 2,2,6,6-tetramethylpiperidin-4-ol, Phosphines, Phosphites and phosphonites, such as triphenylphosnine triphenylphosphite, diphenyl alkyl phosphite, phenyl dialkyl phosphite, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,6-di-tert-butyl-4-methylphenyl)pentaerythritol diphosphite, diisodecyloxy pentaerythritol diphosphite, bis(2,4-di-tert-butyl-6-methylphenyl)pentaerythritol diphosphite, bis(2,4,6-tris(tert-butylphenyl))pentaerythritol diphosphite, tristearyl sorbitol triphosphite, tetrakis(2,4-di-tert-butylphenyl)4,4'-biphenylenediphosphonite, 6-isooctyloxy-2,4,8,10-tetra-tert-butyl-12H-dibenz[d,g]-1,3,2-dioxaphosphocine, 6-fluoro-2,4,8,10-tetra-tert-butyl-12-methyl-dibenz[d,g]-1,3,2-dioxaphosphocine, bis(2,4-di-tert-butyl-6-methylphenyl)methyl phosphite and bis(2,4-di-tert-butyl-6-methylphenyl)ethyl phosphite, 2-(2'-Hydroxyphenyl)benzotriazoles, such as 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3,5'-bis-(α,α-dimethylbenzyl)-2'-hydroxyphenyl)benzotriazole, a mixture of 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxy phenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxy phenyl)benzotriazole, 2-(3'-dodecyl-2'-hydroxy-5'-methylphenyl)benzotriazole and 2-(3'-tert-butyl-2'-hydroxy-5'-(2-isooctyloxycarbonylethyl)phenyl benzotriazole, 2,2'-methylenebis[4-(1,1,3,3-tetramethylbutyl)-6-benzotriazol-2-ylphenol]; the product of complete esterification of 2-[3'-tert-butyl-5'-(2-methoxycarbonylethyl)-2'-hydroxyphenyl]-2H-benzotriazole with polyethylene glycol 300;

sulfur-containing peroxide scavengers and sulfur-containing antioxidants, such as esters of 3,3'-thiodipropionic acid, for example the lauryl, stearyl, myristyl and tridecyl esters, mercaptobenzimidazole and the zinc salt of 2-mercaptobenzimidazole, dibutylzinc dithiocarbamates, dioctadecyl disulfide and pentaerythritol tetrakis(β-dodecylmercapto)propionate, 2-hydroxybenzophenones, such as the 4-hydroxy, 4-methoxy, 4-octyloxy, 4-decycloxy, 4-dodecyloxy, 4-benzyloxy, 4,2',4'-trihydroxy and 2'-hydroxy-4,4'-dimethoxy derivatives, Esters of unsubstituted and substituted benzoic acids, such as 4-tert-butylphenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl-3,5-di-tert-butyl-4-hydroxybenzoate, octadecyl-3,5-di-tert-butyl-4-hydroxybenzoate and 2-methyl-4,6-di-tert-butylphenyl-3,5-di-tert-butyl-4-hydroxybenzoate, Acrylates, such as ethyl α-cyano-β,β-diphenylacrylate, isooctyl α-cyano-β,β-diphenylacrylate, methyl α-methoxycarbonylcinnamate, methyl α-cyano-β-methyl-p-methoxycinnamate, butyl-α-cyano-β-methyl-p-methoxycinnamate and methyl-α-methoxycarbonyl-p-methoxycinnamate, sterically hindered amines, such as bis(2,2,6,6-tetramethylpiperidin-4-yl)sebacate, bis(2,2,6,6-tetramethylpiperidin-4-yl) succinate, bis(1,2,2,6,6-pentamethylpiperidin-4-yl)sebacate, bis(1-octyloxy-2,2,6,6-tetramethylpiperidin-4-yl)sebacate, bis(1,2,2,6,6-pentamethylpiperidin-4-yl)-n-butyl-3,5-di-tert-butyl-4-hydroxybenzylmalonate, the condensation product of 1-(2-hydroxyethyl)-2,2,6,6-tetramethyl-4-hydroxypiperidine and succinic acid, the condensation product of N,N'-bis(2,2,6,6-tetramethylpiperidin-4-yl)hexamethylenediamine and 4-tert-octylamino-2,6-dichloro-1,3,5-triazine, tris(2,2,6,6-tetramethylpiperidin-4-yl)nitrilotriacetate, tetrakis(2,2,6,6-tetramethylpiperidin-4-yl)1,2,3,4-butanetetracarboxylate, 1,1'-(1,2-ethylene)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidin-4-yl)2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidin-4-yl)sebacate, bis(1-octyloxy-2,2,6,6-tetramethylpiperidin-4-yl)succinate, the condensation product of N,N'-bis(2,2,6,6-tetramethylpiperidin-4-yl)hexamethylenediamine and 4-morpholino-2,6-dichloro-1,3,5-triazine, the condensation product of 2-chloro-4,6-bis(4-n-butylamino-2,2,6,6-tetramethylpiperidin-4-yl)-1,3,5-triazine and 1,2-bis(3-aminopropylamino)ethane, the condensation product of 2-chloro-4,6-di(4-n-butylamino-1,2,2,6,6-pentamethylpiperidin-4-yl)-1,3,5-triazine and 1,2-bis(3-aminopropylamino)ethane, 8-acetyl-3-dodecyl-7,7,9,9-tetramethyl-1,3,8-triazaspiro[4.5]-decane-2,4-dione, 3-dodecyl-1-(2,2,6,6-tetramethylpiperidin-4-yl)pyrrolidine-2,5-dione, 3-dodecyl-1-(1,2,2,6,6-pentamethylpiperidin-4-yl)pyrrolidine-2,5-dione, a mixture of 4-hexadecyloxy- and 4-stearyloxy-2,2,6,6-tetramethylpiperidine, the condensation product of N,N'-bis(2,2,6,6-tetramethylpiperidin-4-yl)hexamethylenediamine and 4-cyclohexylamino-2,6-dichloro-1,3,5-triazine, the condensation product of 1,2-bis(3-aminopropylamino)ethane and 2,4,6-trichloro-1,3,5-triazine, 4-butylamino-2,2,6,6-tetramethylpiperidine, N-(2,2,6,6-tetramethylpiperidin-4-yl)-n-dodecylsuccinimide, N-(1,2,2,6,6-pentamethylpiperidin-4-yl)-n-dodecylsuccinimide, 2-undecyl-7,7,9,9-tetramethyl-1-oxa-3,8-diaza-4-oxospiro[4.5]-decane, the condensation product of 7,7,9,9-tetramethyl-2-cycloundecyl-1-oxa-3,8-diaza-4-oxospiro-[4.5]decane and epichlorohydrin, the condensation products of 4-amino-2,2,6,6-tetramethylpiperidine with tetramethylolacetylenediureas and poly(methoxypropyl-3-oxy)-[4(2,2,6,6-tetramethyl)piperidinyl]-siloxane, Oxalamides, such as 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxalamide, 2-ethoxy-5-tert-butyl-2'-ethoxanilide and its mixture with 2-ethoxy-2'-ethyl-5,4'-di-tert-butoxanilide, and mixtures of ortho-, para-methoxy-disubstituted oxanilides and mixtures of ortho- and para-ethoxy-disubstituted oxanilides, and 2-(2-hydroxyphenyl)-1,3,5-triazines, such as 2,4,6-tris-(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropoxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis-(2,4-dimethylphenyl)-1,3,5-triazine, 2-(2-hydroxy-4-hexyloxyphenyl)-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine and 2-(2-hydroxyphenyl)-4-(4-methoxyphenyl)-6-phenyl-1,3,5-triazine.

In another preferred embodiment the polymerisable LC material comprises one or more specific antioxidant additives, preferably selected from the Irganox® series, e.g. the commercially available antioxidants Irganox®1076 and Irganox®1010, from Ciba, Switzerland.

In another preferred embodiment, the polymerisable LC material comprises one or more, more preferably of two or more photoinitiators. Typically, radical photoinitiators which can be utilized, are, for example, selected from the commercially available Irgacure® or Darocure® (Ciba AG) series, in particular, Irgacure 127, Irgacure 184, Irgacure 369, Irgacure 651, Irgacure 817, Irgacure 907, Irgacure 1300, Irgacure, Irgacure 2022, Irgacure 2100, Irgacure 2959, Darcure TPO. Further suitable photoinitiators are preferably selected from commercially available oxime ester photoinitiators such as Oxe02 (Ciba), or N-1919 T (Adeka).

The concentration of the polymerisation initiator(s) as a whole in the polymerisable LC material is preferably from 0.1 to 10%, very preferably from 0.5 to 8%, more preferably 2 to 6%.

Preferably, the polymerisable LC material comprises besides one or more compounds of formula a and formula I,
a) one or more di- or multireactive polymerisable mesogenic compounds,
b) one or more photoinitiator,
c) optionally one or more monoreactive polymerisable mesogenic compounds,
d) optionally one or more antioxidative additives,
e) optionally one or more adhesion promotors,
f) optionally one or more surfactants,
g) optionally one or more stabilizers,
h) optionally one or more mono-, di- or multireactive polymerisable non-mesogenic compounds,
i) optionally one or more dyes showing an absorption maximum at the wavelength used to initiate photo polymerisation,
j) optionally one or more chain transfer agents,
k) optionally one or more stabilizers,
l) optionally one or more lubricants and flow auxiliaries, and
m) optionally one or more diluents.

More preferably, the polymerisable LC material comprises,
a) up 20% by weight of one or more compounds of formula A, preferably selected from the compounds of the formulae A2 or A6, more preferably of formula A2,
b) up 20% by weight of one or more compounds of formula I, preferably selected from the compounds of the formulae I-25 or I-26,
c) one or more, preferably two or more, monoreactive polymerisable mesogenic compounds, preferably in an amount of 10 to 95% by weight, very preferably 25 to 85%, preferably selected from compounds of formulae MRM-1 and/or MRM-7,
d) one or more photoinitiators, preferably in an amount from 0.1 to 10% by weight,
e) optionally one or more, preferably two or more, direactive polymerisable mesogenic compounds, preferably in an amount, if present at all, of 10 to 90% by weight, very preferably 15 to 75% by weight, preferably selected from the compounds of formula DRMa-1,
f) optionally one or more antioxidative additives, preferably selected from esters of unsubstituted and substituted benzoic acids, in particular Irganox®1076, and if present, preferably in an amount of 0.01 to 2% by weight, very preferably 0.05 to 1% by weight,
g) optionally one or more lubricants and flow auxiliaries, preferably selected from BYK®310, BYK®388, FC 4430 and/or Fluor N 562, and if present, preferably in an amount of 0.1 to 5% by weight, very preferably 0.2 to 3% by weight, and
h) optionally one or more diluents, preferably selected from n-dodecanol, in if present, preferably in an amount of 0.1 to 5% by weight, very preferably 0.2 to 3% by weight.

The invention further relates to a process for the preparation of the polymerisable LC material as described above and below comprising the step of mixing up to 20 wt. % of one or more compounds of formula A with up to 20 wt. % of one or more compounds of formula I.

The invention further relates to a method of preparing a polymer film by
providing a layer of a polymerisable LC material as described above and below onto a substrate,
polymerising the polymerisable LC material by photopolymerisation, and
optionally removing the polymerised LC material from the substrate and/or optionally providing it onto another substrate.

In a preferred embodiment, the layer of a polymerisable LC material is provided on to a substrate by firstly dissolving the polymerisable LC material in one or more solvents, which are preferably selected from organic solvents. The solvents are preferably selected from ketones such as acetone, methyl ethyl ketone, methyl propyl ketone, methyl isobutyl ketone or cyclohexanone; acetates such as methyl, ethyl or butyl acetate or methyl acetoacetate; alcohols such as methanol, ethanol or isopropyl alcohol; aromatic solvents such as toluene or xylene; alicyclic hydrocarbons such as cyclopentane or cyclohexane; halogenated hydrocarbons such as di- or trichloromethane; glycols or their esters such as PGMEA (propyl glycol monomethyl ether acetate), γ-butyrolactone. It is also possible to use binary, ternary or higher mixtures of the above solvents.

In case the polymerisable LC material is dissolved in one or more solvents, the total concentration of all solids, including the RMs, in the solvent(s) is preferably from 10 to 60%.

This solution is then coated or printed onto the substrate, for example by spin-coating, printing, or other known techniques, and the solvent is evaporated off before polymerisation. In most cases, it is suitable to heat the mixture in order to facilitate the evaporation of the solvent.

The polymerisable LC material can be applied onto a substrate by conventional coating techniques like spin coating, bar coating or blade coating. It can also be applied to the substrate by conventional printing techniques which are known to the expert, like for example screen printing, offset printing, reel-to-reel printing, letter press printing, gravure printing, rotogravure printing, flexographic printing, intaglio printing, pad printing, heat-seal printing, ink-jet printing or printing by means of a stamp or printing plate.

Suitable substrate materials and substrates are known to the expert and described in the literature, as for example conventional substrates used in the optical films industry, such as glass or plastic. Especially suitable and preferred substrates for polymerisation are polyester such as polyethyleneterephthalate (PET) or polyethylenenaphthalate (PEN), polyvinylalcohol (PVA), polycarbonate (PC) triacetylcellulose (TAC), or cyclo olefin polymers (COP), or commonly known color filter materials, in particular triacetylcellulose (TAC), cyclo olefin polymers (COP), or commonly known colour filter materials.

The polymerisable LC material preferably exhibits a uniform alignment throughout the whole layer. Preferably the polymerisable LC material exhibits a uniform planar or homeotropic alignment.

A suitable method used to support homeotropic alignment is to apply corona discharge treatment to plastic substrates, generating alcohol or ketone functional groups on the substrate surface. These polar groups can interact with the polar groups present in RMs or surfactants to promote homeotropic alignment.

For the production of the polymer films according to the invention, the polymerisable compounds in the polymerisable LC material are polymerised or crosslinked (if one compound contains two or more polymerisable groups) by in-situ photopolymerisation.

The photopolymerisation can be carried out in one step. It is also possible to photopolymerise or crosslink the compounds in a second step, which have not reacted in the first step ("end curing").

Photopolymerisation of the LC material is preferably achieved by exposing it to actinic radiation. Actinic radiation means irradiation with light, like UV light, IR light or visible light, irradiation with X-rays or gamma rays, or irradiation with high-energy particles, such as ions or electrons. Preferably, polymerisation is carried out by photo irradiation, in particular with UV light. As a source for actinic radiation, for example a single UV lamp or a set of UV lamps can be used. When using a high lamp power the curing time can be reduced. Another possible source for photo radiation is a laser, like e.g. a UV laser, an IR laser, or a visible laser.

The curing time is dependent, inter alia, on the reactivity of the polymerisable LC material, the thickness of the coated layer, the type of polymerisation initiator and the power of the UV lamp.

Typically, the curing time is preferably ≤5 minutes, very preferably ≤3 minutes, most preferably ≤1 minute. For mass production, short curing times of ≤30 seconds are preferred. A suitable UV radiation power is preferably in the range from 5 to 200 mWcm-2, more preferably in the range from 50 to 175 mWcm$^{-2}$ and most preferably in the range from 100 to 150 mWcm$^{-2}$.

In connection with the applied UV radiation and as a function of time, a suitable UV dose is preferably in the range from 25 to 7200 mJcm$^{-2}$ more preferably in the range from 500 to 7200 mJcm$^{-2}$ and most preferably in the range from 3000 to 7200 mJcm$^{-2}$.

Photopolymerisation is preferably performed under an inert gas atmosphere, preferably in a heated nitrogen atmosphere, but also polymerisation in air is possible.

Photopolymerisation is preferably performed at a temperature from 1 to 70° C., more preferably 5 to 50° C., even more preferably 15 to 30° C.

The polymerised LC film according to the present invention has good adhesion to plastic substrates, in particular to TAC, COP, and colour filters. Accordingly, it can be used as adhesive or base coating for subsequent LC layers which otherwise would not well adhere to the substrates.

The preferred thickness of a polymerised LC film according to the present invention is determined by the optical properties desired from the film or the final product.

For example, if the polymerised LC film does not mainly act as an optical layer, but e.g. as adhesive, aligning or protection layer, its thickness is preferably not greater than 1 µm, in particular not greater than 0.5 µm, very preferably not greater than 0.2 µm.

For example, uniformly homeotropic or planar aligned polymer films of the present invention can be used as retardation or compensation films for example in LCDs to improve the contrast and brightness at large viewing angles and reduce the chromaticity. They can be used outside the switchable liquid-crystalline cell in an LCD, or between the substrates, usually glass substrates, forming the switchable liquid-crystalline cell and containing the switchable liquid-crystalline medium (in cell application).

For optical applications of the polymer film, it preferably has a thickness of from 0.5 to 10 µm, very preferably from 0.5 to 5 µm, in particular from 0.5 to 3 µm.

The optical retardation (δ(λ)) of a polymer film as a function of the wavelength of the incident beam (λ) is given by the following equation (7):

$$\delta(\lambda)=(2\pi\Delta n \cdot d)/\lambda \tag{7}$$

wherein (Δn) is the birefringence of the film, (d) is the thickness of the film and λ is the wavelength of the incident beam.

According to Snellius law, the birefringence as a function of the direction of the incident beam is defined as $$\Delta n = \sin\Theta/\sin\Psi \tag{8}$$

wherein sin Θ is the incidence angle or the tilt angle of the optical axis in the film and sin Ψ is the corresponding reflection angle.

Based on these laws, the birefringence and accordingly optical retardation depends on the thickness of a film and the tilt angle of optical axis in the film (cf. Berek's compensator). Therefore, the skilled expert is aware that different optical retardations or different birefringence can be induced by adjusting the orientation of the liquid-crystalline molecules in the polymer film.

Preferred optical films of the present invention exhibit a R450/R550≤1.07 and R650/R650≥0.95. R450, R550 and R650 means the retardation on-axis at 450 nm, 550 nm and 650 nm.

Preferred optical films of the present invention exhibit a birefringence higher than 0.07, more preferably in the range of 0.08-0.150.

The optical retardation as a function of the thickness of the polymer film according to the present invention is less than 200 nm, preferable less than 180 nm and even more preferable less than 150 nm.

Especially with regard to the in cell application, the polymer films according to the present invention exhibit a high temperature stability. Thus, the polymer films exhibit temperature stability up to 300° C., preferably up to 250° C., more preferably up to 230° C.

In summary, the polymerised LC films and polymerisable LC materials according to the present invention are useful in optical elements like polarisers, compensators, alignment layer, circular polarisers or colour filters in liquid crystal displays or projection systems, decorative images, for the preparation of liquid crystal or effect pigments, and especially in reflective films with spatially varying reflection colours, e.g. as multicolour image for decorative, information storage or security uses, such as non-forgeable documents like identity or credit cards, banknotes etc.

The polymerised LC films according to the present invention can be used in displays of the transmissive or reflective type. They can be used in conventional OLED displays or LCDs, in particular LCDs of the DAP (deformation of aligned phases) or VA (vertically aligned) mode, like e.g. ECB (electrically controlled birefringence), CSH (colour super homeotropic), VAN or VAC (vertically aligned nematic or cholesteric) displays, MVA (multi-domain vertically aligned) or PVA (patterned vertically aligned) displays, in displays of the bend mode or hybrid type displays, like e.g. OCB (optically compensated bend cell or optically compensated birefringence), R—OCB (reflective OCB), HAN (hybrid aligned nematic) or pi-cell (π-cell) displays, furthermore in displays of the TN (twisted nematic), HTN (highly twisted nematic) or STN (super twisted nematic) mode, in AMD-TN (active matrix driven TN) displays, or in displays of the IPS (in plane switching) mode which are also known as 'super TFT' displays. Especially preferred are VA, MVA, PVA, OCB, and pi-cell displays.

The polymerisable LC material and polymer films according to the present invention are especially useful for a 3D display as described in EP 0 829 744, EP 0 887 666 A2, EP 0 887 692, U.S. Pat. Nos. 6,046,849, 6,437,915 and in "Proceedings o the SID 20$^{th}$ International Display Research Conference, 2000", page 280. A 3D display of this type comprising a polymer film according to the invention is another object of the present invention.

The present invention is described above and below with particular reference to the preferred embodiments. It should be understood that various changes and modifications might be made therein without departing from the spirit and scope of the invention.

Many of the compounds or mixtures thereof mentioned above and below are commercially available. All of these compounds are either known or can be prepared by methods which are known per se, as described in the literature (for example in the standard works such as Houben-Weyl, Methoden der Organischen Chemie [Methods of Organic Chemistry], Georg-Thieme-Verlag, Stuttgart), to be precise under reaction conditions which are known and suitable for said reactions. Use may also be made here of variants which are known per se, but are not mentioned here.

It will be appreciated that variations to the foregoing embodiments of the invention can be made while still falling within the scope of the invention. Alternative features serving the same, equivalent, or similar purpose may replace each feature disclosed in this specification, unless stated otherwise. Thus, unless stated otherwise, each feature disclosed is one example only of a generic series of equivalent or similar features.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

It will be appreciated that many of the features described above, particularly of the preferred embodiments, are inventive in their own right and not just as part of an embodiment of the present invention. Independent protection may be sought for these features in addition to or alternative to any invention presently claimed.

The invention will now be described in more detail by reference to the following working examples, which are illustrative only and do not limit the scope of the invention.

The examples below serve to illustrate the invention without limiting it.

EXAMPLES

Utilized Compounds

For the preparation of the following mixtures, the following compounds and abbreviations are used:

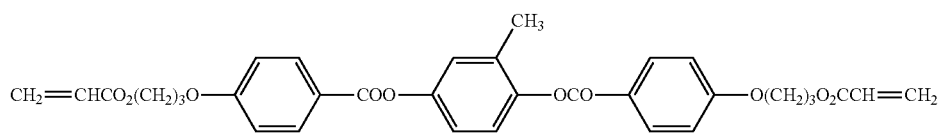

C1

LC 242

C2

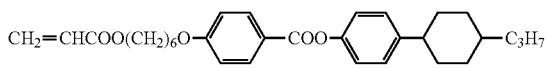

C3

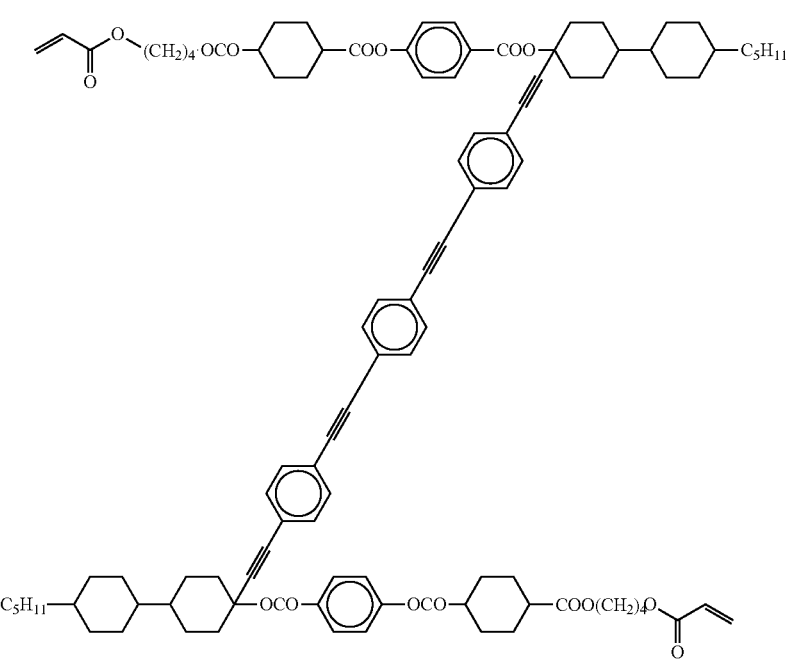

C4

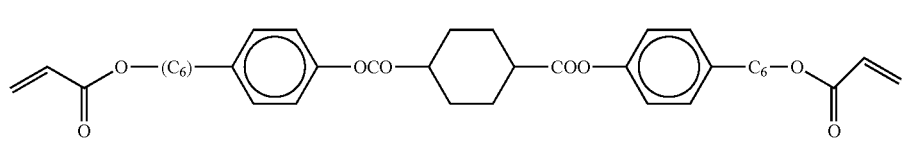

C5

Irganox®1076     C6     Fluor N561

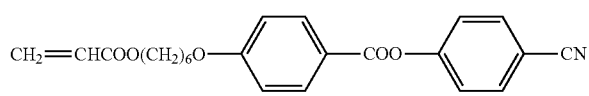

C7

C8

C9

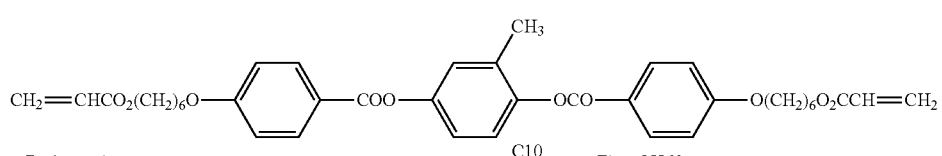

n-Dodecanol     C10     Fluor N562

C11

LC242 is a polymerisable chiral material commercially available from BASF AG (Ludwigshafen, Germany). Irganox1076® is a stabilizer, being commercially available (Ciba AG, Basel, Switzerland). FluorN 562 and FluorN 561 are surfactants being commercially available (Cytonix, USA).

Utilized Photoinitiators 2,4,6-Trimethylbenzoyl-diphenyl-phosphineoxide PI 1

2-Methyl-4'-(methylthio)-2-morpholinopropiophenone PI 2

Bis(2,4,6-trimethylbenzoyl)-phenylphosphineoxide PI 3

2-Benzyl-2-dimethylamino-1-(4-morpholinophenyl)-butanone-1 PI 4

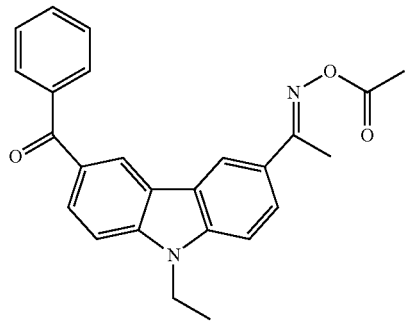

PI5

-continued

PI6

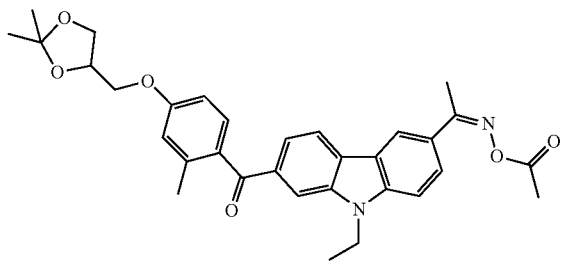

General Method for the Polymer Film Preparation:

First, a 33.3% w/w solution of the corresponding LC medium in Toluene/Cyclohexane solution (7:3) is prepared.

The solution is spin coated at 4400 rpm for 30 s onto a rubbed polyimide coated glass slide where it aligns homeotropically.

The sample is annealed at 68° C. for 60 s on a temperature controlled hot plate.

The sample is cooled to 20° C. under a nitrogen atmosphere and then UV cured (365 nm filter, 80 mW/cm$^2$) for 60 s at 20° C.

Retardations R450, R550 and R650 are measured at a temperature of 20° C. and at wavelengths of 450 nm, 550 nm, and 650 nm, respectively.

The durability can be quantified by the difference in the values for R450, R550 and R650 and for R450)/R550 before and after an oven test.

Experiment 1

1.1 Comparative Example

The following mixture CM-1 is prepared.

| Component | Amount in wt. % |
|---|---|
| C 1 | 33.36 |
| C 2 | 47.30 |
| C 4 | 17.80 |
| C 6 | 0.12 |
| C 7 | 0.42 |
| PI-1 | 1.00 |

A corresponding polymer film is produced following the above described method and the resulting polymer film exhibits a value for R450/R550 of 1.061 and a value for R650/R550 of 0.964, respectively.

In order to test the durability of the polymer film, the film is exposed to a temperature of 230° C. for a time up to 40 min.

Table 1.1 summarizes the result of the durability test (triplicate):

TABLE 1.1

| | R550 (0 min) | R550 (40 min) | Average R550 (0 min) | Average R550 (40 min) | Δ R550 [%] |
|---|---|---|---|---|---|
| CM-1 | 169.7 | 154.5 | 168.0 | 151.2 | 9.9 |
| | 166.8 | 149.6 | | | |
| | 167.6 | 149.6 | | | |

1.2 Example

The following mixture M-1 is prepared.

| Component | Amount in wt. % |
|---|---|
| C 1 | 20.47 |
| C 2 | 34.11 |
| C 3 | 10.00 |
| C 5 | 16.08 |
| C 4 | 17.80 |
| C 6 | 0.12 |
| C 7 | 0.42 |
| PI-1 | 1.00 |

A corresponding polymer film is produced following the above described method and the resulting polymer film exhibits a value for R450/R550 of 1.044 and a value for R650/R550 of 0.970, respectively.

In order to test the durability of the polymer film, the film is exposed to a temperature of 230° C. for a time up to 40 min.

Table 1.2 summarizes the result of the durability test (triplicate):

TABLE 1.2

| | R550 (0 min) | R550 (40 min) | Average R550 (0 min) | Average R550 (40 min) | Δ R550 [%] |
|---|---|---|---|---|---|
| M-1 | 135.0 | 142.3 | 135.0 | 141.1 | 4.5 |
| | 134.9 | 141.2 | | | |
| | 135.1 | 139.9 | | | |

1.3 Summary

As can be seen from the comparison of the value for R450/R550 and the a value for R650/R550, the polymer film according to the present invention exhibits an improved flat dispersion characteristic.

Furthermore, as can be seen from the comparison of the results of the durability test, the polymer film according to the present invention exhibits a significant improvement of the durability.

Experiment 2

2.1 Comparative Example

The following mixture CM-2 is prepared.

| Component | Amount in wt. % |
|---|---|
| C1 | 14.25 |
| C2 | 53.54 |
| C3 | 9.59 |
| C4 | 17.08 |
| C6 | 0.12 |
| C7 | 0.42 |
| PI-2 | 5 |

A corresponding polymer film is produced following the above described method and the resulting polymer film exhibits a value for R450/R550 of 1.056 and a value for R650/R550 of 0.966, respectively.

In order to test the durability of the polymer film, the film is exposed to a temperature of 230° C. for a time up to 40 min.

Table 2.1 summarizes the result of the durability test (triplicate):

TABLE 2.1

|      | R550 (0 min) | R550 (40 min) | Average R550 (0 min) | Average R550 (40 min) | Δ R550 [%] |
|------|--------------|---------------|----------------------|-----------------------|------------|
| CM-2 | 145.5        | 115.7         | 146.4                | 116.0                 | 20.7       |
|      | 146.7        | 116.5         |                      |                       |            |
|      | 146.9        | 115.8         |                      |                       |            |

2.2 Example

The following mixture M-2 is prepared.

| Component | Amount in wt. % |
|-----------|-----------------|
| C1        | 6.54            |
| C2        | 45.82           |
| C3        | 9.59            |
| C4        | 17.08           |
| C5        | 15.43           |
| C6        | 0.12            |
| C7        | 0.42            |
| PI-2      | 5.00            |

A corresponding polymer film is produced following the above described method and the resulting polymer film exhibits a value for R450/R550 of 1.045 and a value for R650/R550 of 0.971, respectively.

In order to test the durability of the polymer film, the film is exposed to a temperature of 230° C. for a time up to 40 min.

Table 2.2 summarizes the result of the durability test (triplicate):

TABLE 2.2

|     | R550 (0 min) | R550 (40 min) | Average R550 (0 min) | Average R550 (40 min) | Δ R550 [%] |
|-----|--------------|---------------|----------------------|-----------------------|------------|
| M-2 | 135.3        | 117.9         | 135.6                | 117.9                 | 13.0       |
|     | 134.9        | 117.5         |                      |                       |            |
|     | 136.5        | 118.3         |                      |                       |            |

2.3 Summary

As can be seen from the comparison of the value for R450/R550 and the a value for R650/R550, the polymer film according to the present invention exhibits an improved flat dispersion characteristic.

Furthermore, as can be seen from the comparison of the results of the durability test, the polymer film according to the present invention exhibits a significant improvement of the durability.

Experiment 3

The following mixture M-3 and CM-3 are prepared:

| CM-3 Component | Amount in wt. % |
|----------------|-----------------|
| C1             | 22.09           |
| C2             | 47.76           |
| C3             | 10.00           |
| C4             | 17.80           |
| C6             | 0.12            |
| C7             | 0.42            |
| PI-1           | 1.00            |

| M-3 Component | Amount in wt. % |
|---------------|-----------------|
| C1            | 6.82            |
| C2            | 47.76           |
| C3            | 10.00           |
| C4            | 17.80           |
| C5            | 16.08           |
| C6            | 0.12            |
| C7            | 0.42            |
| PI-1          | 1.00            |

The mixtures M-3 and CM-3 are blended in ratios of 2:1, 1:1, 1:2 resulting in mixtures M-4, M-5 and M-6, respectively. Corresponding polymer film are produced from mixture CM-3 and from each mixture M-3 to M-6 following the above described method.

In order to test the durability of the polymer films, each film is exposed to a temperature of 230° C. for a time up to 40 min.

Table 3.1 summarizes the result of the durability test (triplicate):

TABLE 3.1

| Mixture | R550 (0 min) | R550 (40 min) | Average R550 (0 min) | Average R550 (40 min) | Δ R550 [%] |
|---------|--------------|---------------|----------------------|-----------------------|------------|
| M-3     | 135.1        | 140.7         | 135.3                | 138.6                 | 2.4        |
|         | 135.1        | 137.7         |                      |                       |            |
|         | 135.9        | 137.6         |                      |                       |            |
| M-4     | 144.1        | 142.2         | 145.1                | 146.7                 | 1.1        |
|         | 145.7        | 148.7         |                      |                       |            |
|         | 145.6        | 149.3         |                      |                       |            |
| M-5     | 150.2        | 148.4         | 151.0                | 148.2                 | 1.9        |
|         | 150.7        | 147.1         |                      |                       |            |
|         | 152.1        | 148.9         |                      |                       |            |
| M-6     | 155.6        | 152.2         | 156.9                | 153.3                 | 2.3        |
|         | 157.4        | 153.3         |                      |                       |            |
|         | 157.8        | 154.4         |                      |                       |            |
| CM-3    | 163.4        | 155.7         | 163.3                | 155.0                 | 5.1        |
|         | 163.4        | 154.8         |                      |                       |            |
|         | 162.9        | 154.4         |                      |                       |            |

Summary

As can be seen from the comparison of the results of the durability test, the polymer film according to the present invention (M-3 to M-6) all exhibit significant improvements of the durability with respect to CM-3.

Experiment 4

The following mixture CM-4 is prepared:

| CM-4 Component | Amount in wt. % |
| --- | --- |
| C1 | 6.82 |
| C2 | 63.84 |
| C3 | 10.00 |
| C4 | 17.80 |
| C6 | 0.12 |
| C7 | 0.42 |
| PI-1 | 1.00 |

The mixture M-3 of experiment 3 and the mixture CM-4 are blended in ratios of 2:1, 1:1, 1:2 resulting in mixtures M-7, M-8 and M-9, respectively. Corresponding polymer film are produced from mixture CM-4 and from each mixture M-3 to M-9 following the above described method.

In order to test the durability of the polymer films, each film is exposed to a temperature of 230° C. for a time up to 40 min.

Table 4.1 summarizes the result of the durability test (triplicate):

TABLE 4.1

| Mixture | R550 (0 min) | R550 (40 min) | Average R550 (0 min) | Average R550 (40 min) | Δ R550 [%] |
| --- | --- | --- | --- | --- | --- |
| M-3 | 136.6 | 139.4 | 137.5 | 138.6 | 0.8 |
|  | 137.6 | 139.3 |  |  |  |
|  | 138.4 | 137.1 |  |  |  |
| M-7 | 143.9 | 138.7 | 144.4 | 142.8 | 1.1 |
|  | 143.5 | 145.0 |  |  |  |
|  | 145.7 | 144.6 |  |  |  |
| M-8 | 148.0 | 142.5 | 149.2 | 143.4 | 3.8 |
|  | 147.3 | 139.2 |  |  |  |
|  | 152.2 | 148.6 |  |  |  |
| M-9 | 156.5 | 149.4 | 155.4 | 146.1 | 6.0 |
|  | 155.7 | 146.2 |  |  |  |
|  | 154.1 | 142.7 |  |  |  |
| CM-4 | 153.1 | 145.1 | 154.6 | 142.9 | 7.6 |
|  | 154.4 | 142.1 |  |  |  |

Summary

As can be seen from the comparison of the results of the durability test, the polymer film according to the present invention (M-3, and M-7 to M-9) exhibit all significant improvements of the durability with respect to CM-3.

Experiment 5

The following mixture M-10 is prepared:

| Component | Amount in wt. % |
| --- | --- |
| C1 | 6.89 |
| C2 | 48.24 |
| C3 | 10.10 |
| C4 | 17.98 |
| C5 | 16.24 |
| C6 | 0.12 |
| C7 | 0.42 |

To 99 wt. % of mixture M-10, 1 wt. % of one of the photoinitiators PI-1 to PI-7 are added, respectively, resulting in the mixtures M-11 to M-17. Corresponding polymer film are produced from each mixture M-11 to M-17 following the above described method.

In order to test the durability of the polymer films, each film is exposed to a temperature of 230° C. for a time up to 40 min.

Table 5.1 summarizes the result of the durability test (triplicate):

TABLE 5.1

| Mixture | R550 (0 min) | R550 (40 min) | Average R550 (0 min) | Average R550 (40 min) | Δ R550 [%] |
| --- | --- | --- | --- | --- | --- |
| M-11 (PI-1) | 137.5 | 139.4 | 137.0 | 139.2 | 1.5 |
|  | 136.5 | 139.3 |  |  |  |
|  | 137.1 | 138.9 |  |  |  |
| M-12 (PI-2) | 139.1 | 137.6 | 140.4 | 139.2 | 0.9 |
|  | 140.3 | 139.2 |  |  |  |
|  | 141.9 | 140.6 |  |  |  |
| M-13 (PI-3) | 137.3 | 138.4 | 138.4 | 139.8 | 1.0 |
|  | 138.2 | 138.8 |  |  |  |
|  | 139.8 | 142.3 |  |  |  |
| M-14 (PI-4) | 138.8 | 137.8 | 138.5 | 138.3 | 0.1 |
|  | 137.6 | 137.8 |  |  |  |
|  | 139.0 | 139.3 |  |  |  |
| M-15 (PI-5) | 139.2 | 143.2 | 139.9 | 143.7 | 2.7 |
|  | 139.4 | 143.0 |  |  |  |
|  | 141.1 | 144.9 |  |  |  |
| M-16 (PI-6) | 138.8 | 144.9 | 138.9 | 145.7 | 4.9 |
|  | 138.9 | 146.1 |  |  |  |
|  | 139.2 | 146.3 |  |  |  |
| M-17 (PI-7) | 139.9 | 141.6 | 139.7 | 142.1 | 1.7 |
|  | 140.2 | 140.8 |  |  |  |

Experiment 6

The following mixtures CM-5 and CM-6 are prepared:

| CM-5 Component | Amount in wt. % |
| --- | --- |
| C3 | 10.00 |
| C4 | 17.80 |
| C5 | 70.66 |
| C6 | 0.12 |
| C7 | 0.42 |
| PI-1 | 1.00 |

| CM-6 Component | Amount in wt. % |
| --- | --- |
| C2 | 70.66 |
| C3 | 10.00 |
| C4 | 17.80 |
| C6 | 0.12 |
| C7 | 0.42 |
| PI-1 | 1.00 |

The mixtures CM-5 and CM-6 are blended to result in mixtures CM-7, CM-8, M-18 and M-19, having a content of C-5 of 25%, 22% 18% and 10% respectively.

Before curing, a crystallisation test is carried out on coated wet-films of each sample by taking pictures every 60 sec for 1 hour. If crystallisation occurs during that time period, the test failed. Additionally, corresponding polymer films are produced from mixture CM-6 and from each mixture CM-7, CM-8, M-18 and M-19 following the above described method.

In order to test the durability of the polymer films, each film is exposed to a temperature of 230° C. for a time up to 40 min.

Table 6.1 summarizes the result of the crystallization and durability test (triplicate):

TABLE 6.1

| Mixture (C-5%) | R550 (0 min) | R550 (40 min) | Average R550 (0 min) | Average R550 (40 min) | Δ R550 [%] | Average Δn at 550 nm | Cryst. Test |
|---|---|---|---|---|---|---|---|
| CM-7 (25%) | 130.6 | 137.1 | 131.9 | 139.1 | 5.4 | 0.0828 | Failed |
|  | 132.8 | 141.6 |  |  |  |  |  |
|  | 132.3 | 138.5 |  |  |  |  |  |
| CM-8 (22%) | 135.4 | 141.5 | 135.5 | 141.2 | 4.2 | 0.0842 | Failed |
|  | 135.5 | 140.8 |  |  |  |  |  |
|  | 135.7 | 141.2 |  |  |  |  |  |
| M-18 (18%) | 137.7 | 140.6 | 137.6 | 143.4 | 4.3 | 0.0861 | Passed |
|  | 137.3 | 145.4 |  |  |  |  |  |
|  | 137.7 | 144.3 |  |  |  |  |  |
| M-19 (10%) | 142.1 | 141.2 | 143.6 | 143.5 | 0.1 | 0.0936 | Passed |
|  | 143.6 | 145.2 |  |  |  |  |  |
|  | 145.0 | 144.0 |  |  |  |  |  |
| CM-6 (0%) | 151.0 | 133.3 | 151.5 | 133.7 | 11.8 | 0.0984 | — |
|  | 151.5 | 134.1 |  |  |  |  |  |
|  | 152.0 | 133.6 |  |  |  |  |  |

Summary

As can be seen from the comparison of the results depicted in table 6.1 the comparative mixtures CM-7 and CM-8, comprising C-5 in amounts higher than 20% did not pass the crystallisation test. Whereas the mixtures M-18 and M-19 according to the present invention do not exhibit any crystallisation.

As can be seen from the comparison of the results of the durability test, the polymer film according to the present invention resulting from mixtures M-18 and M-19 exhibit both significant improvements of the durability with respect to CM-6, while exhibiting still favourable values for the birefringence Δn at 550 nm.

Experiment 7

The following mixtures CM-9 and CM-10 are prepared:

| CM-9 Component | Amount in wt. % |
|---|---|
| C3 | 10.00 |
| C4 | 17.80 |
| C5 | 70.66 |
| C6 | 0.12 |
| C7 | 0.42 |
| PI-1 | 1.00 |

| CM-10 Component | Amount in wt. % |
|---|---|
| C2 | 70.66 |
| C3 | 10.00 |
| C4 | 17.80 |
| C6 | 0.12 |
| C7 | 0.42 |
| PI-1 | 1.00 |

The mixtures CM-9 and CM-10 are blended resulting in mixtures M-20 and M-21, having a content of C-5 of 18% and 10%, respectively.

Additionally, corresponding polymer films are produced from mixture CM-10 and from each mixture M-20 and M-21 following the above described method.

In order to test the durability of the polymer films, each film is exposed to a temperature of 230° C. for a time up to 40 min.

Table 7.1 summarizes the result of the durability test (triplicate):

TABLE 7.1

| Mixture (C-5%) | R550 (0 min) | R550 (40 min) | Average R550 (0 min) | Average R550 (40 min) | Δ R550 [%] | Average Δn at 550 nm |
|---|---|---|---|---|---|---|
| M-20 (18%) | 158.7 | 136.6 | 159.1 | 145.5 | 8.6 | 0.1139 |
|  | 159.0 | 161.9 |  |  |  |  |
|  | 159.7 | 137.9 |  |  |  |  |
| M-21 (10%) | 170.8 | 167.3 | 171.0 | 167.2 | 2.2 | 0.1206 |
|  | 170.1 | 166.0 |  |  |  |  |
|  | 172.2 | 168.4 |  |  |  |  |
| CM-10 (0%) | 181.3 | 150.7 | 181.9 | 152.5 | 16.2 | 0.1305 |
|  | 182.0 | 154.5 |  |  |  |  |
|  | 182.4 | 152.2 |  |  |  |  |

Summary

As can be seen from the comparison of the results of the durability test, the polymer film according to the present invention resulting from mixtures M-20 and M-21 exhibit both significant improvements of the durability with respect to CM-10, while exhibiting still favourable values for the birefringence Δn at 550 nm.

The invention claimed is:

1. A polymerisable LC medium comprising:
   one or more compounds of formula A in an amount of no more than 20% by weight,

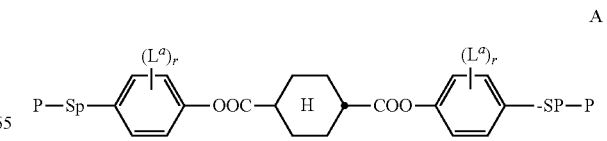

A wherein

P is independently of one another, a polymerisable group,

Sp is a spacer group or a single bond, $L^a$ is, in case of multiple occurrence identically or differently F, Cl, CN, SCN, $SF_5$ or straight-chain or branched, optionally mono- or polyfluorinated alkyl, alkoxy, alkenyl, alkynyl, alkylcarbonyl, alkoxycarbonyl, or alkylcarbonyloxy or alkoxycarbonyloxy having 1 to 12 C atoms, or optionally halogenated alkyl, alkoxy, alkylcarbonyl, alkoxycarbonyl, alkylcarbonyloxy or alkoxycarbonyloxy with 1 to 5 C atoms, r is 0, 1, 2, 3 or 4, and 10 to 15% by weight of one or more compounds of formula I,

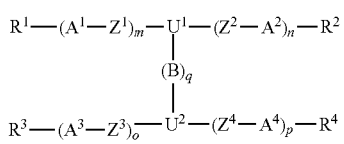

wherein $U^1$ and $U^2$ are independently of each other selected from

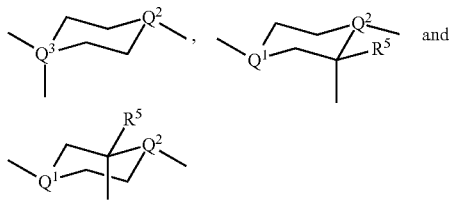

including their mirror images, wherein the rings $U^1$ and $U^2$ are each bonded to the group —(B)$_q$— via the axial bond, and one or two non-adjacent $CH_2$ groups in these rings are optionally replaced by O and/or S, and the rings $U^1$ and $U^2$ are optionally substituted by one or more groups L, $Q^1$ and $Q^2$ are independently of each other CH or SiH, $Q^3$ is C or Si, B is in each occurrence independently of one another —C≡—, —CY$^1$=CY$^2$— or an optionally substituted aromatic or heteroaromatic group, $Y^1$ and $Y^2$ are independently of each other H, F, Cl, CN or $R^0$, q is an integer from 1 to 10, $A^1$ to $A^4$ are independently of each other, in each occurrence selected from non-aromatic, aromatic or heteroaromatic carbocylic or heterocyclic groups, which are optionally substituted by one or more groups $R^5$, and wherein each of -(A$^1$-Z$^1$)$_m$—U$^1$—(Z$^2$-A$^2$)$_n$- and -(A$^3$-Z$^3$)$_o$—U$^2$—(Z$^4$-A$^4$)$_p$- does not contain more aromatic groups than non-aromatic groups, $Z^1$ to $Z^4$ are independently of each other, in each occurrence, —O—, —S—, —CO—, —COO—, —OCO—, —O—COO—, —CO—NR$^0$—, —NR$^0$—CO—, —NR$^0$—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_3$—, —(CH$_2$)$_4$—, —CF$_2$CH$_2$—, —CH$_2$CF$_2$—, —CF$_2$CF$_2$—, —CH=CH—, —CY$^1$=CY$^2$—, —CH=N—, —N=CH—, —N=N—, —CH=CR$^0$—, —C≡C—, —CH=CH—COO—, —OCO—CH=CH—, CR$^0$R$^{00}$ or a single bond, $R^0$ and $R^{00}$ are independently of each other H or alkyl with 1 to 12 C-atoms, m and n are independently of each other 0, 1, 2, 3 or 4, and p are independently of each other 0, 1, 2, 3 or 4, $R^1$ to $R^5$ are independently of each other identical or different groups selected from H, halogen, —CN, —NC, —NCO, —NCS, —OCN, —SCN, —C(=O) NR$^0$R$^{00}$, —C(=O)X$^0$, —C(=O)R$^0$, —NH$_2$, —NR$^0$R$^{00}$, —SH, —SR$^0$, —SO$_3$H, —SO$_2$R$^0$, —OH, —NO$_2$, —CF$_3$, —SF$_5$, P-Sp-, optionally substituted silyl, or carbyl or hydrocarbyl with 1 to 40 C atoms that is optionally substituted and optionally comprises one or more hetero atoms, or denote P or P-Sp-, or are substituted by P or P-Sp-, wherein the compounds comprise at least one group $R^{1-5}$ denoting or being substituted by P or P-Sp-, P is a polymerizable group, Sp is a spacer group or a single bond.

2. The polymerizable LC medium according to claim 1, wherein the compounds of formula A are selected from the following sub formulae,

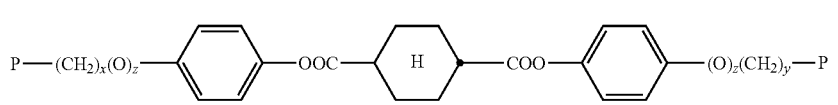

Aa wherein the parameter P has one of the meanings as given above under claim 1 and x, y, z, are independently of each other 0 or identical or different integers from 1 to 12.

3. The polymerizable LC medium according to claim 1, wherein the bridging group, or —(B)$_q$— in formula I, is selected from —C≡C—, —C≡C—C≡C—, —C≡C—C≡C—C≡C—, —C≡C—C≡C—C≡C—C≡C—,

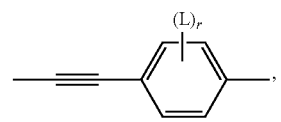

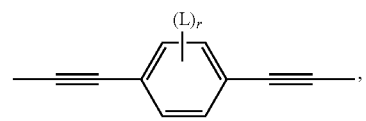

-continued

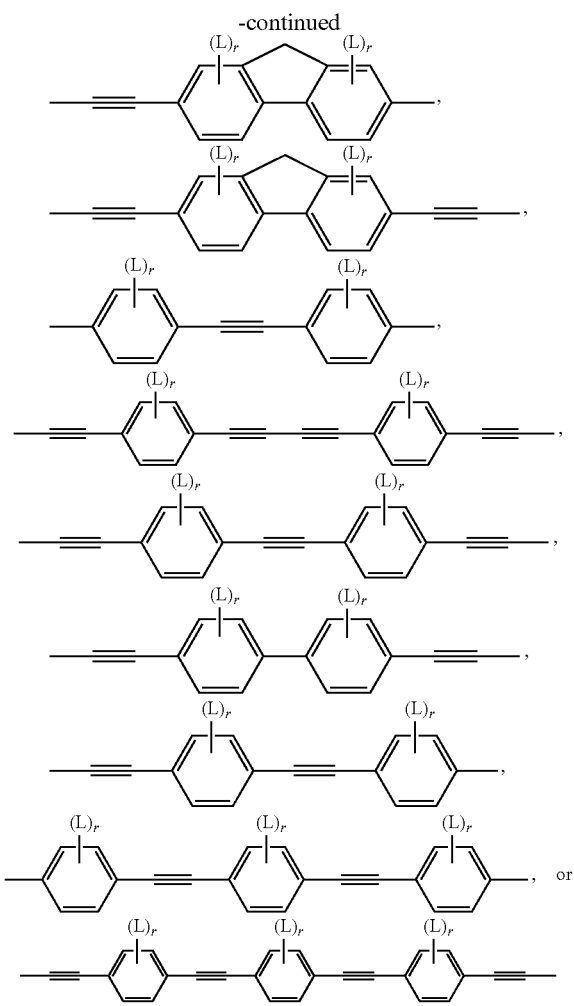

wherein r is 0, 1, 2, 3 or 4, and

L is selected from P-Sp-, F, Cl, Br, I, —CN, —NO$_2$, —NCO, —NCS, —OCN, —SCN, —C(=O)NR$^0$R$^{00}$, —C(=O)X, —C(=O)OR$^0$, —C(=O)R$^0$, —NR$^0$R$^{00}$, —OH, —SF$_5$, optionally substituted silyl, aryl with 1 to 12, and straight chain or branched alkyl, alkoxy, alkylcarbonyl, alkoxycarbonyl, alkylcarbonyloxy or alkoxycarbonyloxy with 1 to 12, wherein one or more H atoms are optionally replaced by F or Cl, wherein R$^0$ and R$^{00}$ are as defined in claim 1 and X is halogen.

4. The polymerizable LC medium according to claim 1, wherein the non-aromatic rings of the mesogenic groups where the bridging group is attached, or U$^1$ and U$^2$ in formula I, are selected from

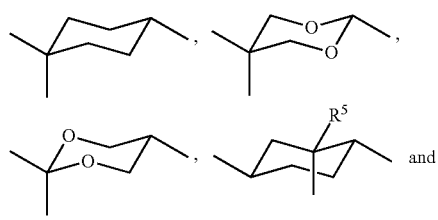

-continued

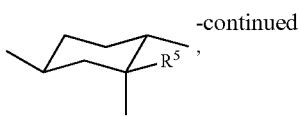

wherein R$^5$ has one of the meanings as given above in claim 1.

5. The polymerizable LC medium according to claim 1, wherein the aromatic and non-aromatic groups, or A$^{1-4}$ in formula I, are selected from trans-1,4-cyclohexylene and 1,4-phenylene that is optionally substituted with one or more groups L, where L is selected from P-Sp-, F, Cl, Br, I, —CN, —NO$_2$, —NCO, —NCS, —OCN, —SCN, —C(=O)NR$^0$R$^{00}$, —C(=O)X, —C(=O)OR$^0$, —C(=O)R$^0$, —NR$^0$R$^{00}$, —OH, —SF$_5$, optionally substituted silyl, aryl with 1 to 12, and straight chain or branched alkyl, alkoxy, alkylcarbonyl, alkoxycarbonyl, alkylcarbonyloxy or alkoxycarbonyloxy with 1 to 12, wherein one or more H atoms are optionally replaced by F or Cl, wherein R$^0$ and R$^{00}$ are as defined in claim 1 and X is halogen.

6. The polymerizable LC medium according to claim 1, wherein the linkage groups connecting the aromatic and non-aromatic cyclic groups in the mesogenic groups, or Z$^{1-4}$ in formula I, are selected from —O—, —S—, —CO—, —COO—, —OCO—, —O—COO—, —CO—NR$^0$—, —NR$^0$—CO—, —NR$^0$—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_3$—, —(CH$_2$)$_4$—, —CF$_2$CH$_2$—, —CH$_2$CF$_2$—, —CF$_2$CF$_2$—, —CH=CH—, —CY$^1$=CY$^2$—, —CH=N—, —N=CH—, —N=N—, —CH=CR$^0$—, —C≡C—, —CH=CH—COO—, —OCO—CH=CH—, CR$^0$R$^{00}$ or a single bond, wherein R$^0$, R$^{00}$, Y$^1$ and Y$^2$ have the meanings given in claim 1.

7. The polymerizable LC medium according to claim 1, wherein the polymerisable compounds of formula I are selected from the following subformulae:

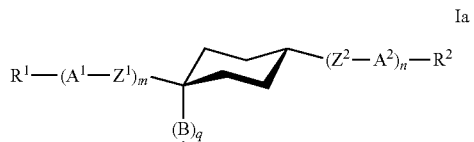   Ia

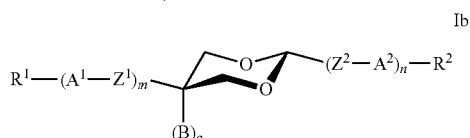   Ib

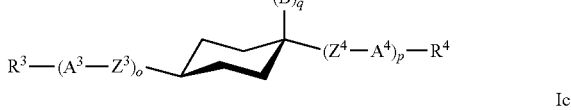

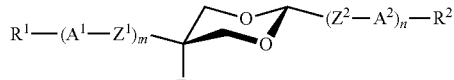   Ic

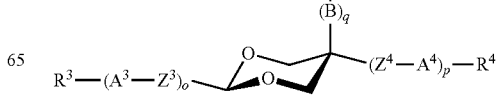

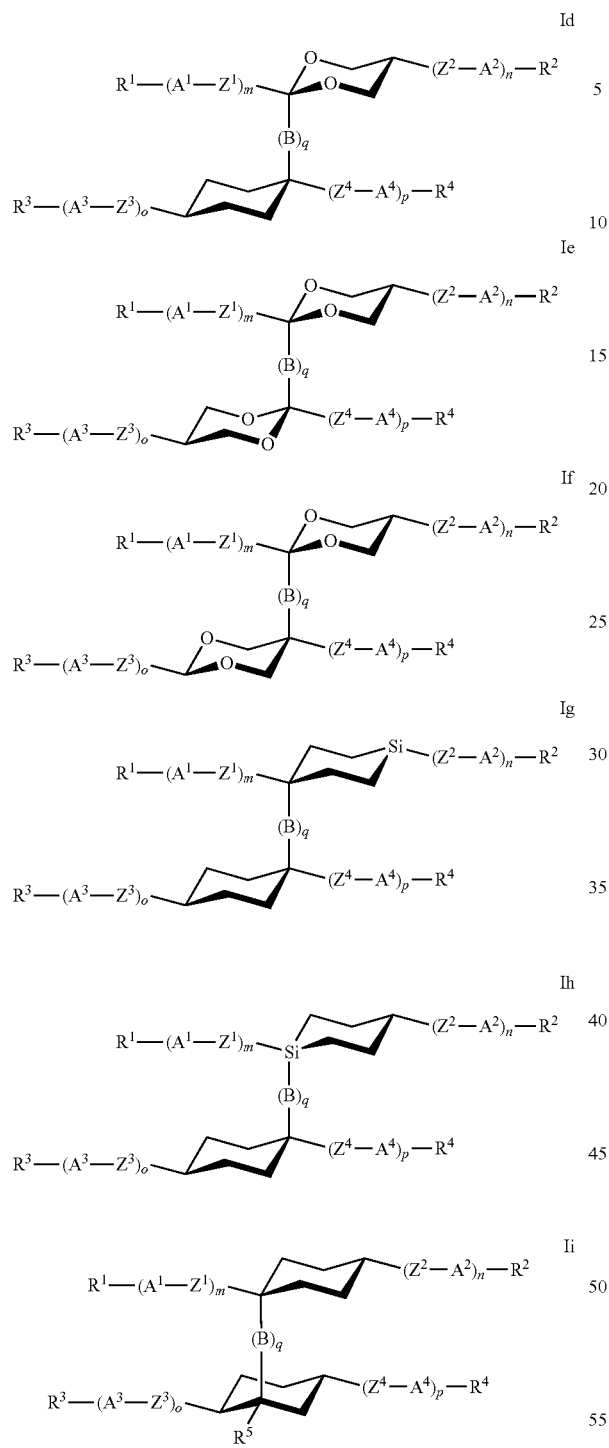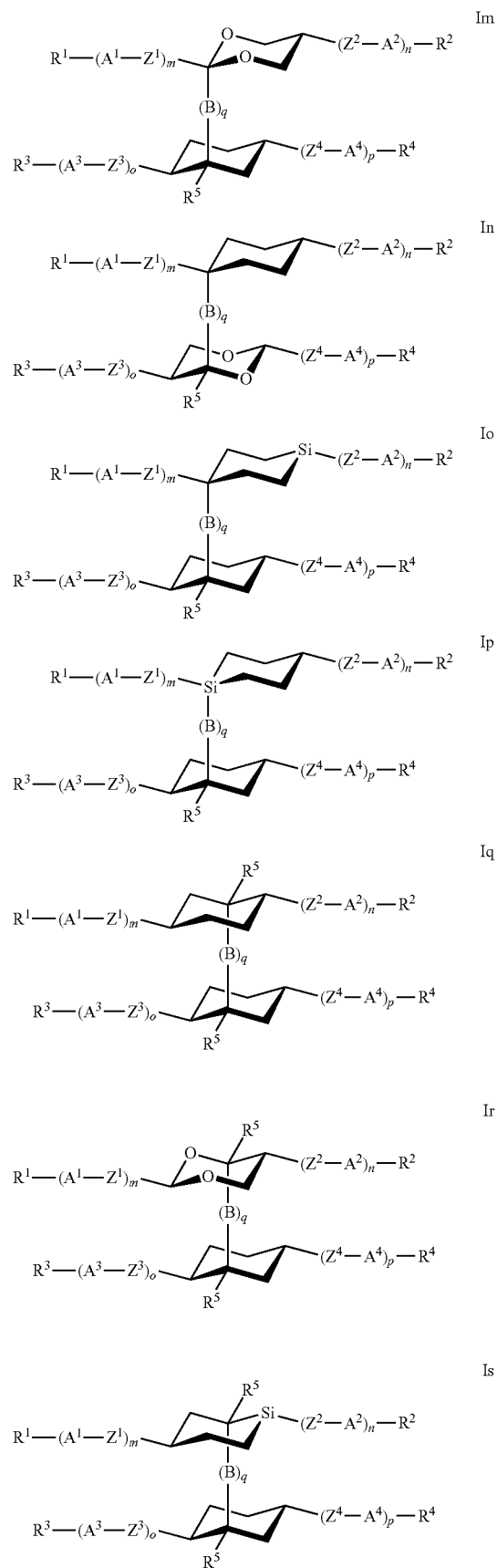

-continued
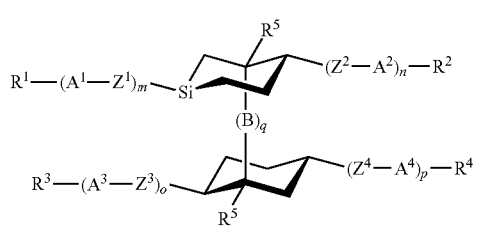
It
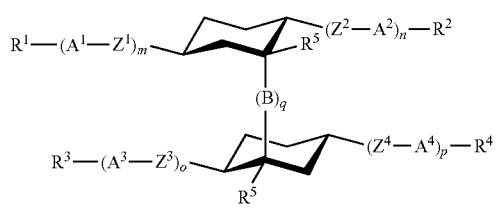
Iu
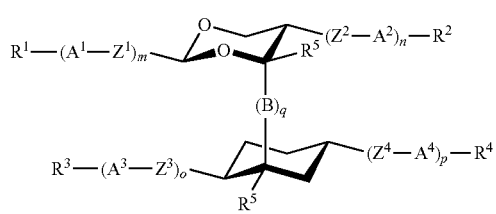
Iv
-continued
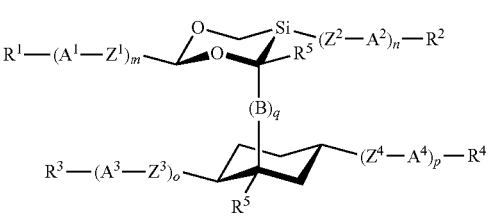
Iw
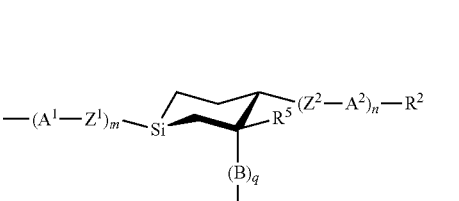
Ix
wherein $R^1$ to $R^5$, $A^1$ to $A^4$, $Z^1$ to $Z^4$, B, m, n, o, p and q have the meanings given in claim 1.
8. The polymerizable LC medium according to claim 1, wherein the polymerizable compounds of formula I are selected from the following subformulae:
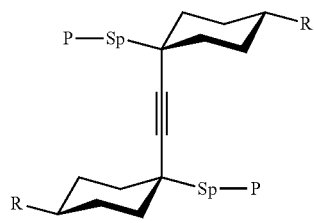
I1
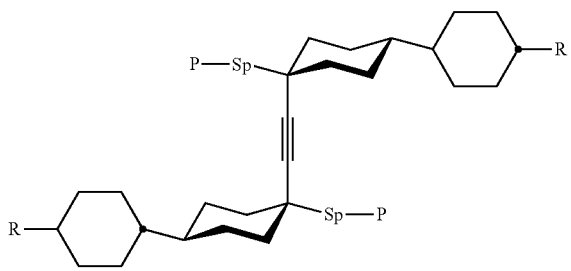
I2
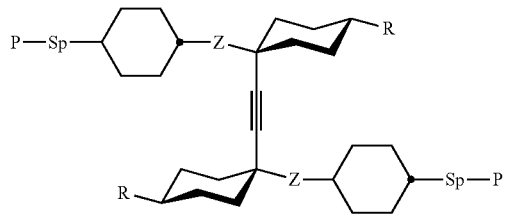
I3
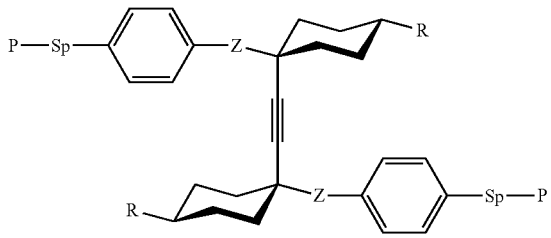
I4
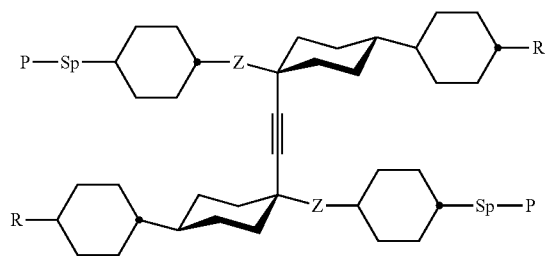
I5
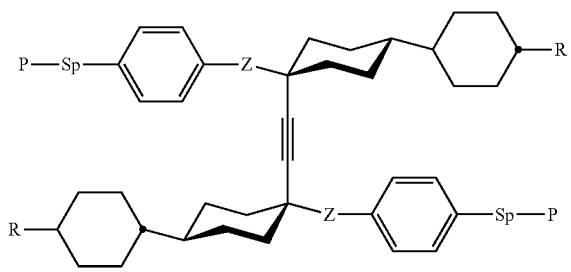
I6

-continued
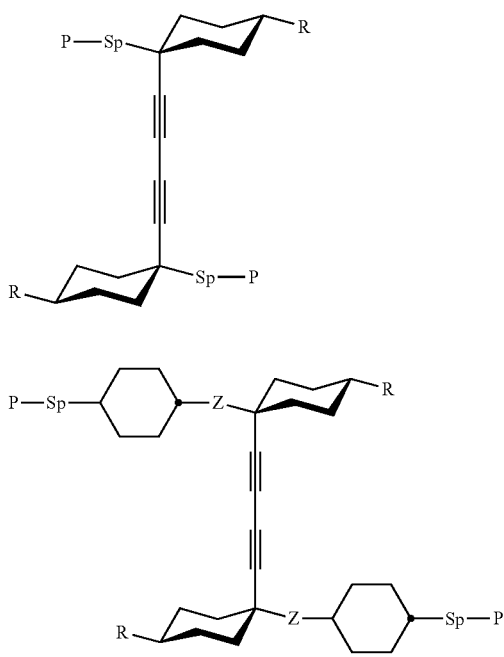
I7
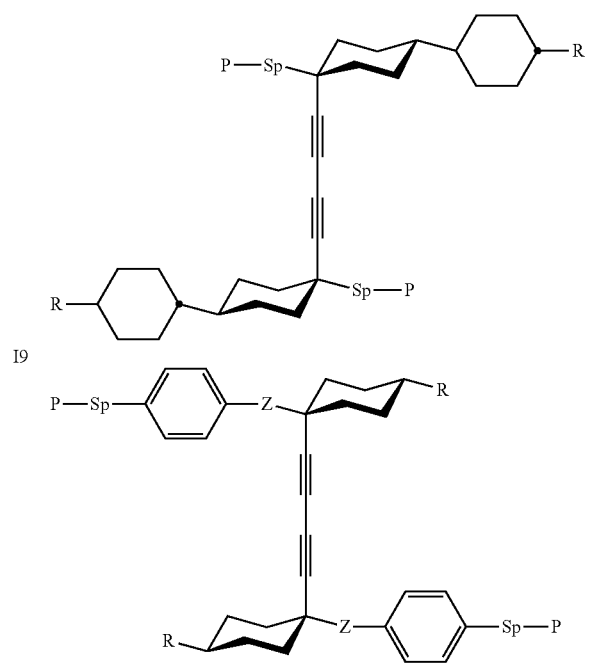
I8
I9
I10
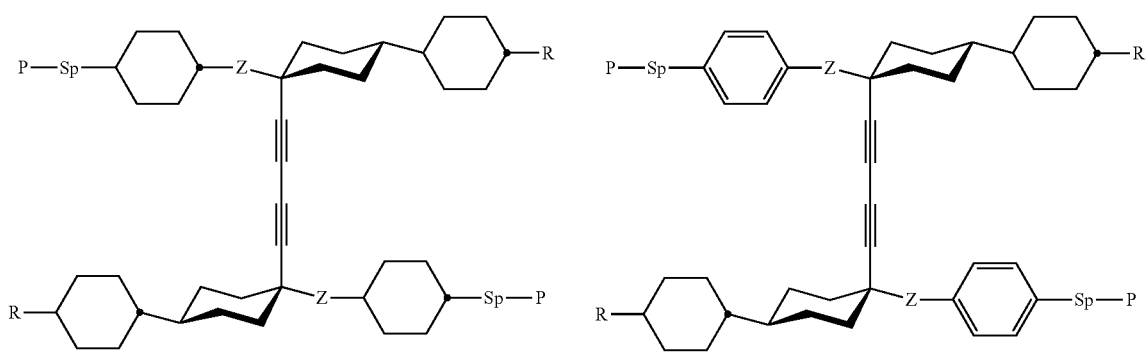
I11
I12
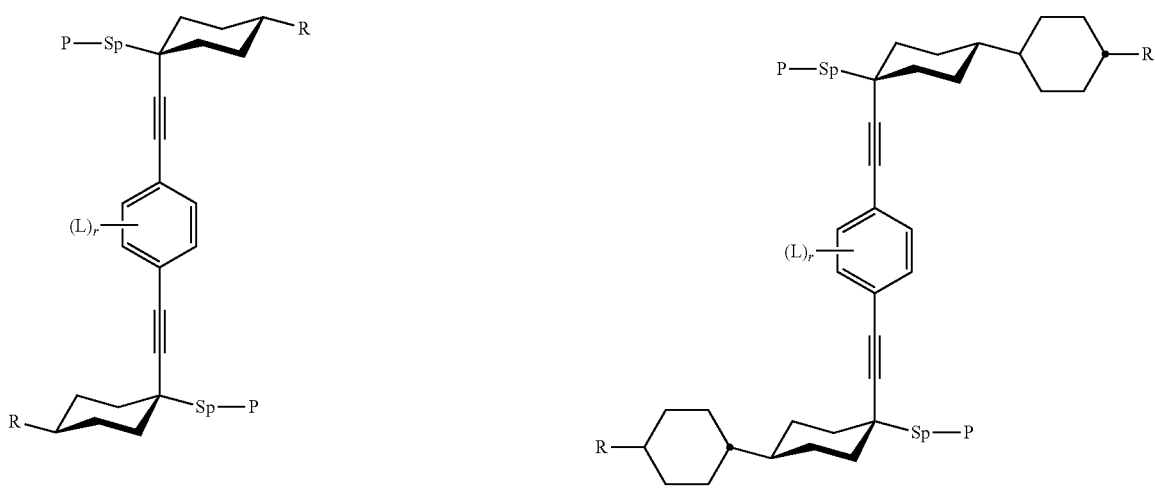
I13
I14

-continued
I15
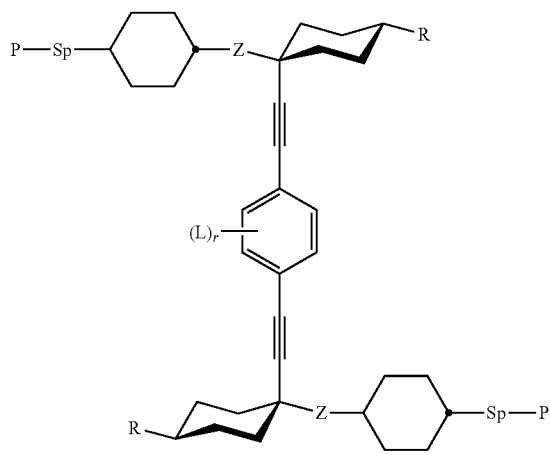
I16
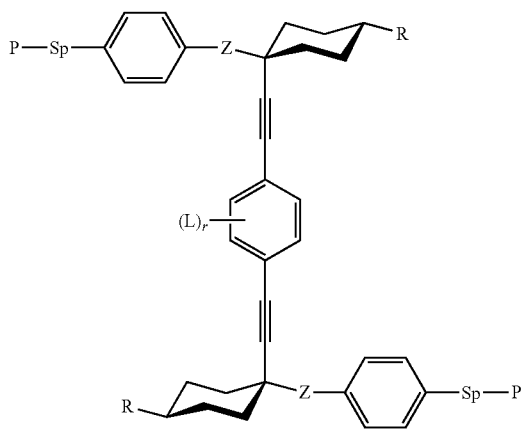
I17
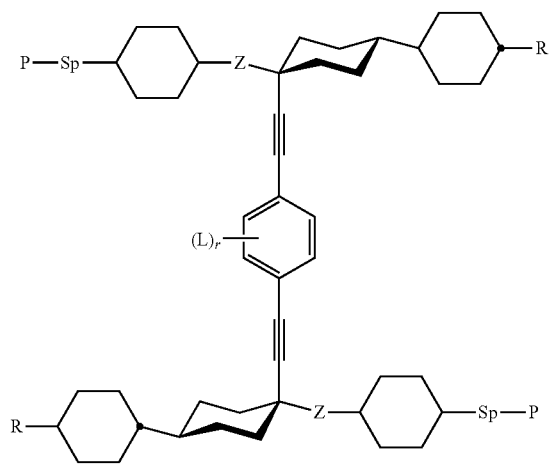
I18
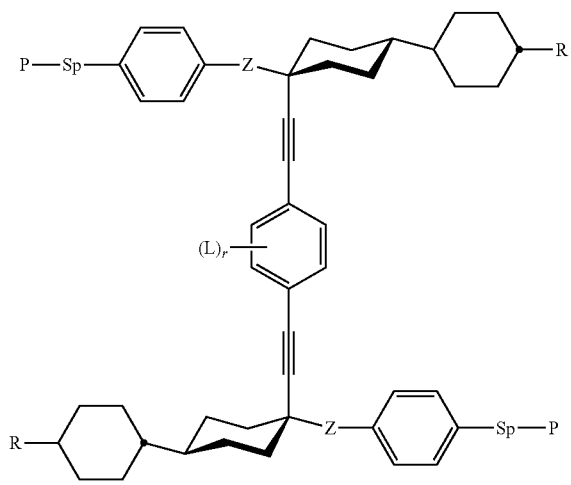
I19
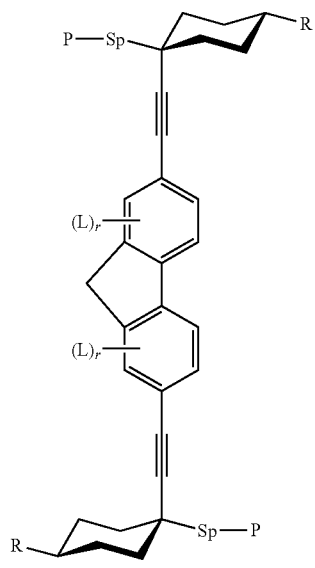
I20
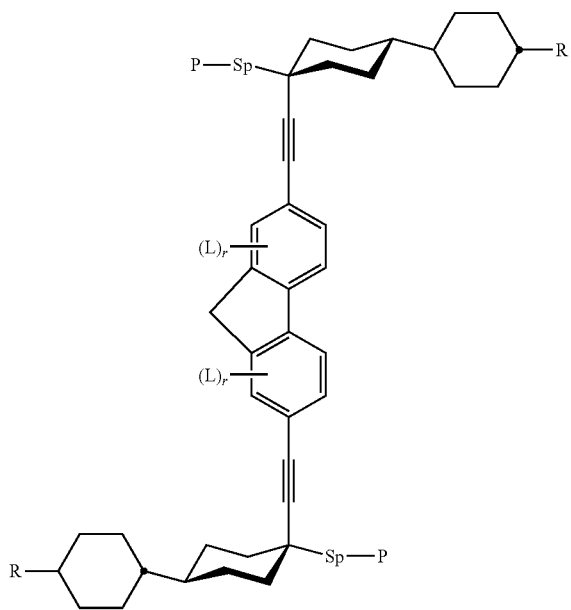

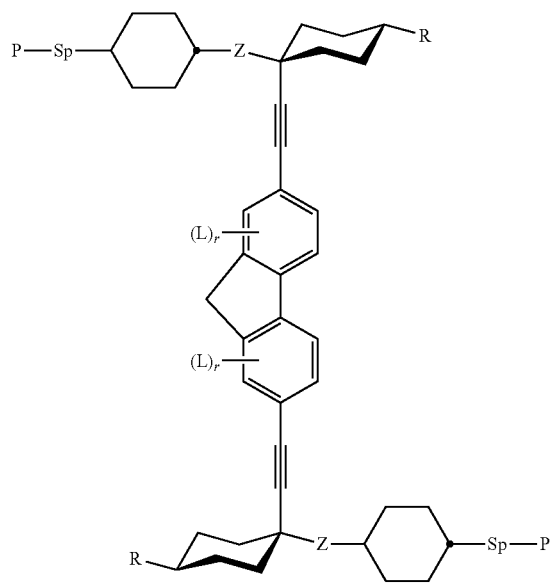
I21
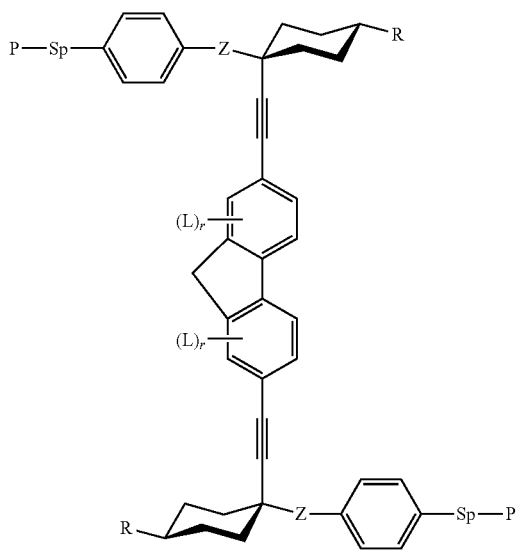
I22
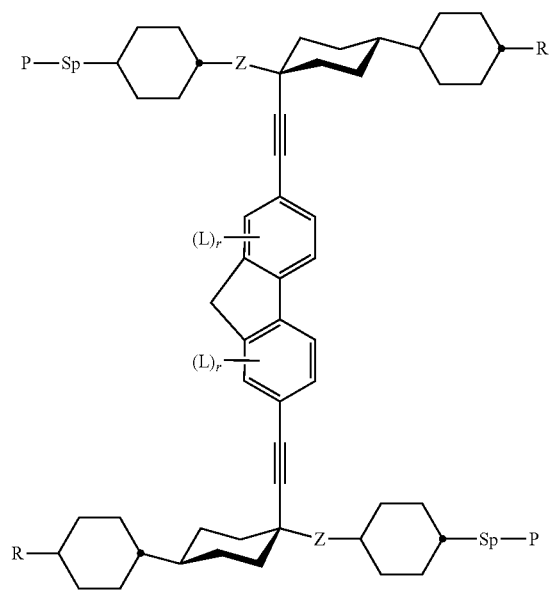
I23
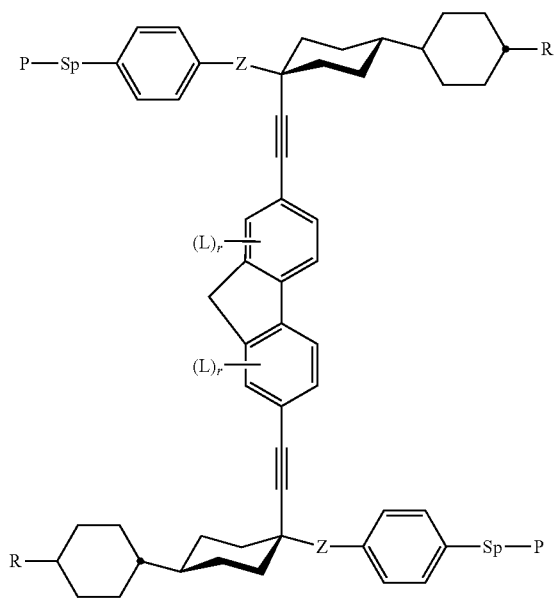
I24

I25

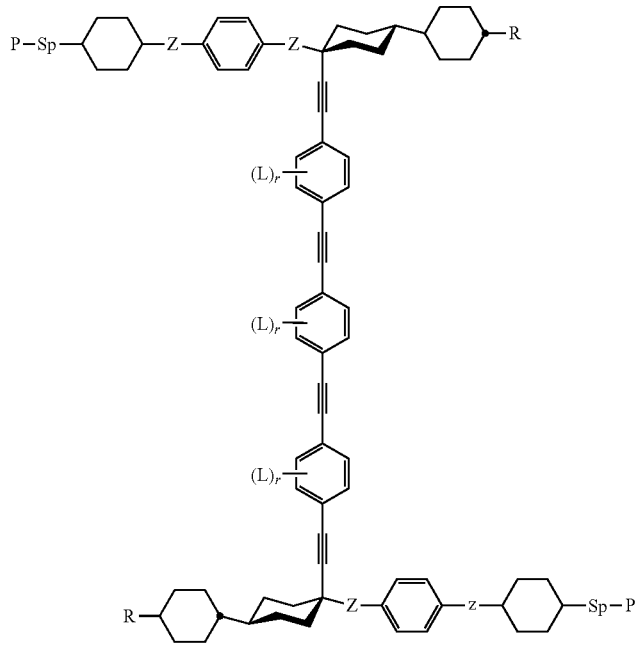

I26

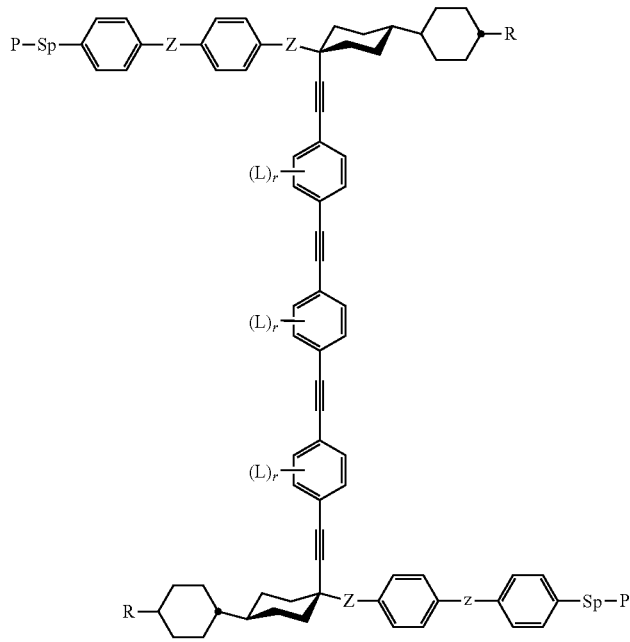

wherein Z has one of the meanings of $Z^1$ given in claim 1, R has one of the meanings of $R^1$ given in claim 1 that is different from P-Sp-, and P, Sp, L and r are as defined in claim 1, and the benzene rings in the mesogenic groups are optionally substituted by one or more groups $L^a$ as defined in claim 1.

9. The polymerizable LC medium according to claim 8, wherein the polymerisable compounds of formula I are selected from sub formulae I 25 or I 26 wherein Z denotes —COO—, and r is in each occurrence 0.

10. The polymerizable LC medium according to claim 1, comprising one or more further compounds, other than the compounds of formula A and formula I, that are polymerisable and/or mesogenic or liquid crystalline.

11. A polymer film obtained by polymerising the polymerisable LC medium as defined in claim 1 in its LC phase in an oriented state in the form of a thin film.

12. An optical component which comprises a polymerisable LC medium according to claim 1, which component is an optically uniaxial film selected from an A-plate, C-plate, negative C-plate or O-plate, a twisted optical retarder, a twisted quarter wave foil (QWF), an optically biaxial film, an achromatic retarder, an achromatic QWF or half wave foil (HWF), a film having a cholesteric, smectic, nematic or blue phase, a film having homeotropic, splayed, tilted, planar or blue-phase alignment, which is uniformly oriented or exhibits a pattern of different orientations.

13. The optical component according to claim 12, which is an optical compensation film for viewing angle enhancement of LCD's, a component in a brightness enhancement film, or an achromatic element in reflective or transflective LCD's.

14. An optical, electronic or electro optical device, or a component thereof, comprising a polymer film according to claim 11.

15. An optical, electronic or electro optical device, or a component thereof, comprising a polymerizable LC medium according to claim 1.

16. The polymerizable LC medium according to claim 1, wherein the bridging group, or —(B)$_q$— in formula I, is selected from —C≡C—, —C≡C—C≡C—, —C≡C—C≡C—C≡C—, —C≡C—C≡C—C≡C—C≡C—,

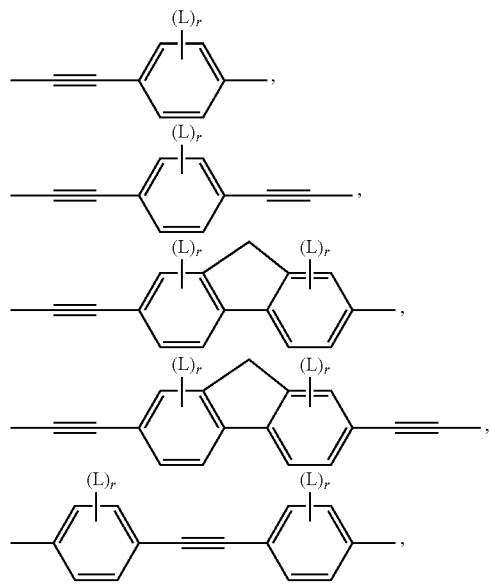

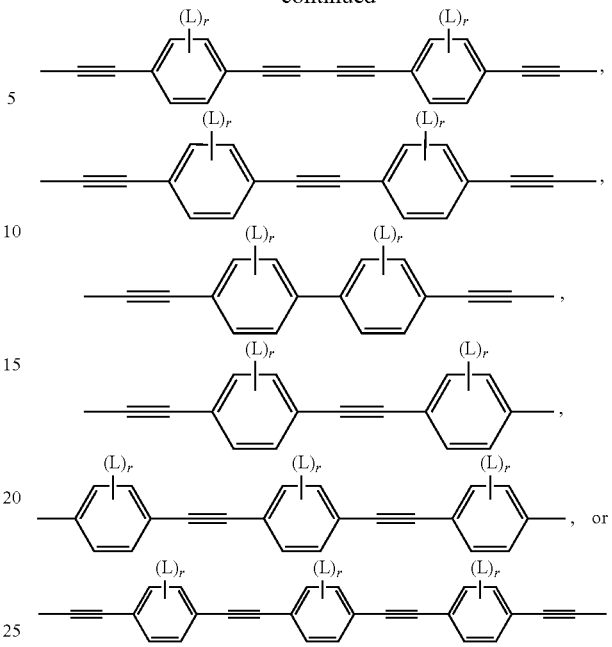

wherein
r is 0, 1, 2, 3 or 4, and
L is selected from P-Sp-, F, Cl, Br, I, —CN, —NO$_2$, —NCO, —NCS, —OCN, —SCN, —C(=O)NR$^0$R$^{00}$, —C(=O)X, —C(=O)OR$^0$, —C(=O)R$^0$, —NR$^0$R$^{00}$, —OH, —SF$_5$, optionally substituted silyl, aryl with 1 to 12, and straight chain or branched alkyl, alkoxy, alkylcarbonyl, alkoxycarbonyl, alkylcarbonyloxy or alkoxycarbonyloxy with 1 to 12, wherein one or more H atoms are optionally replaced by F or Cl, wherein R$^0$ and R$^{00}$ are as defined in claim 1 and X is halogen.

* * * * *